US010973343B2

(12) United States Patent
Jacobs et al.

(10) Patent No.: US 10,973,343 B2
(45) Date of Patent: *Apr. 13, 2021

(54) POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

(71) Applicants: Frederick Jacobs, Holland, MI (US); Matthew Jacobs, Holland, MI (US); Terry Plumert, Grand Haven, MI (US)

(72) Inventors: Frederick Jacobs, Holland, MI (US); Matthew Jacobs, Holland, MI (US); Terry Plumert, Grand Haven, MI (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/638,492

(22) PCT Filed: Aug. 13, 2018

(86) PCT No.: PCT/US2018/046569
§ 371 (c)(1),
(2) Date: Feb. 12, 2020

(87) PCT Pub. No.: WO2019/036391
PCT Pub. Date: Feb. 21, 2019

(65) Prior Publication Data
US 2020/0260883 A1    Aug. 20, 2020

Related U.S. Application Data

(63) Continuation-in-part of application No. 15/675,865, filed on Aug. 14, 2017, now Pat. No. 9,943,174, (Continued)

(51) Int. Cl.
A47C 7/72      (2006.01)
A47C 31/00     (2006.01)
(Continued)

(52) U.S. Cl.
CPC ............ *A47C 31/008* (2013.01); *A47C 1/029* (2013.01); *A47C 1/0345* (2013.01);
(Continued)

(58) Field of Classification Search
CPC ......... A47C 1/022; A47C 1/00; A47C 1/0242; A47C 3/025; A47C 7/506; A47C 1/0342;
(Continued)

(56) References Cited

U.S. PATENT DOCUMENTS 9,730,518 B1 *   8/2017  Jacobs ................... A47C 7/746
9,943,174 B1 *   4/2018  Jacobs ................... H01R 24/78
(Continued)

*Primary Examiner* — Chi Q Nguyen
(74) *Attorney, Agent, or Firm* — James E. Shultz, Jr.

(57) ABSTRACT

Powered chairs, assemblies for use in the powered chairs, and components for use in the assemblies are provided. Electrical systems for use in the powered chairs, and components for use in the electrical systems are provided. Control systems and methods for operating powered chairs are also provided. Any given chair may be locally and/or remotely controlled.

30 Claims, 29 Drawing Sheets

Related U.S. Application Data which is a continuation-in-part of application No. PCT/US2016/025803, filed on Apr. 3, 2016.

(60) Provisional application No. 62/206,837, filed on Aug. 18, 2015, provisional application No. 62/175,210, filed on Jun. 12, 2015, provisional application No. 62/159,791, filed on May 11, 2015, provisional application No. 62/149,596, filed on Apr. 19, 2015, provisional application No. 62/143,079, filed on Apr. 4, 2015.

(51) Int. Cl.

| | | |
|---|---|---|
| *A47C 1/121* | (2006.01) | |
| *A47C 7/74* | (2006.01) | |
| *A47C 1/034* | (2006.01) | |
| *A61H 1/00* | (2006.01) | |
| *G06Q 10/02* | (2012.01) | |
| *H01R 24/78* | (2011.01) | |
| *H01R 24/70* | (2011.01) | |
| *A47C 7/70* | (2006.01) | |
| *A47C 1/032* | (2006.01) | |
| *A47C 1/029* | (2006.01) | |
| *A47C 1/0355* | (2013.01) | |
| *A47C 1/13* | (2006.01) | |
| *A47C 4/06* | (2006.01) | |
| *A47C 1/126* | (2006.01) | |
| *A61H 23/00* | (2006.01) | |
| *A61H 23/02* | (2006.01) | |
| *A47C 1/124* | (2006.01) | |
| *A47C 7/62* | (2006.01) | |
| *H01R 103/00* | (2006.01) | |
| *H04W 4/80* | (2018.01) | |

(52) U.S. Cl.
CPC ........ *A47C 1/0355* (2013.01); *A47C 1/03211* (2013.01); *A47C 1/121* (2013.01); *A47C 1/124* (2013.01); *A47C 1/126* (2013.01); *A47C 1/13* (2013.01); *A47C 4/06* (2013.01); *A47C 7/624* (2018.08); *A47C 7/70* (2013.01); *A47C 7/705* (2018.08); *A47C 7/72* (2013.01); *A47C 7/725* (2013.01); *A47C 7/74* (2013.01); *A47C 7/746* (2013.01); *A47C 7/748* (2013.01); *A61H 1/001* (2013.01); *A61H 23/004* (2013.01); *A61H 23/0254* (2013.01); *G06Q 10/02* (2013.01); *H01R 24/70* (2013.01); *H01R 24/78* (2013.01); *A61H 2201/0149* (2013.01); *A61H 2201/02* (2013.01); *A61H 2201/0207* (2013.01); *A61H 2201/0214* (2013.01); *A61H 2201/1223* (2013.01); *A61H 2201/1623* (2013.01); *A61H 2201/501* (2013.01); *A61H 2201/5048* (2013.01); *A61H 2201/5071* (2013.01); *A61H 2201/5074* (2013.01); *A61H 2201/5089* (2013.01); *A61H 2201/5097* (2013.01); *H01R 2103/00* (2013.01); *H04W 4/80* (2018.02)

(58) Field of Classification Search
CPC ....... A47C 1/035; A47C 31/008; B64D 11/06; B64D 11/0601; B64D 25/04
USPC ... 297/330, 217.2, 217.3, 88, 217.6, 344.12, 297/354.12, 68, 85 M, 248, 232, 463.1, 297/362.11; 340/664, 657, 687, 691.1; 601/26; 244/118.6; 74/490.07, 469, 74/473.12; 52/6
See application file for complete search history.

(56) References Cited

U.S. PATENT DOCUMENTS

| | | | |
|---|---|---|---|
| 9,993,080 B2 * | 6/2018 | Jacobs | ..................... A47C 7/56 |
| 10,349,744 B2 * | 7/2019 | Jacobs | ..................... A63J 25/00 |
| 10,357,107 B2 * | 7/2019 | Jacobs | ..................... A63J 25/00 |

* cited by examiner

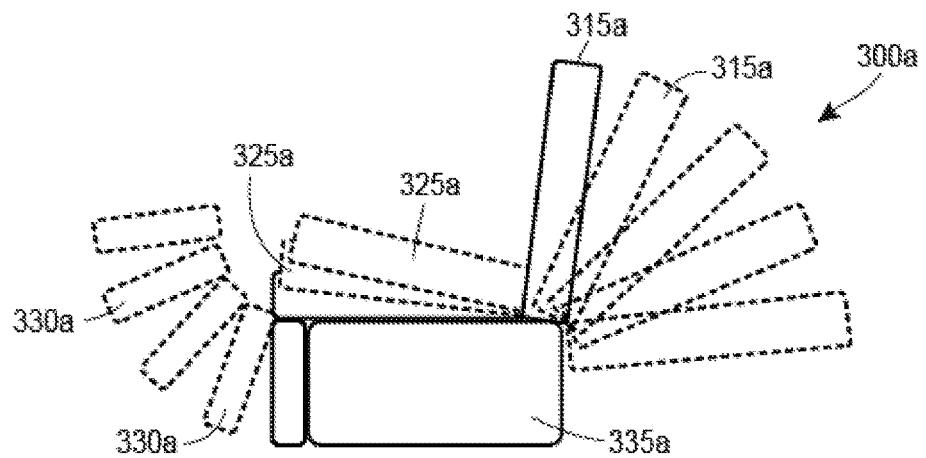
FIG. 3A
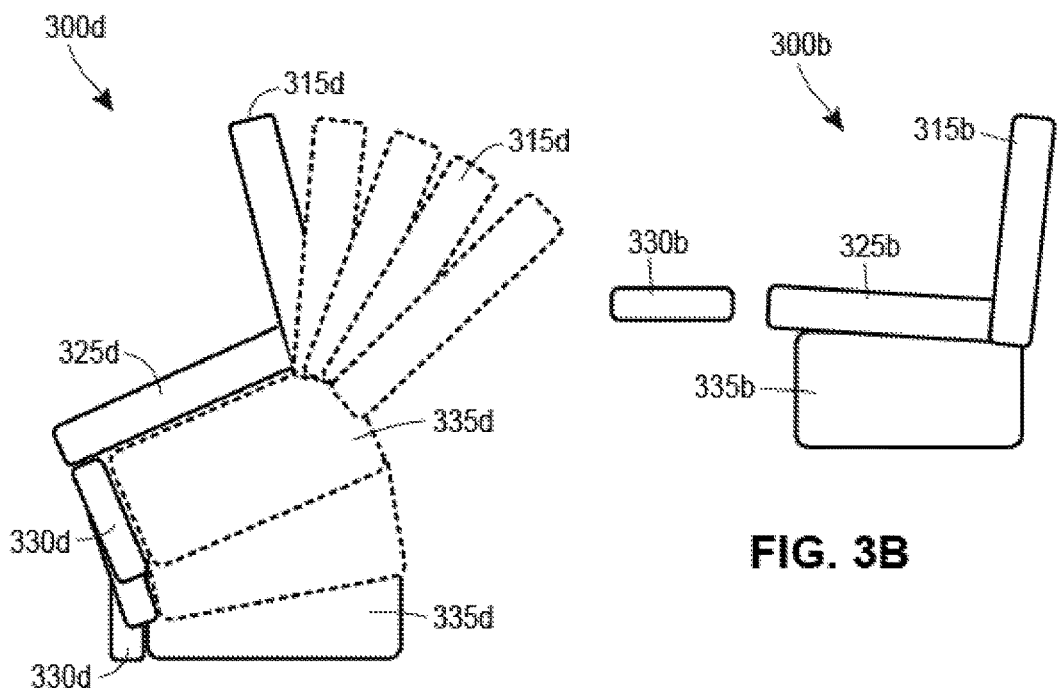
FIG. 3D
FIG. 3B
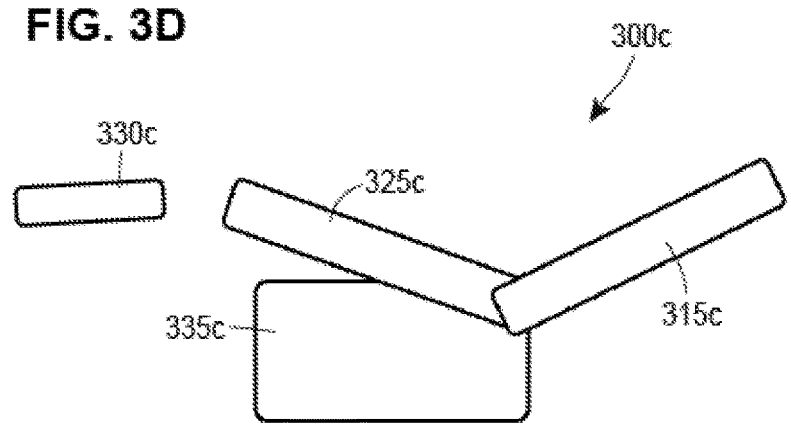
FIG. 3C

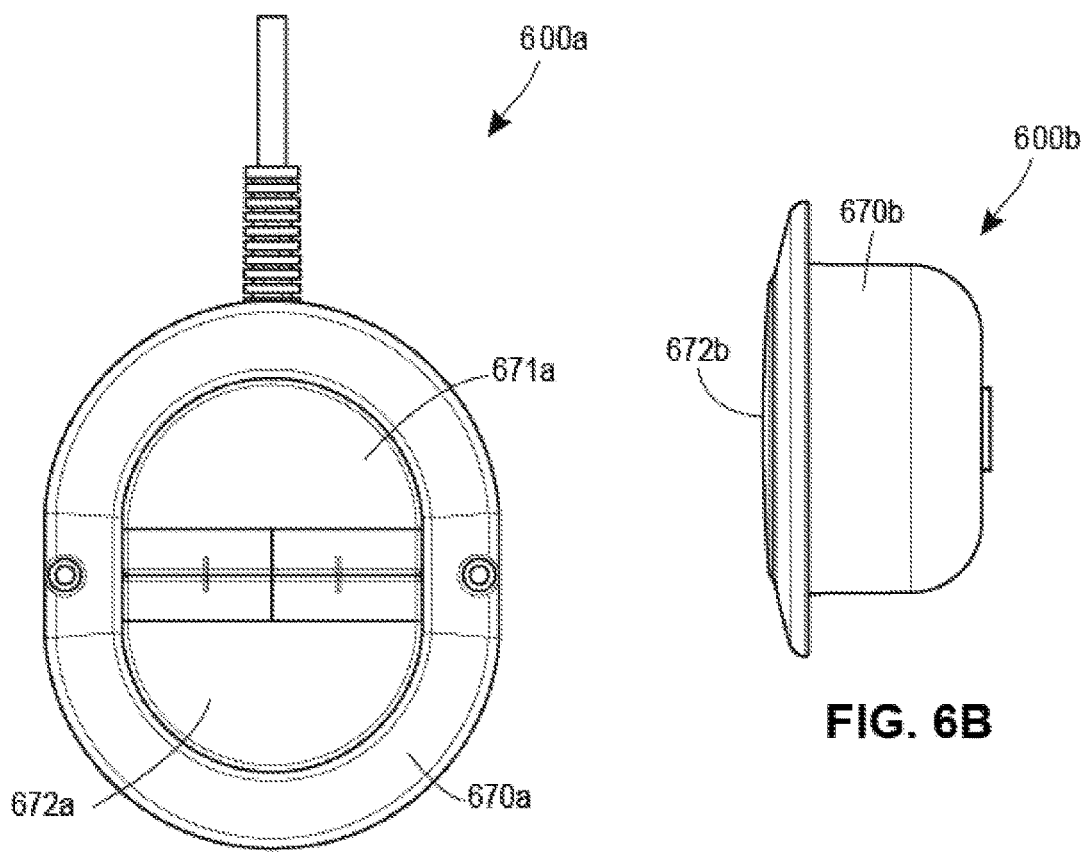
FIG. 6A
FIG. 6B
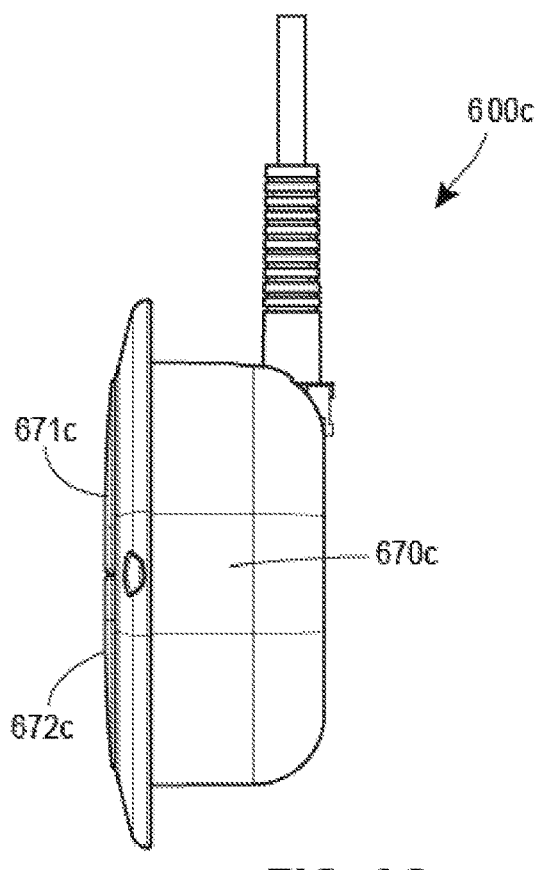
FIG. 6C

1400

1451
1450

1500
1550

1552
1551
1554

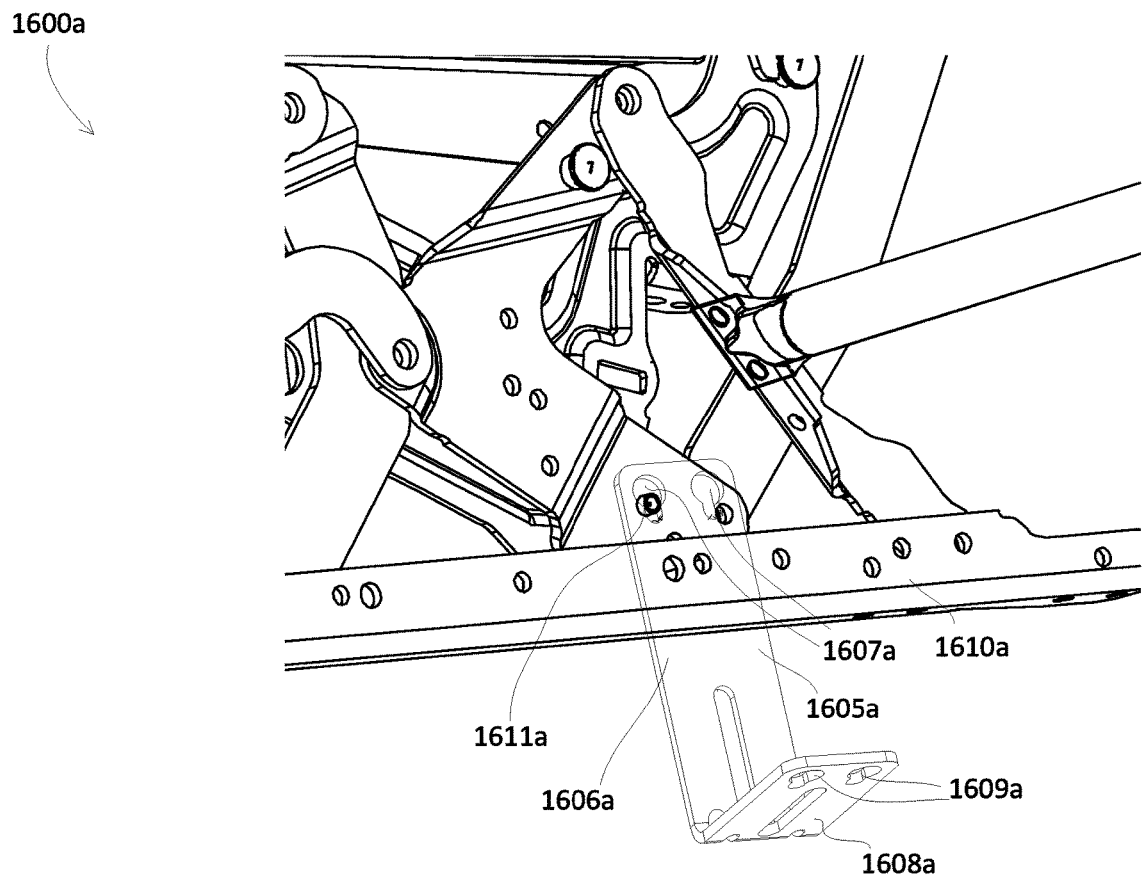
Fig. 16A
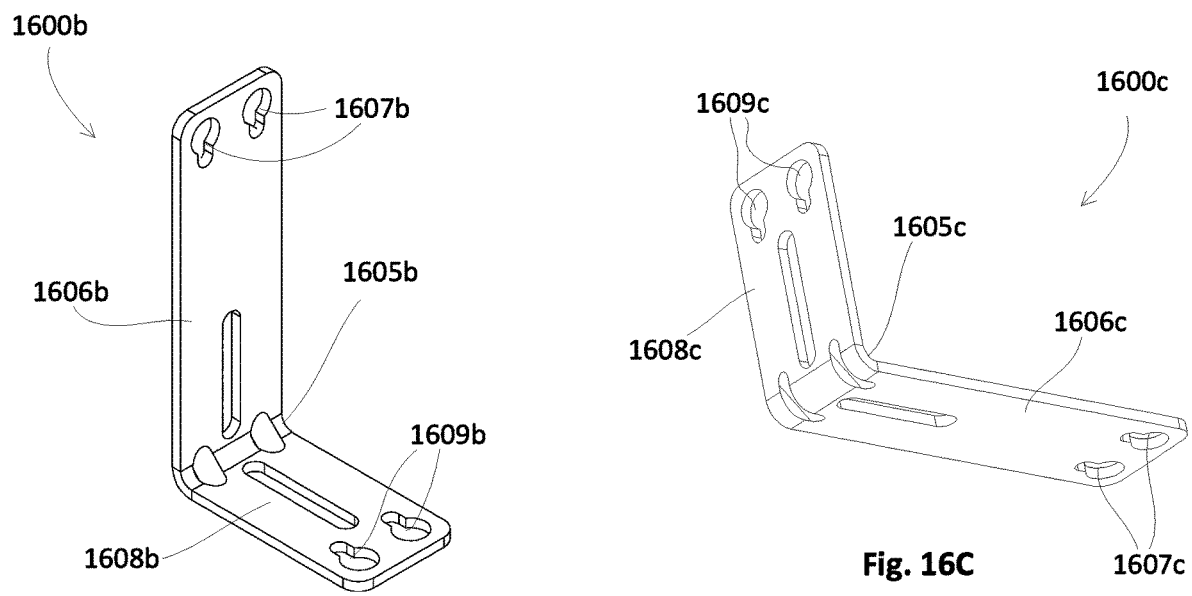
Fig. 16B
Fig. 16C

POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

TECHNICAL FEILD

The present disclosure generally relates to powered chairs. More particularly, the present disclosure relates to locally and/or remotely controlled powered recliner chairs for use within an associated venue.

BACKGROUND

Powered recliner chairs are currently available that operate individually, such that an occupant of the respective chair may reorient the respective chair between an upright orientation and a reclined orientation via a local control. Similarly, known power-assisted chairs may include a motor-operated lift mechanism for aiding persons that require assistance in entering or exiting the chair. Motor-operated lift mechanisms may be interconnected between a stationary base assembly and a movable chair frame. Alternatively, some power-assisted chairs include separate linkage mechanisms for permitting the seat occupant to selectively extend and retract a leg rest assembly and/or produce reclining angular movement between an upright first orientation and a reclined second orientation.

Conventional rocking chairs may include a chair body and a substantially arc-shaped support bracket mounted on a bottom of the chair body. Thus, when a user applies a force on the chair body by his/her own gravity, the support bracket may function as a rocking fulcrum of the chair body so that the rocking chair is rocked forward and backward. However, the user has to exert a force on the chair body so as to rock the rocking chair, so that the user seated on the rocking chair cannot relax himself/herself, thereby easily causing an uncomfortable sensation to the user.

Power-assisted chairs may be adapted to provide the lift and tilt function in combination with a leg rest and/or reclining function. Chairs which provide such a combination of multi-positional functions generally require use of multiple motors for driving separate linkages, which results in extremely large and expensive chair units. In addition, most power-assisted chairs incorporate a drive mechanism that employs both a power drive function for extending the leg rest, lifting the chair, and reclining the chair, and a power return function for returning the chair to the normal seated position (e.g., an upright orientation).

An important characteristic of power-assisted chairs is the ability to support heavy loads during the lift and tilt functions. More specifically, power-assisted chairs are designed to support individuals of a particular weight. Typically, power-assisted chairs that are adapted to support weight above a particular threshold, such as 300 pounds, require multiple motors.

In any event, known powered chair are, at most, controlled via a local controller.

SUMMARY

An electric powered chair assembly control system may include a controller having at least one chair actuator output and at least one chair light output. The system may also include a user interface connected to the controller. The user interface may include at least one chair actuator user control and at least one chair light user control. The system may further include an electric power supply having an electric power supply input and an electric power supply output. The electric power supply may be mounted within a first electric powered chair assembly. A first set of electric wiring may extend from the electric power supply output to a first electric actuator mounted within the first electric powered chair assembly. A second set of electric wiring may extend from the electric power supply output to a first electric chair light mounted within the first electric powered chair assembly. The controller may be configured to control the first electric actuator, via the at least one chair actuator output, based on the at least one chair actuator user control. The controller may be configured to control the electric chair light, via the at least one chair light output, based on the at least one chair light user control and further based on at least one of: a venue event, a predetermined time, or a motion sensor. The controller may be configure to de-energize the chair light when the first electric actuator is energized.

In another embodiment, an electric powered chair assembly control system may include an electric power supply having an input and an output. The electric power supply may be mounted within a first electric powered chair assembly. An input voltage rating of the input may be different than an output voltage rating of the output. A first set of electric wiring may be plugged into the output of the electric power supply and may extend from the output of the electric power supply to a first receptacle having a first electric actuator mounted within the first electric powered chair assembly plugged into the first receptacle. A second set of electric wiring may extend from the output of the electric power supply to a second receptacle having a second electric actuator mounted within a second electric powered chair assembly plugged into the second receptacle. A third set of electric wiring may extend from the second electric powered chair assembly to the first electric powered chair assembly. The electric power supply may further include at least one of: an electric energy storage device output or a chair light output.

In a further embodiment, an electric powered chair assembly control system a controller having at least one chair actuator output and at least one chair heater output. The system may also include a user interface connected to the controller. The user interface may include at least one chair actuator user control and at least one chair heater user control. The controller may be configured to control the first electric actuator, via the at least one chair actuator output, based on the at least one chair actuator user control. The controller may be configured to control the electric chair heater, via the at least one chair heater output, based on the at least one chair heater user control. The controller may be configure to de-energize the first electric chair heater when the first electric actuator is energized.

In yet another embodiment, an electric powered chair assembly control system may include a controller having at least one chair actuator output and at least one chair electrical energy storage device output. The system may also include a user interface connected to the controller. The user interface may include at least one chair actuator user control and at least one chair light user control. The controller may be configured to control the first electric actuator, via the at least one chair actuator output, based on the at least one chair actuator user control. The controller may be configured to control the at least one electrical energy storage device output based on a status of the at least one chair actuator output.

A venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a chair cooling unit current sensor input, an electric power outlet current sensor input, a lighting unit current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may also include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. At least one of: an electric power supply, an electric power demand, a venue business function, or a venue maintenance function, may be managed by controlling the at least one output based upon the at least one input.

In another embodiment, a venue seating management system may include a chair controller including at least one input selected from the group: a local user chair control input, a remote chair control input, a movie queue input, an emergency electric power source input, an actuator electric current sensor input, a chair heater electric current sensor input, a chair cooling unit current sensor input, a lighting unit current sensor input, an electric power outlet current sensor input, a chair massage unit current sensor input. The chair controller may also include at least one output selected from the group: a chair actuator output, a chair lighting unit output, an electric power output, a chair heater output, a chair cooling unit output, a chair massage unit output, a USB port output, or an electric power outlet output. At least one of: an electric power supply or an electric power demand, may be controlled by controlling the at least one output based upon the at least one input.

In a further embodiment, a venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a lighting unit current sensor input, a chair cooling unit current sensor input, an electric power outlet current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. A venue maintenance function may be managed by controlling the at least one output based upon the at least one input.

In yet a further embodiment, a venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a chair cooling unit current sensor input, an electric power outlet current sensor input, a lighting unit current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. A venue business function may be managed by controlling the at least one output based upon the at least one input.

An electrical system for a plurality of powered recliner chairs may include an electric supply connected to an input of an electric power source. A first rated voltage of the input to the electric power supply may be higher than a second rated voltage of an output of the electric power supply. The system may also include a first electrical interconnection extending from the output of the electric power supply to a first actuator in a first chair, a second electrical interconnection extending from the output of the electric power supply to a second actuator in a second chair, and a power demand management device. The power demand management device may control a power flow from the electric power supply.

In another embodiment, an electrical system for a plurality of powered recliner chairs may include a first electric power supply connected to an input of a first electric power source. A first rated voltage of the input to the first electric power supply may be higher than a second rated voltage of an output of the electric power supply. The system may also include a first electrical interconnection extending from the output of the first electric power supply to a first actuator in the first chair, a second electrical interconnection extending from the output of the first electric power supply to a second actuator in the second chair, and a third electrical interconnection extending from the first electric power source to a second electric power supply. The second electric power supply may provide electric power to at least one of: an aisle light, a user interface, a row light, or a seat identification.

In a further embodiment, an electrical system for a plurality of powered recliner chairs may include an electric supply connected to an input of an electric power source. A first rated voltage of the input to the electric power supply may be higher than a second rated voltage of an output of the electric power supply. The system may also include a first electrical interconnection extending from the output of the electric power supply to a first actuator in a first chair, a second electrical interconnection extending from the output of the electric power supply to a second actuator in a second chair, a local user interface mounted in the first chair, and a remote user interface physically separated from the first chair and the second chair. Activation of the local user interface may reorient the first chair from a first orientation to a second orientation. Activation of the remote user interface may reorient both the first chair and the second chair.

In yet a further embodiment, an electrical system for a plurality of powered recliner chairs may include an electric supply connected to an input of a first electric power source. A first rated voltage of the input to the electric power supply may be higher than a second rated voltage of an output of the electric power supply. The system may also include a first electrical interconnection extending from the output of the electric power supply to a first electric actuator motor of a first actuator of a first chair, a second electrical interconnection extending from the output of the electric power supply to a second electric motor of a second actuator of a second chair, and at least one energy storage device connected to the output of the electric power supply or incorporated within an uninterruptible power supply connected to the input of the electric power supply. The at least one energy storage device may include at least one of: a battery or a capacitor. The electric power supply and the at least one energy storage device may provide electric power to the first electric motor and the second electric motor.

A powered recliner chair system may include at least one first powered recliner chair assigned to a first control group. The at least one first powered recliner chair may be assigned to the first control group by at least one of: a first pin and shorting block, a first push button, or a first entry in a memory. The system may also include at least one second powered recliner chair assigned to a second control group. The at least one second powered recliner chair may be assigned to the second control group by at least one of: a second pin and shorting block, a second push button, or a second entry in a memory. The system may further include a first remote control input to reorient the at least one first powered recliner chair to a first orientation. The system may yet further include a second remote control input to reorient the at least one second powered recliner chair to a second orientation. The first orientation is independent of the second orientation. Data representative of the first remote control input and the second remote input may be transmitted via at least one of: a hardwired communication network, or a wireless network connection.

In another embodiment, a powered recliner chair may include at least one actuator having a first input and a second input. The actuator may be configured to reorient at least a portion of the powered recliner chair between an upright orientation and a reclined orientation in response to the first input. The actuator may be configured to reorient at least the portion of the powered recliner chair between the recline orientation and the upright orientation in response to the second input. The powered recliner chair may also include a control module having a local input, a remote input, a first output, and a second output. The first output may be connected to the first input. The second output may be connected to the second input. The local input may be connected to a chair occupant user interface that may enable a chair occupant to reorient the powered recliner chair while the chair occupant is seated in the chair. The remote input may be connected to a remote user interface that may be physically separate from the powered recliner chair and may enable a remote operator to reorient the powered recliner chair remote from the powered recliner chair.

In a further embodiment, a method for controlling a plurality of powered recliner chairs may include assigning at least one first powered recliner chair to a first control group, and assigning at least one second powered recliner chair to a second control group. The method may also include causing the at least one first powered recliner chair to reorient to a first orientation in response to a first remote control input. The method may further include causing the at least one second powered recliner chair to reorient to a second orientation in response to a second remote control input. The first orientation may be independent of the second orientation.

In yet another embodiment, a powered recliner chair system may include at least one of: a channel or an arm box; and at least one of: power wiring or data wiring. The at least one of: the power wiring or the data wiring may be routed through the at least one of: the channel or the arm box from a first powered recliner chair to a second powered recliner chair.

In yet a further embodiment, a powered recliner chair system may include a smart power supply. The smart power supply automatically may prohibit a second powered recliner chair from starting to reorient at the same time that a first chair starts to reorient.

In another embodiment, a powered recliner chair may include a battery, a power supply and an electric actuator motor. The power supply and the battery may be configured to provide a constant voltage to the electric actuator motor.

Further benefits and advantages of the present invention will become apparent after a careful reading of the detailed description with appropriate reference to the accompanying drawings.

BRIEF DESCRIPTION OF THE DRAWING

FIGS. 3A-D depict profile views of a left side of various example powered chair positions and orientations;

FIGS. 6A-C depict an example local control for a powered reclining chair;

FIGS. 16A-C depict an example mounting foot for use in a powered recliner chair assembly;

DETAILED DESCRIPTION

Figure 1:
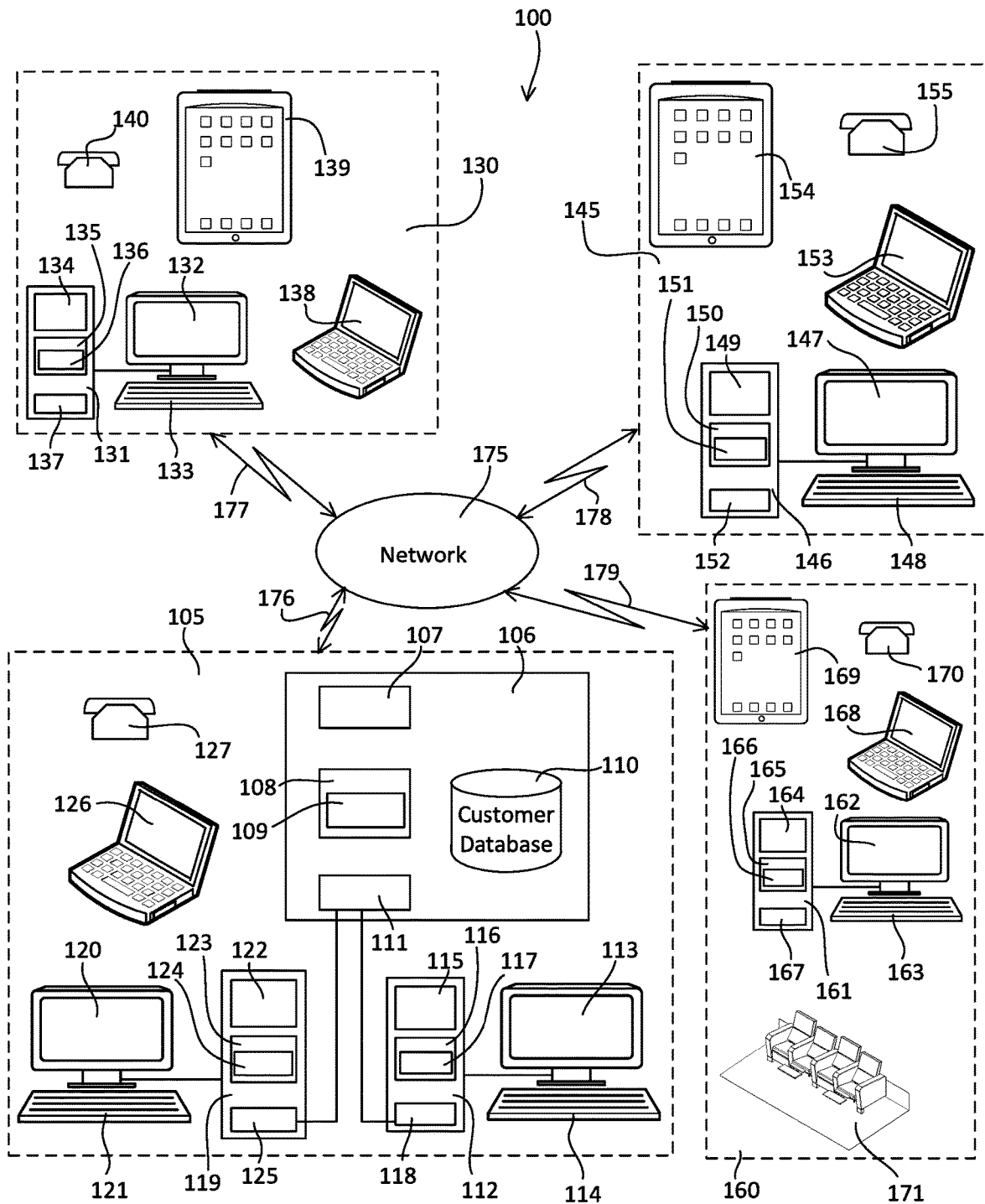
FIG. 1 depicts a high-level block diagram of a computer system for managing powered reclining chairs and venues that include powered chairs.

Powered recliner chairs, assemblies for use in the powered recliner chairs, and components for use in the assemblies are provided. Related systems and methods may enable remote operation of the powered recliner chairs, thereby, may lower cost of associated routine maintenance and associated venue cleaning.

For example, a remote master controller may control multiple powered chairs. The master controller may be controlled/operated by venue management to ensure safe and efficient operation of a plurality of powered recliner chairs. A master controller may contain security features such as a key lock, password protection, security handshake access, etc.

A local master controller may be, for example, located at an end of a row of chairs, within a section of chairs, or in a secured location selected by venue management. A remote master controller may be accessed wirelessly, via a hard wired connection, and/or locally. A master controller may interact with other systems (e.g., emergency systems, food/drink vending operations, venue lighting, maintenance, etc.) to improve venue operations. A master controller may have output(s)/circuit(s) to control chairs via a respective chair circuit. Alternatively, a group of chairs may be mechanically interconnected, such that a single master controller may control a group of chairs.

Controlling multiple chairs at once may save time in performing venue related tasks, such as cleaning or maintenance that require chairs to be extended and/or retracted. A controller, having multiple output circuits, may allow for pre-select chairs to be extended or retracted in a defined order to facilitate a desired task. For example, cleaning may be facilitated by have every other chair extended and/or retracted to provide an operator better access to an extended recliner chair in narrow rows.

Alternate patterns of chair positioning may be achieved to aid in different tasks. For example, an entire venue of chairs may automatically reorient at a prescribed time sequence with a single initiation. While a controller may have multiple outputs, any given controller may only have one output circuit and associated chairs may include individual ID's or addresses such that a communication protocol of the controller may allow control of an individual chair and/or banks of chairs.

Controller output(s) may control chairs wirelessly using available technologies such as Bluetooth®, and/or the controllers may be hard wired. Controller outputs may drive chair actuator(s) to respective internal stops, which may be settable by time such that chairs may be partially extended and/or retracted. Alternatively, or additionally, a controller may be sequenced to extend/retract chairs such that all chairs in a control group may be fully extended and/or retracted to a position before being extended and/or retracted to a desired position.

Master controller circuits may control a slave control unit at each powered chair allowing parallel operation of a local user control switch or a master control circuit. Possible scenarios for parallel chair control may include, but are not limited to, an operator control switch and the control circuit that plug into a slave controller, allowing control of a powered chair by the operator or by the master control box, an operator control switch and a control circuit may connect wirelessly to a slave controller, allowing control of a powered chair by the operator or by the master controller. A control circuit connected (wired or wirelessly) to a powered chair switch which may allow parallel operation. A control circuit connected (wired or wirelessly) to a powered chair actuator, which may allow parallel chair operation.

Power to a powered chair may be extended directly from a transformer to a master controller, and/or slave controller (s) as needed. A slave controller may be powered via respective input circuits or switch circuits as required.

Lights (e.g., light emitting diodes (LEDs)) may be incorporated into the individual chairs. For example, a light may be incorporated under each chair to illuminate an area of a floor in proximity to the respective chair. The systems and methods of the present disclosure may notify a remote location of activity (e.g., venue cleaning, chair occupancy, chair reorientation, etc.). This lighting may be turned on, for example, during cleaning and/or prior to and/or after a movie to provide entrance and/or exit lighting. Similar to remote chair reorientation, the lighting may be remotely controlled. For example, all powered recliner chairs may automatically return to an upright position (or any other predetermined position) and/or all chair lights may be turned on in an event of an emergency situation in the associated venue. Notably, notification of an emergency situation within a venue may be initiated via a central alarm (e.g., a manually operated fire alarm, an automatically operated fire alarm input, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, a computer, or any other portable electronic device that is communicatively coupled to a venue emergency notification system).

Sensors (e.g., a proximity sensor, a capacitance sensor, an ultra-sonic sensor, a light sensor, a touch sensor, a proximity switch, a limit switch, an electric current sensor, a pressure sensor, a strain gauge, a microphone, a motion sensor, a temperature sensor, a sonar sensor, etc.) may be incorporated into a respective chair for safety purposes. For example, a sensor may indicate that reorientation of a chair has been inhibited (in at least one direction) because an object (e.g., an individual, or an individual's possession) would be in jeopardy of being damaged. A capacitance sensor may be configured such that if an object (e.g., an individual, or an individual's possession) touches, or comes close to a predetermined, part of a respective chair (e.g., a metallic part of the chair), a capacitance value will change and the object may be detected. The systems and methods of the present disclosure may provide a remote indication of corresponding events.

Sensors and/or actuators may be incorporated into a chair that record chair reorientations and/or any other events associated with the respective chair. Associated data may be automatically recorded and logged to provide information for use with preventive chair maintenance and/or routine chair maintenance.

Actuator drive motor momentum may generate electrical energy after a chair limit switch is activated to stop chair movement. The actuator drive motor momentum may cause transients in associated electrical circuits. In order to reduce, or eliminate transients, an armature of an actuator motor may be shorted when turned off, a limit switch may be omitted and a "soft stop" may be implemented via, for example, a processor/software or a dedicated circuit, an isolation relay may be incorporated, a zener-diode may be incorporated in parallel with the an armature, a silicon control rectifier (SCR) may be incorporated in parallel with the an armature, twisted wires may be incorporated to eliminate inductance, etc.

A user interface may be provided that includes, for example, an overhead plan view map of a venue with each chair having alpha-numeric, color, graphical, etc. information related to respective chair status (e.g., need of maintenance, occupied, reclined, malfunction, number of reorientations since last maintenance, number of times occupied, length of time occupied, etc.). The information related to respective chair status may be, for example, historical status information, current status information, or predicative status information.

The remote control system may automatically control other lighting in a venue. The systems and methods of the present disclosure may automatically record cleaning times and dates. For example, positions of each chair may be recording along with a time stamp for each chair orientation and/or chair reorientation. Occupancy sensors may be incorporated into a chair and may be used to record dates and times associated with when the respective chair was occupied. A weight sensor may be included that records a weight of an individual occupying a respective chair. Activation of a remote chair control may open chairs that were occupied during a previous event, while chairs that were not occupied during the previous event may remain in an upright orientation.

Local controls, located on each powered recliner chair, may allow a chair occupant to reposition the powered reclining chair while seated in the respective chair. For example, a first button may be provided to reorient a powered reclining chair from an upright position toward a reclined position. A second button may be provided to reorient the powered reclining chair from a reclined position toward an upright position. Any number of buttons may be provided to reorient individual parts (e.g., a back, a lower lumbar support, a chair seat, an armrest, a foot rest, a calf rest, etc.) of a powered reclining chair independent of any other part. As described in more detail elsewhere herein, a powered reclining chair may be controlled via a cellular phone (e.g., a smartphone) implementing a powered reclining chair application.

Any given powered reclining chair may include speakers and/or a headphone connector plug. The speakers and/or the headphone connector may be hardwired to a venue sound system and/or may include a wireless connection to a venue sound system. Any given powered reclining chair may include a power and/or data connector, such that an occupant can plug in their cellular telephone and/or portable computer device. Thereby, an occupant may use the forgoing features to order a drink and/or food from a venue delivery. The occupant may be enabled to pay for their drinks and/or food via their own device and/or via an interface attached to the powered reclining chair. A theater control system may be interconnected with a theater speaker system (e.g., a speaker system as provided by QSC, a Qsys speaker system, etc.).

Turning to FIG. 1, a high-level block diagram of an example computer system 100 for managing powered reclining chairs is depicted. The computer system 100 may include a central venue operations center 105 and a powered reclining chair site 160 (e.g., a movie theater, a sports venue, an auditorium, an arena, a theater, or any other venue) communicatively couple via a communications network 175. The computer system 100 may also include a powered reclining chair technician site 145 and a powered reclining chair supplier site 130. While, for convenience of illustration, only a single central venue operations center 105 is depicted within the computer system 100 of FIG. 1, any number of central venue operations centers 105 may be included within the computer system 100. While, for convenience of illustration, only a single powered reclining chair site 160 is depicted within the computer system 100 of FIG. 1, any number of powered reclining chair sites 160 may be included within the computer system 100. Indeed, the computer system 100 may accommodate thousands of powered reclining chair sites 160. While, for convenience of illustration, only a single powered reclining chair technician site 145 is depicted within the computer system 100 of FIG. 1, any number powered reclining chairs of technician sites 145 may be included within the computer system 100. Any given powered reclining chair technician site 145 may be a mobile site. While, for convenience of illustration, only a single powered reclining chair supplier site 130 is depicted within the computer system 100 of FIG. 1, any number of powered reclining chair supplier sites 130 may be included within the computer system 100.

The communications network 175, any one of the network adapters 111, 118, 125, 137, 152, 167 and any one of the network connections 176, 177, 178, 179 may include a hardwired section, a fiber-optic section, a coaxial section, a wireless section, any sub-combination thereof or any combination thereof, including for example a wireless LAN, MAN or WAN, WiFi, WiMax, the Internet, a Bluetooth connection, a Zigbee internet connection, a Global Cache' internet connection, or any combination thereof. Moreover, a central venue operations center 105, a powered reclining chair site 160, a powered reclining chair technician site 145 and/or a powered reclining chair supplier 130 site may be communicatively connected via any suitable communication system, such as via any publicly available or privately owned communication network, including those that use wireless communication structures, such as wireless communication networks, including for example, wireless LANs and WANs, satellite and cellular telephone communication systems, etc.

Any given central venue operations center 105 may include a mainframe, or central server, system 106, a server terminal 112, a desktop computer 119, a laptop computer 126 and a telephone 127. While the central venue operations center 105 of FIG. 1 is shown to include only one mainframe, or central server, system 106, only one server terminal 112, only one desktop computer 119, only one laptop computer 126 and only one telephone 127, any given central venue operations center 105 may include any number of mainframe, or central server, systems 106, server terminals 112, desktop terminals 119, laptop computers 126 and telephones 127. Any given telephone 127 may be, for example, a land-line connected telephone, a computer configured with voice over internet protocol (VOIP), or a mobile telephone (e.g., a smartphone). Any given server terminal 112 may include a processor 115, a memory 116 having at least on set of computer-readable instructions stored thereon and associated with managing powered reclining chairs and venue operations 117, a network adapter 118 a display 113 and a keyboard 114. Any given desktop computer 119 may include a processor 122, a memory 123 having at least on set of computer-readable instructions stored thereon and associated with managing powered reclining chairs and venue operations 124, a network adapter 125 a display 120 and a keyboard 121. Any given mainframe, or central server, system 106 may include a processor 107, a memory 108 having at least on set of computer-readable instructions stored thereon and associated with managing powered reclining chairs and venue operations 109, a network adapter 111 and a customer (or client) database 110. The customer (or client) database 110 may store, for example, chair operation data and/or associated venue data, related to operation of the chair (or a group of chairs) within an associated venue. Any given lap top computer 126 may include a processor, a memory having at least on set of computer-readable instructions stored thereon and associated with managing powered reclining chairs and venue operations, a network adapter, a display and a keyboard. Any given telephone 127 may include a processor, a memory having at least on set of computer-readable instructions stored thereon and associated with managing powered reclining chairs and venue operations, a network adapter, a display and a keyboard.

Any given powered reclining chair supplier 130 may include a desktop computer 131, a lap top computer 138, a tablet computer 139 and a telephone 140. While only one desktop computer 131, only one lap top computer 138, only one tablet computer 139 and only one telephone 140 is depicted in FIG. 1, any number of desktop computers 131, lap top computers 138, tablet computers 139 and/or telephones 140 may be included at any given powered reclining chair supplier 130. Any given telephone 140 may be a land-line connected telephone or a mobile telephone (e.g., smartphone). Any given desktop computer 131 may include a processor 134, a memory 135 having at least on set of computer-readable instructions stored thereon and associated with managing powered reclining chairs and venue operations 136, a network adapter 137 a display 132 and a keyboard 133. Any given lap top computer 138 may include a processor, a memory having at least on set of computer-readable instructions stored thereon and associated with managing powered reclining chairs and venue operations, a network adapter, a display and a keyboard. Any given tablet computer 139 may include a processor, a memory having at least on set of computer-readable instructions stored thereon and associated with managing powered reclining chairs and venue operations, a network adapter, a display and a keyboard. Any given telephone 140 may include a processor, a memory having at least on set of computer-readable instructions stored thereon and associated with managing powered reclining chairs and venue operations, a network adapter, a display and a keyboard.

Any given powered reclining chair technician site 145 may include a desktop computer 146, a lap top computer 153, a tablet computer 154 and a telephone 155. While only one desktop computer 146, only one lap top computer 153, only one tablet computer 154 and only one telephone 155 is depicted in FIG. 1, any number of desktop computers 146, lap top computers 153, tablet computers 154 and/or telephones 155 may be included at any given powered reclining chair technician site 145. Any given telephone 155 may be a land-line connected telephone or a mobile telephone (e.g., smartphone). Any given desktop computer 146 may include a processor 149, a memory 150 having at least on set of computer-readable instructions stored thereon and associated with managing powered reclining chairs and venue operations 151, a network adapter 152 a display 147 and a keyboard 148. Any given lap top computer 153 may include a processor, a memory having at least on set of computer-readable instructions stored thereon and associated with managing powered reclining chairs and venue operations, a network adapter, a display and a keyboard. Any given tablet computer 154 may include a processor, a memory having at least on set of computer-readable instructions stored thereon and associated with managing powered reclining chairs and venue operations, a network adapter, a display and a keyboard. Any given telephone 155 may include a processor, a memory having at least on set of computer-readable instructions stored thereon and associated with managing powered reclining chairs and venue operations, a network adapter, a display and a keyboard.

Any given powered reclining chair site 160 may include a desktop computer 161, a lap top computer 168, a tablet computer 169 and a telephone 170. While only one desktop computer 161, only one lap top computer 168, only one tablet computer 169 and only one telephone 170 is depicted in FIG. 1, any number of desktop computers 161, lap top computers 168, tablet computers 169 and/or telephones 170 may be included at any given powered reclining chair site 160. Any given telephone 170 may be a land-line connected telephone or a mobile telephone (e.g., smartphone). Any given desktop computer 161 may include a processor 164, a memory 165 having at least on set of computer-readable instructions stored thereon and associated with managing powered reclining chairs and venue operations 166, a network adapter 167 a display 162 and a keyboard 163. Any given lap top computer 168 may include a processor, a memory having at least on set of computer-readable instructions stored thereon and associated with managing powered reclining chairs and venue operations, a network adapter, a display and a keyboard. Any given tablet computer 169 may include a processor, a memory having at least on set of computer-readable instructions stored thereon and associated with managing powered reclining chairs and venue operations, a network adapter, a display and a keyboard. Any given telephone 170 may include a processor, a memory having at least on set of computer-readable instructions stored thereon and associated with managing powered reclining chairs and venue operations, a network adapter, a display and a keyboard. While not shown in FIG. 1, any given set of powered reclining chairs 171, or individual powered reclining chair, may include a programmable controller (e.g., controller 860, 960a, 960b, 1060a, 1060b of FIGS. 8, 9A-B, 10A-B, respectively), a powered reclining chair local control (e.g., local control 270, 370, 470, 870, 970c, 1070c, 1170a-c of FIGS. 2, 3, 4, 8, 9c, 10c, 11A-11C, respectively), and/or any number of linear and/or rotary actuators (e.g., actuator 655, 660, 760, 960b, 1060b, 1065b of FIGS. 6, 7, 9B, 10B, respectively). Furthermore, while not shown in FIG. 1, any given set of powered reclining chairs 171, or individual powered reclining chair, may include a plurality of sensors (e.g., temperature sensor, pressure sensor, limit switch, motion sensor, strain gauge, position sensor, occupancy sensor, load sensor, etc.).

Figure 2A:
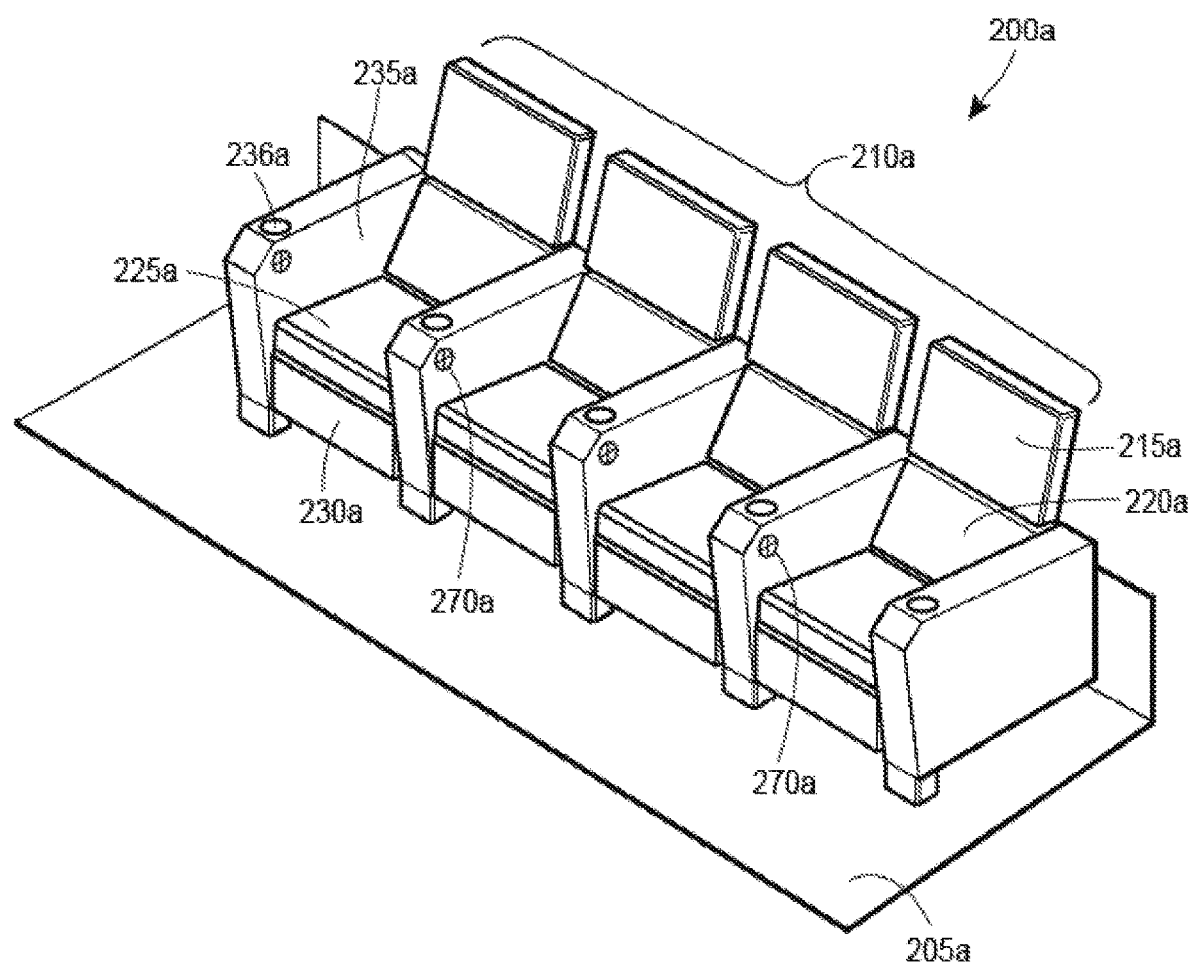
FIGS. 2A-2C depict perspective views of example powered reclining chairs in various orientations.
Figure 2B:
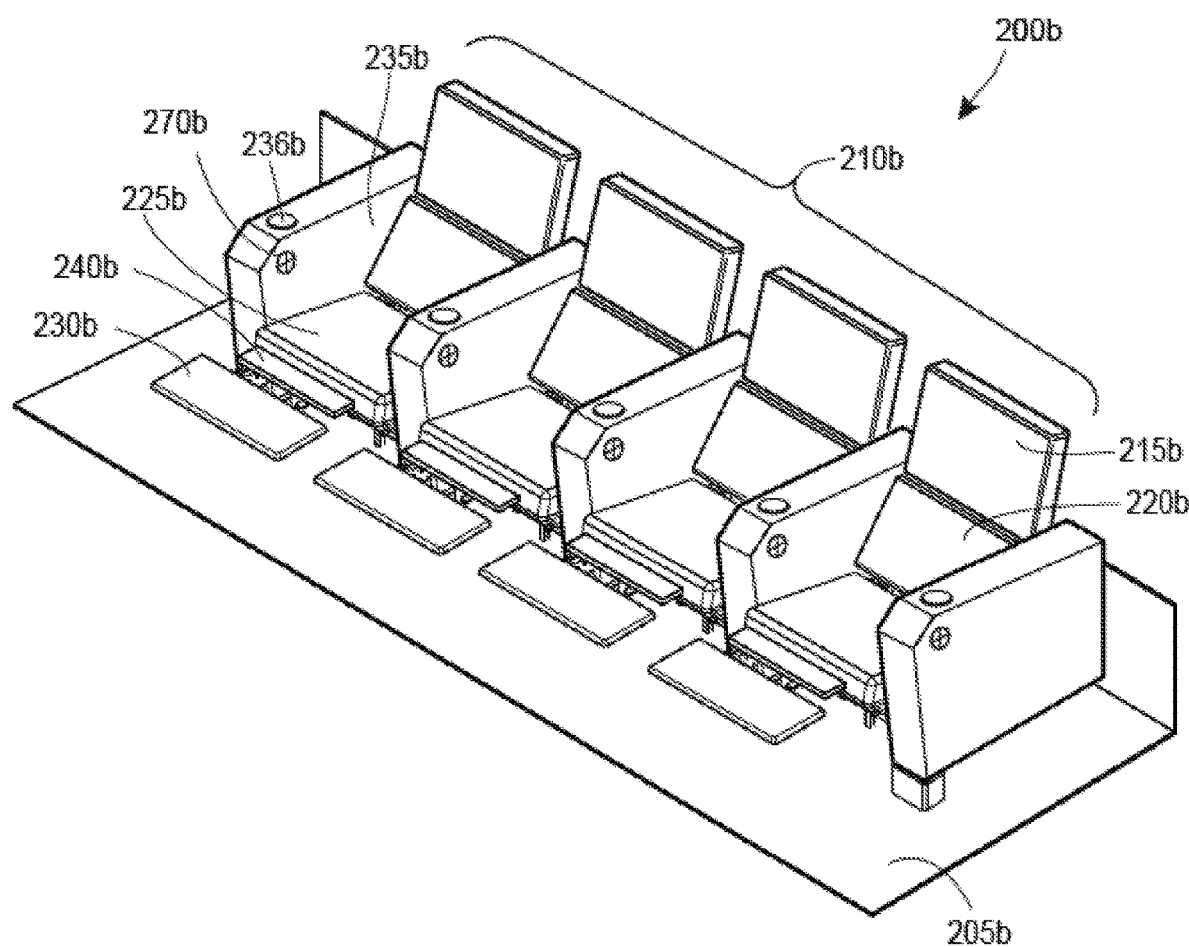
Figure 2C:
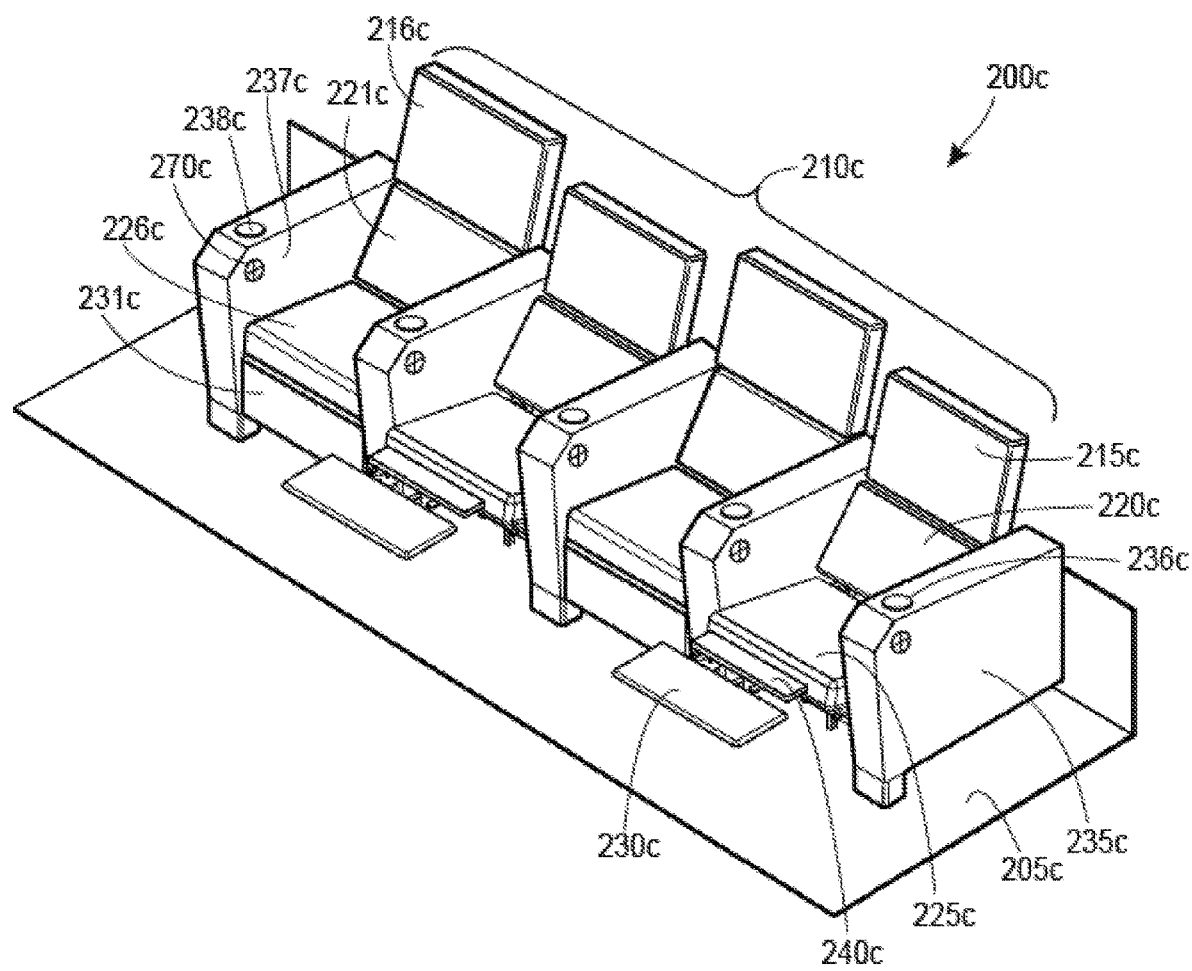

With reference to FIGS. 2A-C, a venue 200a may include a plurality of powered recliner chairs 210a supported on a base (e.g., a floor or a structure) 205a. The powered recliner chairs 210a may be similar to the powered chairs 171 of FIG. 1. Any given powered recliner chair may include a chair back 215a, a lower lumbar support 220a, a chair seat 225a, a foot-rest 230a, and an arm-rest 235a. While not shown in FIG. 2A, any given chair 210a may include a headrest, and the headrest may be reorientable independent of any other portion of the chair. The arm-rest 235a may include a cup-holder 236a and/or a chair controller 270a. The chair controller 270a may include, for example, a first button to reorient the respective chair between an upright position (e.g., a chair position as illustrated in FIG. 2A) and a reclined position (e.g., a chair position as illustrated in FIG. 2B). Alternatively, a chair controller 270a may include a plurality of functions, such as, individual buttons associated with independently controlling a headrest (not shown in FIG. 2A), a chair back 215a, a lower lumbar support 220a, a chair seat 225a, a foot-rest 230a, and/or an arm-rest 235a. Additionally, a chair controller 270a may include an audio output connector, a power output connector, lighting, a microphone, a speaker, etc. Alternatively, a chair controller 270a may be similar to a portable computing device (e.g., portable computing device 169 of FIG. 1) that facilitates a plurality of chair controls and/or venue interaction. A chair controller 270a may include a docking station and/or connection for a smartphone.

An associated powered recliner chair system may include at least one emergency power input selected from a group including: a battery, a capacitor, a photovoltaic cell, an internal combustion engine driven electrical generator, a wind-turbine driven electrical generator, or a hydrogen fuel cell. The at least one emergency power input may be configured to provide electric power to the powered recliner chair in an event of an associated venue power outage.

Any given powered recliner chair may be a modular assembly having, for example, a single plug in power connection. The powered recliner chair may be fully operable with only the plug in power connection connected to the modular powered recliner chair. Any given modular assembly may include one, two, or more chair assemblies, including, for example, associated RMS(s), associated arm box(e) s, associated chair seat(s), associated chair ottoman(s), associated chair back(s), associated headrest(s), associated electrical control(s), associated actuator(s), associated lighting, associated snack tray(s) and/or associated cub holder(s). As a particular example, a modular assembly may include a first chair assembly having a snack tray pivotally attached to a right-hand arm box and a second chair assembly having a snack tray pivotally attached to a left-hand arm box. A left-hand arm box of the first chair assembly may be fixed to a right-hand arm box of the second chair assembly. All local chair control and/or remote chair control may be, for example, communicated to a modular assembly via a wireless communication network. A modular assembly may be assembled at a manufacturing facility remote from an associated venue, delivered to the associated venue, set in place, and plugged into, for example, a electrical outlet.

Any given reclining chair may be installed such that a surface under the reclining chair is not coplanar with an adjacent walking surface. Examples of such an installation may include: an area directly behind the ottoman raised to make it harder for items to be reoriented (e.g., kicked or pushed) under the reclining chair; an area directly in front of the reclining chair's rear closure panel may be raised to make it harder for items to be moved (e.g., kicked or pushed) under the reclining chair; and an area under the recliner may be sloped to promote movement of items under the reclining chair moving out from under the reclining chair.

A venue 200b may include a plurality of powered recliner chairs 210b supported on a base (e.g., a floor or a structure) 205b. The powered recliner chairs 210b may be similar to the powered recliner chairs 210a of FIG. 2A. Any given powered recliner chair may include a chair back 215b, a lower lumbar support 220b, a chair seat 225b, a foot-rest 230b, and an arm-rest 235b. The arm-rest 235b may include a cup-holder 336 and/or a chair controller 270b. The chair controller 270b may include, for example, a first button to reorient the respective chair between an upright position (e.g., a chair position as illustrated in FIG. 2A) and a reclined position (e.g., a chair position as illustrated in FIG. 2B). Alternatively, a chair controller 270b may include a plurality of functions, such as, individual buttons associated with independently controlling a headrest (not shown in FIG. 2B), a chair back 215b, a lower lumbar support 220b, a chair seat 225b, a foot-rest 230b, and/or an arm-rest 235b. While not shown in FIG. 2B, any given chair 210b may include a headrest, and the headrest may be reorientable independent of any other portion of the chair. Additionally, a chair controller 270b may include an audio output connector, a power output connector, lighting, a microphone, a speaker, etc. Alternatively, a chair controller 270b may be similar to a portable computing device (e.g., portable computing device 169 of FIG. 1) that facilitates a plurality of chair controls and/or venue interaction. A chair controller 270b may include a docking station and/or connection for a smartphone.

With reference to FIG. 2C, a venue 200c may include a plurality of powered recliner chairs 210c supported on a base (e.g., a floor or a structure) 205c. The powered recliner chairs 210c may be similar to the powered recliner chairs 210b of FIG. 2B. Any given powered recliner chair may include a chair back 215c, a lower lumbar support 220c, a chair seat 225c, a foot-rest 230c, and an arm-rest 235c. While not shown in FIG. 2C, any given chair 210c may include a headrest, and the headrest may be reorientable independent of any other portion of the chair. The arm-rest 235c may include a cup-holder 236c and/or a chair controller 270c. The chair controller 270c may include, for example, a first button to reorient the respective chair between an upright position (e.g., a chair position as illustrated in FIG. 2A) and a reclined position (e.g., a chair position as illustrated in FIG. 2B). Alternatively, a chair controller 270c may include a plurality of functions, such as, individual buttons associated with independently controlling a headrest (not shown in FIG. 2C), a chair back 215c, a lower lumbar support 220c, a chair seat 225c, a foot-rest 430, and/or an arm-rest 235c. Additionally, a chair controller 270c may include an audio output connector, a power output connector, lighting, a microphone, a speaker, etc. Alternatively, a chair controller 270*c* may be similar to a portable computing device (e.g., portable computing device 169 of FIG. 1) that facilitates a plurality of chair controls and/or venue interaction. A chair controller 270*c* may include a docking station and/or connection for a smartphone. While remote control of reclining chair extend/retract functions may be performed, any given remote control function may similarly be used to control other functions such as massagers, heaters, cooling devices, etc.

Any given reclining chair system may include blower and/or vacuum features, which may aid in cleaning under reclining chairs. Examples of blower and/or vacuum features may include, but are not limited to: systems located in a reclining chair arm box; systems located in a reclining chair recliner mechanism; systems located in an associated floor area, or rear riser(s).

Turning to FIGS. 3A-3D, powered chairs 300*a-d* may include a chair back 315*a-d*, a chair seat 325*a-d*, a foot-rest 330*a-d*, and an arm-rest 335*a-d*. The powered chairs 300*a-d* may be similar to the powered chairs 171, 210*a*, 210*b*, 210*c* of FIGS. 1, 2A, 2B and 2C, respectively. As illustrated in FIGS. 3A and 3D, a chair back 315*a*, 315*d*, a chair seat 325*a*, 325*d*, a foot-rest 330*a*, 330*d*, and/or an arm-rest 335*a*, 335*d* may be repositioned throughout a plurality of various positions, shown as dashed lines.

Any given chair 210*a*, 210*b*, 210*c*, 500*a-d* may be configured as a powered reclining/rocking chair and may include a support frame, a seat frame pivotally mounted on the support frame, a rotary actuator mounted between the support frame and the seat frame to drive the seat frame to move relative to the support frame, a chair back pivotally mounted on the seat frame, a linear actuator mounted between the seat frame and the chair back to drive the chair back to move relative to the seat frame, a head support mounted on the chair back, two link mechanisms mounted between the chair seat and the chair back to move in concert with the chair back, and a foot support mounted between the two link mechanisms to move in concert with the two link mechanisms. The seat frame may have an upper end provided with two opposite pivot ears and a lower end provided with a plurality of castors. The seat frame may have a rear end provided with a stop portion.

The powered reclining/rocking chair may further include two suspension arms each secured on the seat and each pivotally mounted on the support frame, and at least two reinforcing members located between the seat and the two suspension arms respectively to enhance the structural strength of the seat. Each of the two suspension arms extends upwardly from the seat and has an upper end provided with a pivot portion pivotally mounted on a respective one of the pivot ears of the support frame.

The seat may be pivotable relative to the support frame in a pendulum manner. The seat and has an upper portion and a lower portion. The upper portion of the seat may include a front end provided with two first through holes and second through holes and a rear end provided with two through bores. The lower portion of the seat may include a side provided with a support base.

The rotary actuator may include a drive member secured on the lower portion of the seat, a rotation member rotatably mounted on the drive member, and a drive lever having a first end pivotally connected with the rotation member to move in concert with the rotation member and a second end pivotally connected with the stop portion of the support frame. The drive member of the rotary actuator is a drive motor to rotate the rotation member. The rotation member of the rotary actuator has a disk shape. The first end of the drive lever is arranged on the rotation member eccentrically and is deviated from a central shaft of the rotation member.

The two link mechanisms may be located at two opposite sides of the seat symmetrically. Each of the two link mechanisms may have a mediate portion provided with a first pivot hole pivotally connected with a respective one of the first through holes of the seat and a second pivot hole pivotally connected with a respective one of the second through holes of the seat. Each of the two link mechanisms has a first end provided with a driven portion that is movable in concert with the backrest and a second end provided with a support portion that is movable in concert with the driven portion. The foot support is mounted between the support portions of the two link mechanisms.

The backrest has a lower end provided with two pivot bores each pivotally connected with a respective one of the through bores of the seat and two push portions each pivotally connected with the driven portion of a respective one of the two link mechanisms. Each of the two pivot bores of the backrest is located above each of the two push portions. The backrest has an upper end provided with two mounting sleeves. The backrest has a side provided with a drive arm which is substantially V-shaped.

The linear actuator has a first portion pivotally connected with the support base of the seat and a second portion retractably mounted in the first portion and pivotally connected with the drive arm. Preferably, the drive arm has an upper end secured on the backrest and a lower end pivotally connected with the second portion of the linear actuator. Thus, when the second portion of the linear actuator is moved relative to the first portion of the linear actuator, the drive arm is moved in concert with the second portion of the linear actuator to drive the backrest to pivot relative to the seat.

The head support may include a resting cushion and two adjusting rods each mounted on a bottom of the resting cushion and each adjustably mounted in a respective one of the mounting sleeves of the backrest.

In adjustment, when the second portion of the linear actuator is moved toward the first portion of the linear actuator, the drive arm is moved in concert with the second portion of the linear actuator to drive the backrest to pivot downward relative to the seat, so that the pivot bores of the backrest are pivoted about the through bores of the seat, and the backrest is moved rearward and downward. At the same time, when the backrest is moved relative to the seat, the driven portion of each of the two link mechanisms is pushed by the respective push portion of the backrest to drive each of the two link mechanisms to pivot forward relative to the seat, so that the support portion of each of the two link mechanisms is moved forward and upward, and the foot support is also is moved forward and upward until the foot support is disposed at a horizontal state. In such a manner, the inclined angle of the backrest and the foot support is adjusted by operation of the linear actuator according to the user's requirement so as to provide a comfortable sensation to the user.

On the contrary, when the second portion of the linear actuator is moved outward relative to the first portion of the linear actuator, the drive arm is moved in concert with the second portion of the linear actuator to drive the backrest to pivot upward relative to the seat, so that the pivot bores of the backrest are pivoted about the through bores of the seat, and the backrest is moved forward and upward. At the same time, when the backrest is moved relative to the seat, the driven portion of each of the two link mechanisms is pulled by the respective push portion of the backrest to drive each of the two link mechanisms to pivot rearward relative to the seat, so that the support portion of each of the two link mechanisms is moved rearward and downward, and the foot support is also is moved rearward and downward so as to fold the foot support.

In operation, the drive member of the rotary actuator may be secured on the lower portion of the seat, the first end of the drive lever is pivotally connected with and arranged on the rotation member eccentrically, and the second end of the drive lever is limited by the stop portion of the support frame, so that when the rotation member is rotated by the drive member, the rotation member is driven by the drive lever to move relative to the support frame, and the drive member is moved by the rotation member to drive the seat to move relative to the support frame. At this time, each of the two suspension arms secured on the seat is pivotally mounted on the support frame, so that the seat is pivoted relative to the support frame by operation of the rotary actuator. In such a manner, the seat is pivoted rightward and leftward so that the seat is pivoted reciprocally relative to the support frame in a pendulum manner.

The powered reclining/rocking chair further may further comprise an electrically control device connected with the rotary actuator and the linear actuator to control operation of the rotary actuator and the linear actuator, an overload protection device connected with the electrically control device to shut an electric power to the electrically control device when an overload occurs, and a timer connected with the electrically control device to automatically preset the operation time of the electrically control device. In such a manner, the linear actuator is controlled by the electrically control device to adjust the inclined angle of the backrest and the foot support, and the rotary actuator is controlled by the electrically control device to drive the seat to pivot relative to the support frame in a pendulum manner.

The resting cushion of the head support may include a main adjusting bracket and a secondary adjusting bracket pivotally mounted on the main adjusting bracket. The main adjusting bracket of the resting cushion is provided with a main toothed portion. The secondary adjusting bracket of the resting cushion is provided with a secondary toothed portion adjustably meshing with the main toothed portion of the main adjusting bracket. Thus, the secondary adjusting bracket of the resting cushion is pivoted relative to the main adjusting bracket of the resting cushion to adjust the inclined angle of the head support. Each of the adjusting rods of the head support is provided with a plurality of adjusting detents adjustably mounted in the respective mounting sleeve of the backrest to adjust the height of the head support.

Accordingly, the rotary actuator is controlled by the electrically control device to drive the seat to pivot relative to the support frame reciprocally in a pendulum manner so that the seat is pivoted relative to the support frame automatically, and the user needs not to rock the seat manually. In addition, the linear actuator is controlled by the electrically control device to adjust the inclined angle of the backrest and the foot support according to the user's requirement so as to provide a comfortable sensation to the user.

Any given chair 210a, 210b, 210c, 300a-d may be configured as a powered lift chair and may include a lift base assembly and a chair support frame. The lift base assembly supports the chair in a normal seated position. The lift base assembly lifts the chair to a tilted position that makes it easier for a person to enter or leave the chair. Any of a wide variety of chair constructions can be used with the lift base assembly. The chair may include a frame, side arms, a seat back, and a seat portion. The seat back may recline in response to pressure from the back of an occupant and the seat portion may move simultaneously with the seat back. The chair also may include an extensible leg rest assembly. Additionally, the seat back and/or the seat portion may include a heat pad and/or a cooling device. The heat pad and/or cooling device may be selectively energized to provide heat and/or cooling to person using the chair.

An exemplary lift base assembly may include a stationary, rectangular bottom frame member that rests on the floor and a movable, rectangular upper frame member on which the chair is removably but securely attached by suitable fasteners. The bottom frame member may include left and right hand side members, respectively, that are rigid with a front cross member. Side members may have suitable pads that engage the surface of a floor. Upper frame member may include left and right side members that are rigid with a rear cross member. A linear actuator may nest inside of the bottom from member, the upper frame member, and the chair seat.

Alternatively, a lift mechanism may include a power-assist means, such as an electric motor, a rotary screw shaft, and an internally threaded sleeve or nut. The motor may be selectively operable to rotate the screw shaft in either a first direction or second direction. Both the motor and the screw shaft can arcuately swing up and down in a generally vertical plane about a pivot. The screw shaft extends through and drives the sleeve so that the sleeve moves forwardly or rearwardly along the length of the screw shaft upon rotation of the screw shaft in one of the first and second directions. In the seated or lowered position of the chair, the sleeve may be positioned near the front or outer end of the screw shaft. Lifting of the chair is accomplished by energizing the motor to rotate the screw shaft in a direction that pulls the sleeve toward the motor. To lower the chair, rotation of the screw shaft is reversed, which draws the sleeve away from the motor. An exemplary lift base assembly and lift mechanism are described in more detail in U.S. Pat. No. 5,061,010, assigned to La-Z-Boy Chair Co., which is hereby incorporated by reference in its entirety. Although the above lift base assembly and lift mechanism are described for illustrative purposes, it is to be understood that other suitable lift base assemblies and lift mechanisms may be used with the present invention as it is described below.

An electrical control system for the motor may include two-prong attachment plug that fits into an electrical receptacle in the general proximity to where the lift base assembly is used for providing electrical current to operate the lift assembly. Alternatively, the attachment plug may be a three-prong grounding plug that fits into a grounding-type receptacle. The plug may include an insulated cable or power cord of suitable length. The electrical control system also may include a transformer, an electrical controller, a control wand, heating pads, cooling device, massage device, a motor actuator, and various male and female socket connectors for connecting the components of the electrical control system as described below.

The transformer may include a power cord with three current-carrying inductors that terminate in a male socket connector. The male socket mates with a female socket connector so that the transformer is electrically connected to the electrical controller through a power cord. The electrical controller further may include power cords. The power cord may include four current-carrying conductors that terminate in a male socket connector and a female socket connector. The power cord may include eight current-carrying conductors that terminate in a female socket connector. The power cord may include five current-carrying conductors that terminate in a male socket connector. The socket connectors may mate with counterpart socket connectors to electrically connect the electrical controller to the control wand, the heating pads, cooling device, massage device, and the motor actuator.

The transformer may receive AC power from a standard electrical receptacle via the power cord. The transformer may step down the input power, for example 120 volts of AC, to an output power. For example, the transformer outputs an AC voltage of 12 volts and a constant DC voltage of 27 volts. The transformer may include batteries, such as 9 volt batteries, which may provide backup power to the electrical system in the event of a power failure. The heating pads, cooling devices, and message devices may be powered by the 12 volts AC and the motor actuator may be powered by the 27 volts DC.

The electrical controller may receive both the 12 volts AC and the 27 volts DC from the transformer. The electrical controller may distribute the power from the transformer to the heating pads, cooling devices, massage device, the motor actuator, and the control wand. The electrical controller may direct the 12 volts AC to the heating pads, cooling device, and/or massage device, and may direct the 27 volts DC to the motor actuator. The control wand may also receive power from the 27 volt DC supply.

The control wand may include a control cord for receiving power from the electrical controller. The control wand may be mounted to a side arm of the chair or, alternatively, held and operated by a person using the chair. Additionally, the control cord communicates commands from the control wand to the electrical controller. For example, the control wand may include indicator means, such as an LED array, and one or more control switches. The user may control the various operations of the chair with the switches, such as lifting and lowering functions, reclining functions, and "on" or "off" status of the heating pads, cooling devices, message devices, etc. When the user operates the switches to lift the chair, electrical power is supplied to the motor actuator to rotate the screw shaft, rotary actuator, or linear actuator in a direction to cause the chair to lift. When the user operates the switches to lower the chair, electrical power is supplied to the motor actuator to rotate the screw shaft, rotary actuator, or linear actuator in the opposite direction for lowering the chair. The user may view status information for the chair at the indicator means, such as "on" or "off" status and/or relative temperature indicators of the heating pads and/or cooling devices.

The control wand may be powered by the 27 volt DC supply. However, the control wand does not directly switch the current load of the motor actuator. Instead, the control wand switches relays located in the electrical controller in order to control power to the motor actuator. In this manner, the high current draw of the motor actuator does not pass through the control wand. In an alternative embodiment, the indicator means and/or the switches are located directly on the chair rather than on the control wand. For example, the indicator means and switches may be located on a side arm of the chair.

The motor actuator may receive electrical power from the electrical controller through the electrical connection of the power cord, the male socket connector, and the female socket connector. The motor actuator may provide rotational power to the screw shaft according to the electrical power received from the electrical controller. For example, if the user operates the switches to lift the chair, the motor actuator receives electrical power of a first polarity to rotate the screw shaft in a first direction. If the user operates the switches to lower the chair, the motor actuator receives electrical power of a second polarity to rotate the screw shaft, the rotary actuator, or linear actuator in a second direction.

The rate at which the motor actuator lifts and lowers the chair may be directly dependent upon the DC voltage received from the transformer through the electrical controller. In the preferred embodiment, the DC voltage is 27 volts. The current drawn by the motor actuator, however, may be proportional to the load upon the chair. If the chair is empty, the motor actuator requires relatively low current. If the chair is loaded with a person, the motor actuator requires higher current. Conventionally, motor actuators receive a particular power input to control the lift and lowering functions. As the load upon the chair increases, the motor actuator draws more current. Because power is a product of voltage and current (P=VI), the voltage of the motor actuator decreases proportionately as current draw increases. As voltage decreases, the lift rate of the chair decreases proportionately. Therefore, it can be seen that the lift and/or lower rates of conventional power-assisted chairs were extremely dependent upon the load on the chair at any particular time.

In contrast, the transformer of the present invention is operable to output a generally constant DC voltage regardless of the current draw from the motor actuator. One such transformer available is InSeat Solutions' AC/DC adaptor, model number 15541 Class II power transformer, which outputs a 12 volt AC supply and a 27 volt DC supply. If the motor actuator draws more current due to a heavier load upon the chair, the transformer adjusts automatically to maintain a generally constant DC voltage output of 27 volts to the motor actuator. The motor actuator receives a constant voltage regardless of the current draw. Therefore, the motor actuator may provide constant rotational power to the screw shaft, rotary actuator, or linear actuator. In this manner, the power-assisted chair of the present invention may provide generally constant lift and lowering rates independent of the load on the chair. Further, the power-assisted chair of the present invention is able to provide constant lift and lowering rates for loads up to 500 hundred pounds with a single motor.

The required time to complete a full lift or lower cycle is dependent upon the lift or lower rate of the motor, and therefore is further dependent upon the voltage output of the transformer. Because the DC voltage supply of the transformer is generally constant, lift and lower cycles will be consistent regardless of the weight of the person using the chair. For example, slight voltage drops due to extremely heavy loads may cause the lift cycle to have a slightly longer duration, and the lower cycle to have a slightly shorter duration. Although cycle times may vary slightly due to factors such as increased heat due to higher current draw and other process variables, a person using the chair may expect generally uniform lift and lower cycle times.

Additionally, the electrical control system is operable to selectively control power to the heating pads, cooling devices, and/or massage devices during lift and lower operations of the motor actuator, which allows the transformer to maintain a Class II rating. For example, if the user operates the switches to lift or lower the chair while the heating pads, cooling devices, and/or message devices are "on," the electrical controller may turn off power to the heating pads, cooling devices and/or massage devices. Once the lift or lower operation is complete, the electrical controller will restore power to the heating pads, cooling devices and/or massage devices. In this manner, the electrical controller directs power solely to the motor actuator during lift and lower operations, which allows the motor actuator to receive the maximum power available.

The electrical control system may include other electrical components, such as a vibratory massage device, an air pillow massage device, or other devices as are known in the art. The additional devices may operate on the 12 volt AC supply in a fashion similar to the heating pads, cooling devices and/or massage devices. Correspondingly, the electrical controller may disable power to the additional devices during motor lift and lower operations.

An electrical power supply may be configured as "smart" power supply such that, for example, a maximum power, drawn from a power supply, may be automatically limited by controlling a number of recliner chairs that can be operated at any given time. For example, when a power supply is being operated near a maximum limit, recliner chairs, that are connected to the power supply and not yet being operated, are disabled until a power draw from an associated power supply is reduced (e.g., operation of a previously operated recliner chair is ceased). Alternatively, or additionally, operation of a previously operated recliner chair may be automatically suspended if, for example, an occupant of another recliner chair, that is connected to the power supply, initiates return of the chair to an upright position. Accordingly, if an occupant of a recliner chair needs to exit the chair for any reason (e.g., an emergency) that chair will operate and any other chair that is being reclined may cease to operate. Alternatively, or additionally, any given powered recliner chair within a venue, or all powered recliner chairs within the venue, may be configured to automatically move to any predetermined position (e.g., a fully upright position, a fully reclined position, or any position there between) in the event of an emergency. Notably, notification of an emergency situation within a venue may be initiated via a central alarm (e.g., a manually operated fire alarm, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, or any other portable electronic device that is communicatively coupled to a venue emergency notification system).

Similarly, operation of a group of recliner chairs, that are connected to a common power supply, may be automatically staggered such that any given sub-group of recliner chairs may be automatically delayed (e.g., to reduce inrush current—10 mS delay), or operation may be alternated, such that a maximum power limit of the associated power supply is not exceeded. Thereby, a group of recliner chairs, that are connected to a smart power supply, may be automatically controlled to not exceed a power supply maximum.

A "smart power supply system" may include a power supply (e.g., transformer 796a, 796c, 796d) and a controller (e.g., controller 490a, 490b, 590a, 590b, 1300a,b, 1700a-h, j-n,p-r), and may include controlling/activating/deactivating any given recliner chair(s) by communicating between chairs, monitoring chair(s) status, (e.g., such things as recline position and travel direction) and may predict/anticipate chair(s) power requirements including accessories such as heat, message, etc. to enable/disable/prioritize recliner chair power consumption. Such a smart power supply system may control inherent power peaks, that may occur during normal operation, or less critical action in a manner to minimize power consumption while optimizing associated recliner chair user experience.

Additionally, or alternatively, a controller (e.g., controller 490a, 490b, 590a, 590b, 1300a,b, 1700a-h,j-n,p-r) may include controlling/activating/deactivating any given actuator within a given recliner chair or group of recliner chair(s). For example, a controller may include at least one remote control input that may, for example, initiate a sequence of operation of associated actuators. In a particular example, a chair assembly may include a first actuator configured to reorient a chair back, a second actuator configured to reorient a chair seat, a third actuator configured to reorient a chair foot rest (an "ottoman"), a fourth actuator configured to reorient a chair head rest, a fifth actuator configured to reorient (e.g., lift) the chair assembly, a combination thereof, or any sub-combination thereof. The chair assembly may also include a local control associated with each of the actuators and/or a single local control that activates any combination of the actuators in response to a user activating the local control. In any event, when a use activates the remote control (or the remote control is activated automatically, e.g., a venue emergency system, a venue ticketing system, a venue cleaning system, etc.), a group of actuators within a given chair, or group of chairs, may sequentially reorient respective chair portions (e.g., a chair back, a chair seat, a chair foot rest, a chair head rest, a chair lift, etc.). The controller may be configured such that activation of a local control may override activation of a remote control. Similarly, a chair controller may include at least one chair safety sensor input, and the controller may be configured to inhibit reorientation of at least a chair portion (e.g., a chair back, a chair seat, a chair foot rest, a chair head rest, a chair lift, etc.) in at least one direction when the respective chair safety sensor input is activated.

As an example, a controller may be configured such that activation of a remote control first reorients a foot rest to a closed orientation, next reorients a chair back to an upright orientation, and then reorients a chair seat to a desired orientation. Activation of a local control and/or a chair safety sensor may inhibit reorientation of at least a respective portion of a chair or group of chairs.

A controller may include a local control input that, when activated by a chair occupant, sequentially reorients portions of the respective chair (e.g., a chair back, a chair seat, a chair foot rest, a chair head rest, a chair lift, etc.). Thereby, when the chair occupant activates the local control (either momentarily or sustained), the individual chair portions sequentially reorient accordingly.

Figure 4A:
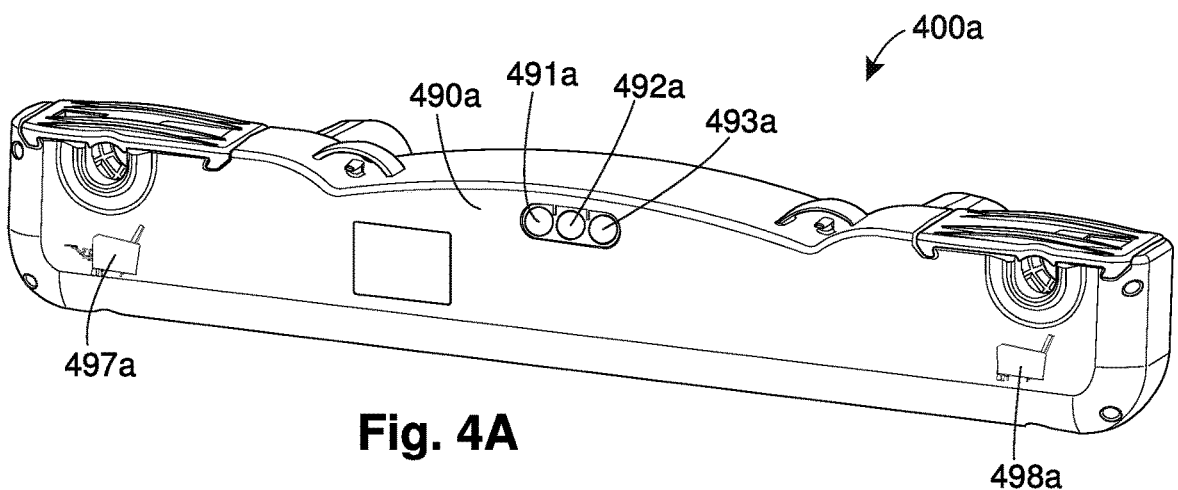
FIGS. 4A-C depict an example controller assembly for a powered reclining chair.
Figure 4B:
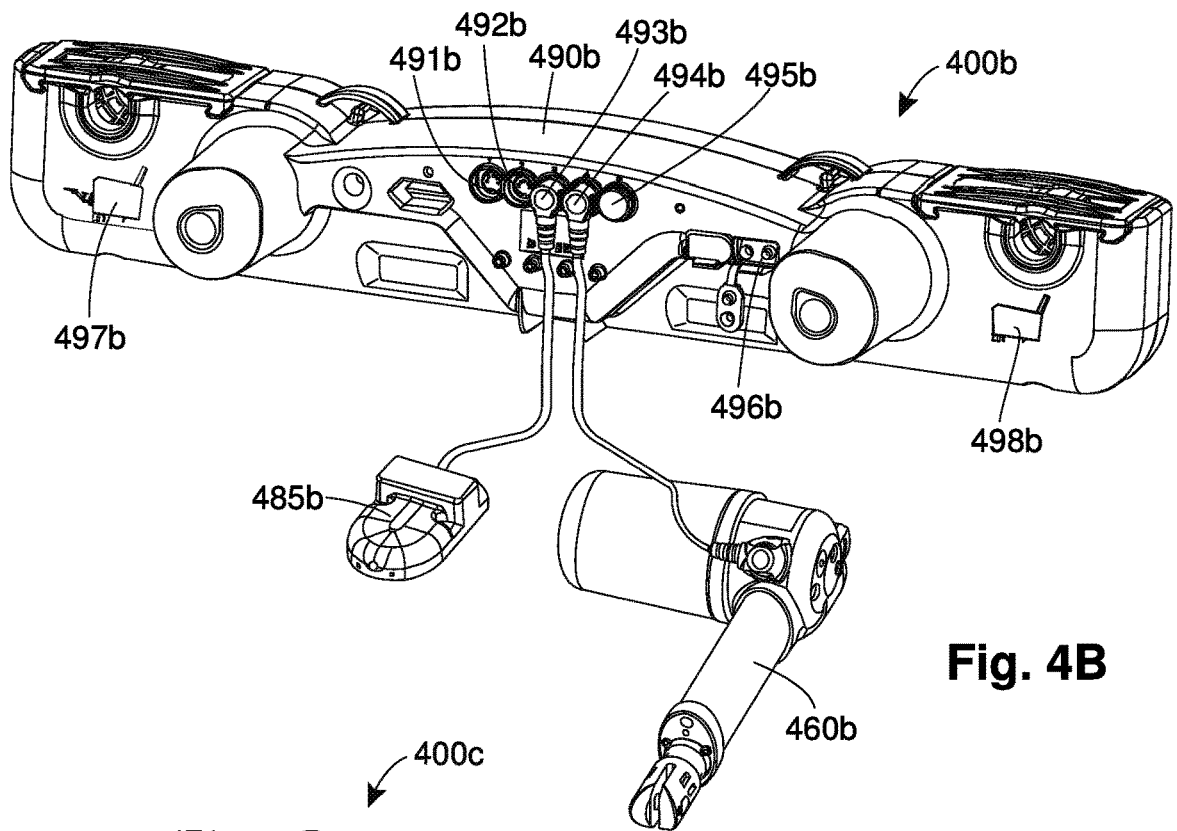
Figure 4C:
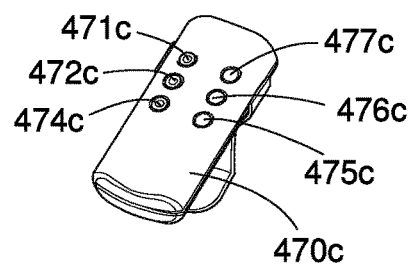

Turning to FIGS. 4A-4C, a powered chair control assembly 400a-c may include a controller (e.g., a programmable logic controller (PLC), an application specific integrated circuit (ASIC), a discrete component electrical circuit, a field-programmable gate array (FPGA), a micro-controller, etc.) 490a, 490b, a local controller 470c, a wireless data receiver 485b, and an actuator 460b. The actuator 460b may be either a linear actuator or a rotary actuator. The local controller 470c may be similar to the local controller 270a, 270b, 270c of FIGS. 2A-C, respectively. The local controller 470c may include, for example, a chair back upright button 471c, a chair back recline button 477c, a chair seat upright button 472c, a chair seat upright button 476c, a chair foot-rest upright button 474c, and/or a chair foot-rest recline button 475c. The chair controller 470c may include, for example, a first button to move the respective chair between an upright position (e.g., a chair position as illustrated in FIG. 2A) and a reclined position (e.g., a chair position as illustrated in FIG. 2B). Alternatively, a chair controller 470c may include a plurality of functions, such as, individual buttons associated with independently controlling a chair back 215, a lower lumbar support 220, a chair seat 225, a foot-rest 230, and/or an arm-rest 235. Additionally, a chair controller 470c may include an audio output connector, a power output connector, lighting, a microphone, a speaker, etc. Alternatively, a chair controller 470*c* may be similar to a portable computing device (e.g., portable computing device 169 of FIG. 1) that facilitates a plurality of chair controls and/or venue interaction.

The controller 490*a*, 490*b* may include a reclined chair position indicator 497*a*, 497*b* and/or an upright chair position indicator 498*a*, 498*b*. The controller 490*a*, 490*b* may further include a first connector receptacle 491*a*, a second connector receptacle 492*a*, a third connector receptacle 493*a*, a forth connector receptacle 491*b*, a fifth connector receptacle 492*b*, a sixth connector receptacle 493*b*, a seventh connector receptacle 494*b*, and/or an eighth connector receptacle 495*b*. The controller 490*a*, 490*b* may also include a battery 496*b*. While not shown in FIGS. 4A or 4B, the controller 490*a*, 490*b* and/or the actuator 460*b* may include a plurality of sensors (e.g., limit switches, proximity sensors, motion sensors, temperature sensors, occupancy sensors, pressure sensors, strain gauges, etc.) and/or lighting (e.g., light emitting diodes).

Figure 5A:
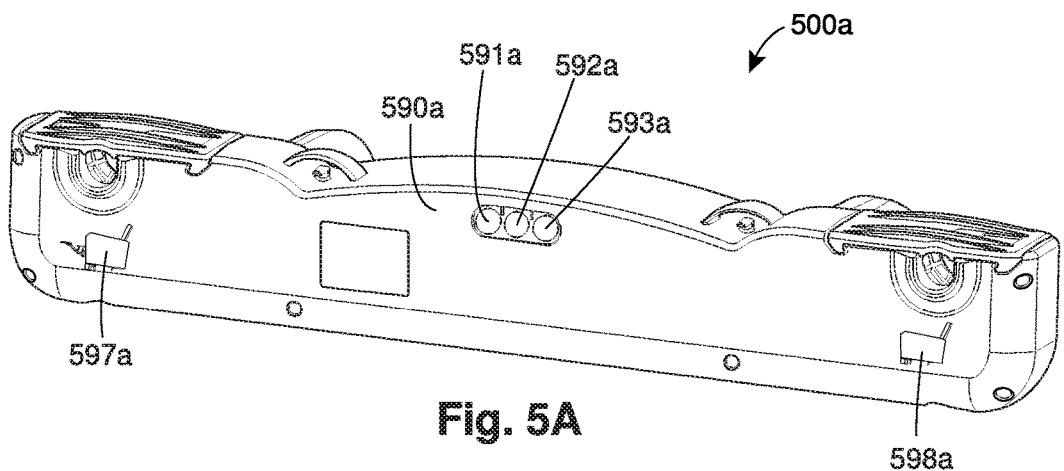
FIGS. 5A-C depict an example controller assembly for a powered reclining chair.
Figure 5B:
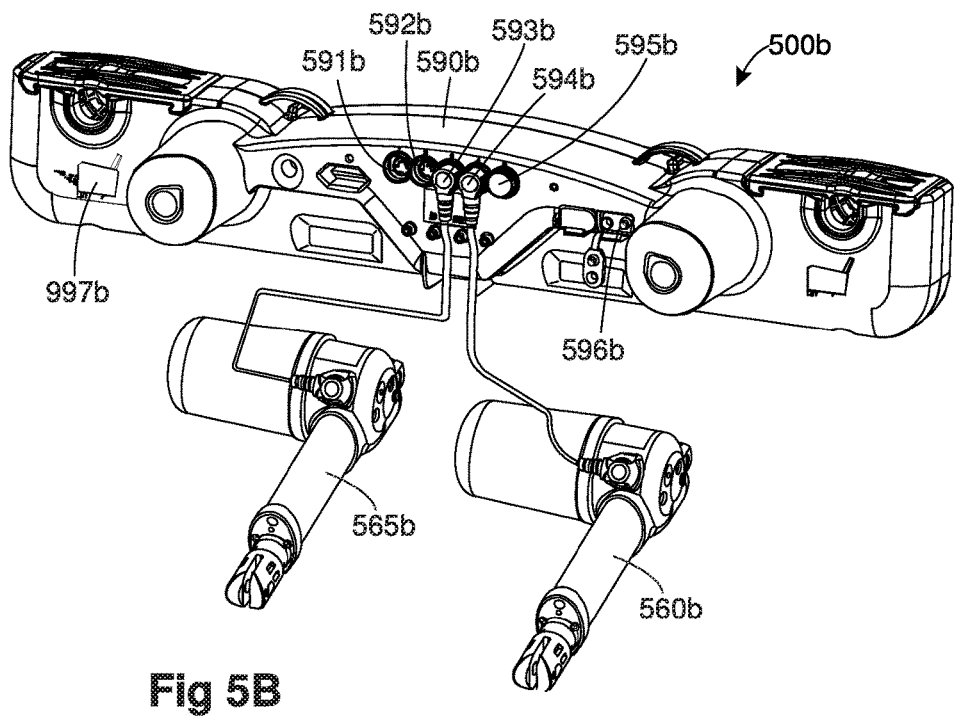
Figure 5C:
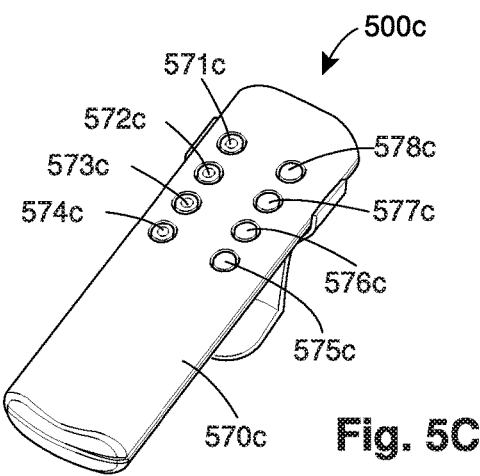

With reference to FIGS. 5A-5C, a powered chair control assembly 500*a-c* may include a controller (e.g., a programmable logic controller (PLC), an application specific integrated circuit (ASIC), a discrete component electrical circuit, a field-programmable gate array (FPGA), a microcontroller, etc.) 590*a*, 590*b*, a local controller 570*c*, a wireless data receiver 585*b*, a first actuator 560*b*, and a second actuator 565*b*. The first actuator 560*b* and/or the second actuator 565*b* may be either a linear actuator or a rotary actuator. The local controller 570*c* may be similar to the local controller 270*a*, 270*b*, 270*c* of FIGS. 2A-C, respectively. The local controller 570*c* may include, for example, a chair back upright button 571*c*, a chair back recline button 578*c*, a chair seat upright button 572*c*, a chair seat upright button 577*c*, a chair foot-rest upright button 573*c*, a chair foot-rest recline button 576*c*, a head-rest upright button 574*c*, and/or a head-rest recline button 575*c*. The chair controller 570*c* may include, for example, a first button to move the respective chair between an upright position (e.g., a chair position as illustrated in FIG. 2A) and a reclined position (e.g., a chair position as illustrated in FIG. 2B). Alternatively, a chair controller 570*c* may include a plurality of functions, such as, individual buttons associated with independently controlling a headrest, a chair back 215*a-c*, a lower lumbar support 220*a-c*, a chair seat 225*a-c*, a foot-rest 230*a-c*, and/or an arm-rest 235*a-c*. Additionally, a chair controller 570*c* may include an audio output connector, a power output connector, lighting, a microphone, a speaker, etc. Alternatively, a chair controller 570*c* may be similar to a portable computing device (e.g., portable computing device 169 of FIG. 1) that facilitates a plurality of chair controls and/or venue interaction.

The controller 590*a*, 590*b* may include a reclined chair position indicator 597*a*, 597*b* and/or an upright chair position indicator 598*a*, 598*b*. The controller 590*a*, 590*b* may further include a first connector receptacle 591*a*, a second connector receptacle 592*a*, a third connector receptacle 593*a*, a forth connector receptacle 591*b*, a fifth connector receptacle 592*b*, a sixth connector receptacle 593*b*, a seventh connector receptacle 594*b*, and/or an eighth connector receptacle 595*b*. The controller 590*a*, 590*b* may also include a battery 596*b*. While not shown in FIG. 5A or 5B, the controller 590*a*, 590*b* and/or the actuator 560*b* may include a plurality of sensors (e.g., limit switches, proximity sensors, motion sensors, temperature sensors, occupancy sensors, pressure sensors, strain gauges, etc.) and/or lighting (e.g., light emitting diodes).

Turning to FIGS. 6A-6C, a local chair control assembly 600*a-c* may include a chair control housing 670*a-c*, a chair recline button 671*a-c*, and/or a chair upright button 672*a-c*. The local chair control assembly 600*a-c* may include, for example, a first button to move the respective chair between an upright position (e.g., a chair position as illustrated in FIG. 2A) and a reclined position (e.g., a chair position as illustrated in FIG. 2B). Alternatively, a local chair control assembly 600*a-c* may include a plurality of functions, such as, individual buttons associated with independently controlling a headrest, a chair back 215*a-c*, a lower lumbar support 220*a-c*, a chair seat 225*a-c*, a foot-rest 230*a-c*, and/or an arm-rest 235*a-c*. Additionally, a local chair control assembly 600*a-c* may include an audio output connector, a power output connector, lighting, a microphone, a speaker, etc. Alternatively, a local chair control assembly 600*a-c* may be similar to a portable computing device (e.g., portable computing device 169 of FIG. 1) that facilitates a plurality of chair controls and/or venue interaction. The local chair control assembly 600*a-c* may be similar to, for example, the local chair control 270*a-c*.

A controller may be included in one or more locations per row of chairs, per section of chairs, and may be set to control all A chair locations in a respective row of chairs and/or section of chairs. Alternatively or additionally, a controller may be included in one or more locations per row of chairs or per section and may be set to control all A and B chair, respectively, locations in that row and section. Any given chair may be, for example, similar to any one of the recliner chairs 210*a-c*, 300*a-d* of FIGS. 2A-C or 300*a-d*, respectively, or a group of recliner chairs 210*a-c*. Control Z may control all configurations. Various controller location and control options. The related control may extend and/or retract associated reclining chair mechanism. For example, individual chair location control may be provided using an electrical switch (e.g., switch 270*a-c* of FIGS. 2A-C or 600*a-c* of FIGS. 6A-C) per chair. Alternatively or additionally, row control may be provided by way of an assigned master or multiple master controllers in the row. A studio control may be proved to control of all chairs by a central control. Alternatively, a studio control may control any and all locations in all rows and sections. Optionally, an end of row controller A location may control all A locations in the row per section. Yet optionally, a second from end controller may control all B locations in the row per section. Yet alternatively, one or more A controller locations may control all other A locations in a row per section 1310*b*. Yet further optionally, one or more B controller locations may control all other B locations in the row per section. Even further, an end of row controller location may control all locations in the row per section.

A remote controller (e.g., a studio control 900 of FIG. 9) may be communicatively connected to a local control (e.g., an A controller, a B controller, or a controller located within each chair) via a hardwired network and/or a wireless network. A hardwired network and/or a wireless network may be bi-directional (i.e., the remote controller may send data to the A controller, the B controller, or the controller located within each chair, and the A controller, the B controller, or the controller located within each chair may send data to the remote controller). Alternatively, each chair may include a control module (e.g., control module 790*a-d* of FIGS. 7A-D) that is in unidirectional communication with a master controller (e.g., a studio controller, an A controller, or a B controller).

At least one first powered recliner chair may be assigned to a first control group (e.g., control group A) by at least one of: a first pin and shorting block, a first push button, a first hardwired connection, a first circuit board with a hardwired connection, or a first entry in a memory (e.g., an IP address). At least one second powered recliner chair may be assigned to a second control group (e.g., control group A) by at least one of: a second pin and shorting block, a second push button, a second hardwired connection, a second circuit board with a hardwired connection, or a second entry in a memory. A pin and shorting block may be included within a control module (e.g., control module 790a-d of FIGS. 7A-D). A push button may be, for example, part of a chair retract/recline push button assembly (e.g., push button 671c or push button 672c of FIG. 6C) or may be a push button incorporated into a control module (e.g., control module 790a-d of FIGS. 7A-D). For example, a hole may be provided in a cover of the control module 790a-d and a push button may be incorporated on an associated circuit board within the control module 790a-d. In any event, each powered recliner chair, within any given venue, may be provided with a unique identification relative to any other chair within the venue. While both control group A and control group B may be located in a common room (e.g., a single theater), control group A may be in a first room (e.g., a first theater) and control group B may be in a second room (e.g., a second theater).

With reference to FIGS. 7A-E, example recliner chairs and related control components 700a-d are depicted. Any given recliner chair 700a-d may be similar to, for example, any one of the recliner chairs from the group of recliner chairs 210a-c of FIGS. 2A-C, or a group 210a-c of recliner chairs. The recliner chair 700a may include a reclining control mechanism 727a, a control module 790a, and a transformer 796a having an electrical connector 791a. The recliner chair 700b may include a control module 790b having proximate chair interconnections 793b, 795b, a remote control module connection 792b, and a local control switch connection 794b. The recliner chair 700c may include an electric power transformer 796c, an actuator 760c, a control module 790c, a control module/actuator connector 793c, a transformer/control module connector 791c, and a local control switch connector 794c. The recliner chair 700d may include an electric power transformer 796d, an actuator 760d, a control module 790d, a control module/actuator connector 793d, a transformer/control module connector 791d, and a local control switch connector 794d. The recliner chair 700b may include a control module 790b having a battery 796b, a first actuator connector 794b, a second actuator connector, a first proximate chair connector 793b, and a second proximate chair connector 791b. A control module 790a may include a transparent cover and at least one light (e.g., lights shown in FIGS. 17A-H, J-N and P-R). The light 1499h may, for example, be illuminated while the associated chair 1400h is in a theater cleaning position. Any given control module 790a-d may be, for example, similar to any one of the control modules 490a, 490b, 590a, 590b. Any given actuator 760d may be, for example, similar to any one of the actuators 460b, 560b, 565b. Any given control module 790a-d may include a headrest orientation relay, a chair recline relay output, a chair upright relay output, an ottoman reorientation relay, an emergency relay output, a lighting relay output, a combination thereof, or any sub-combination thereof.

Any given controller may be configured to control a single chair row, such that all chairs extend and/or retract via a single input. Alternatively or additionally, any given controller may be configured to control a single chair row, such that every other chair extend and/or retract via a single input. Alternatively or additionally, any given controller may be configured to control an entire theater control, such that all chairs in a theater extend and/or retract via a single input. Alternatively or additionally, any given controller may be configured to control an entire theater, such that every other chair extend and/or retract via a single input.

Figure 7A:
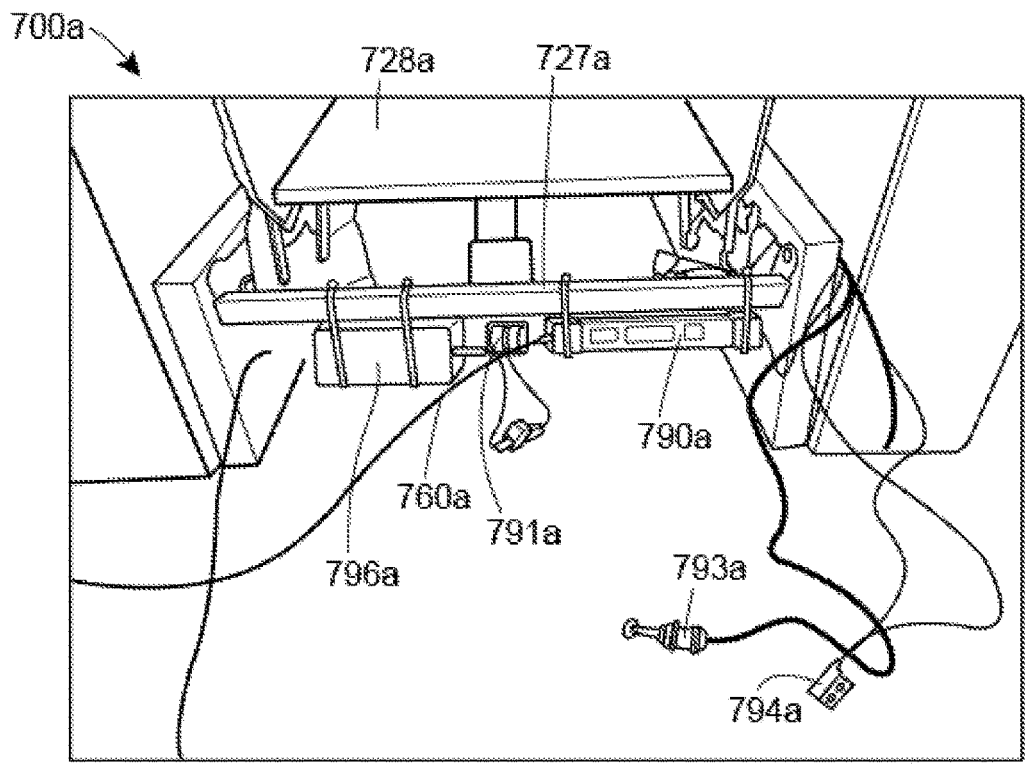
FIGS. 7A-E depict example recliner chair assemblies and related electrical power and control components for use with the chairs.
Figure 7B:
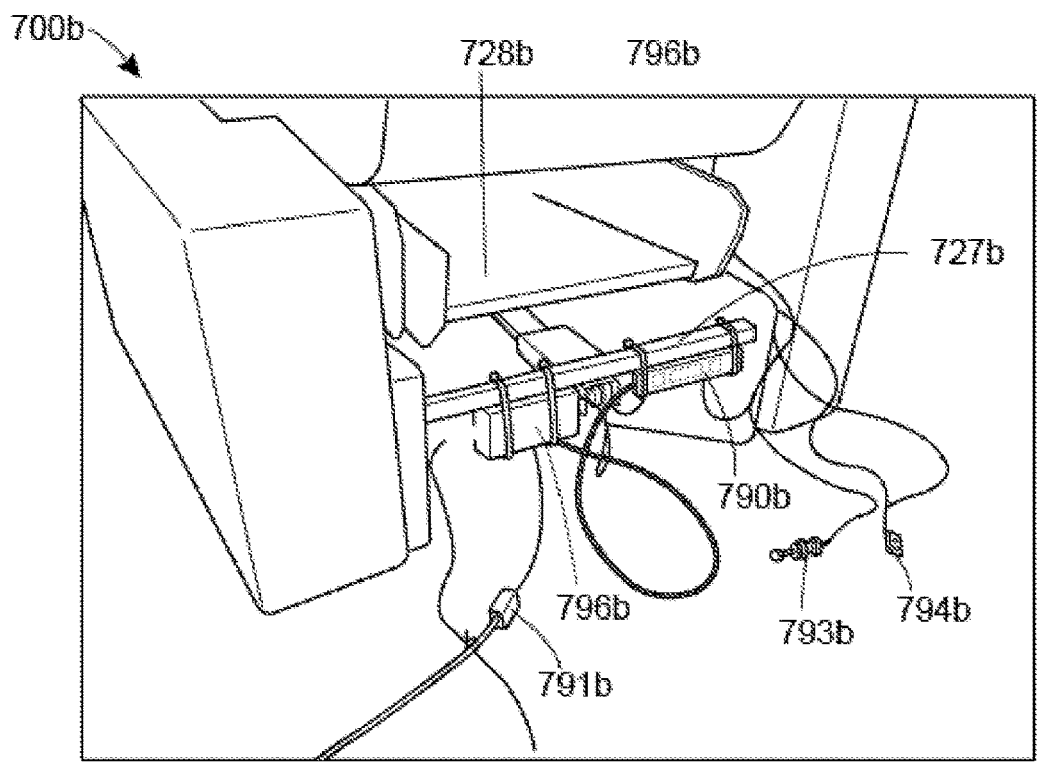
Figure 7C:
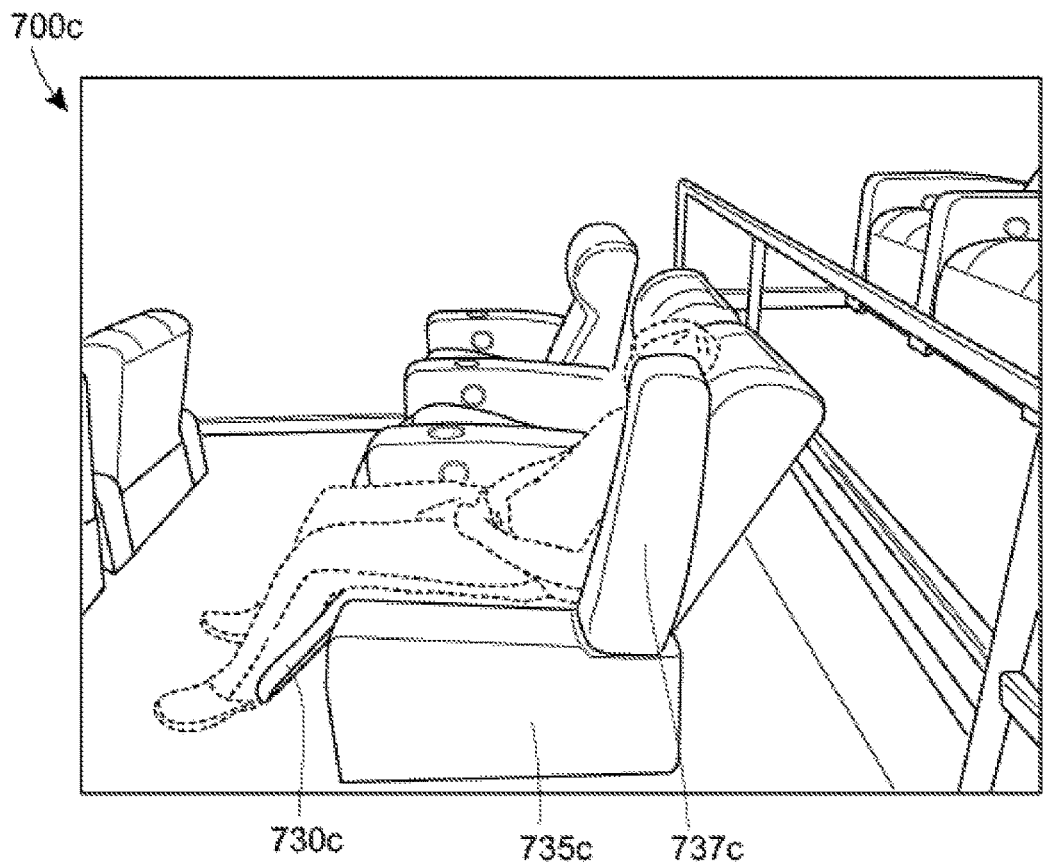
Figure 7D:
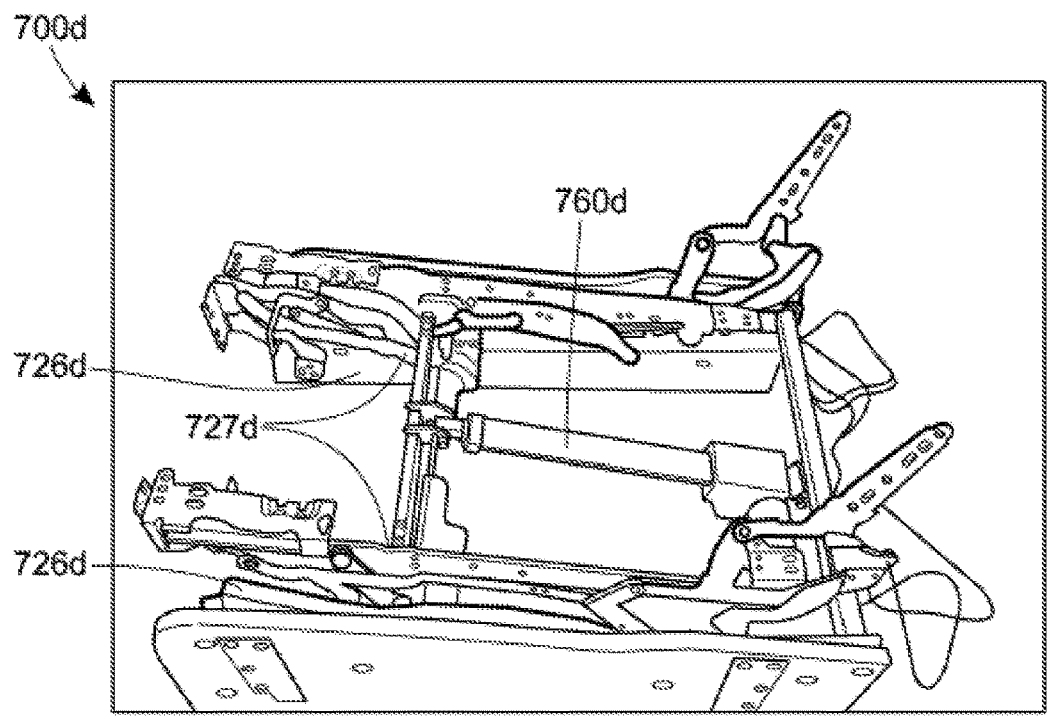
Figure 7E:
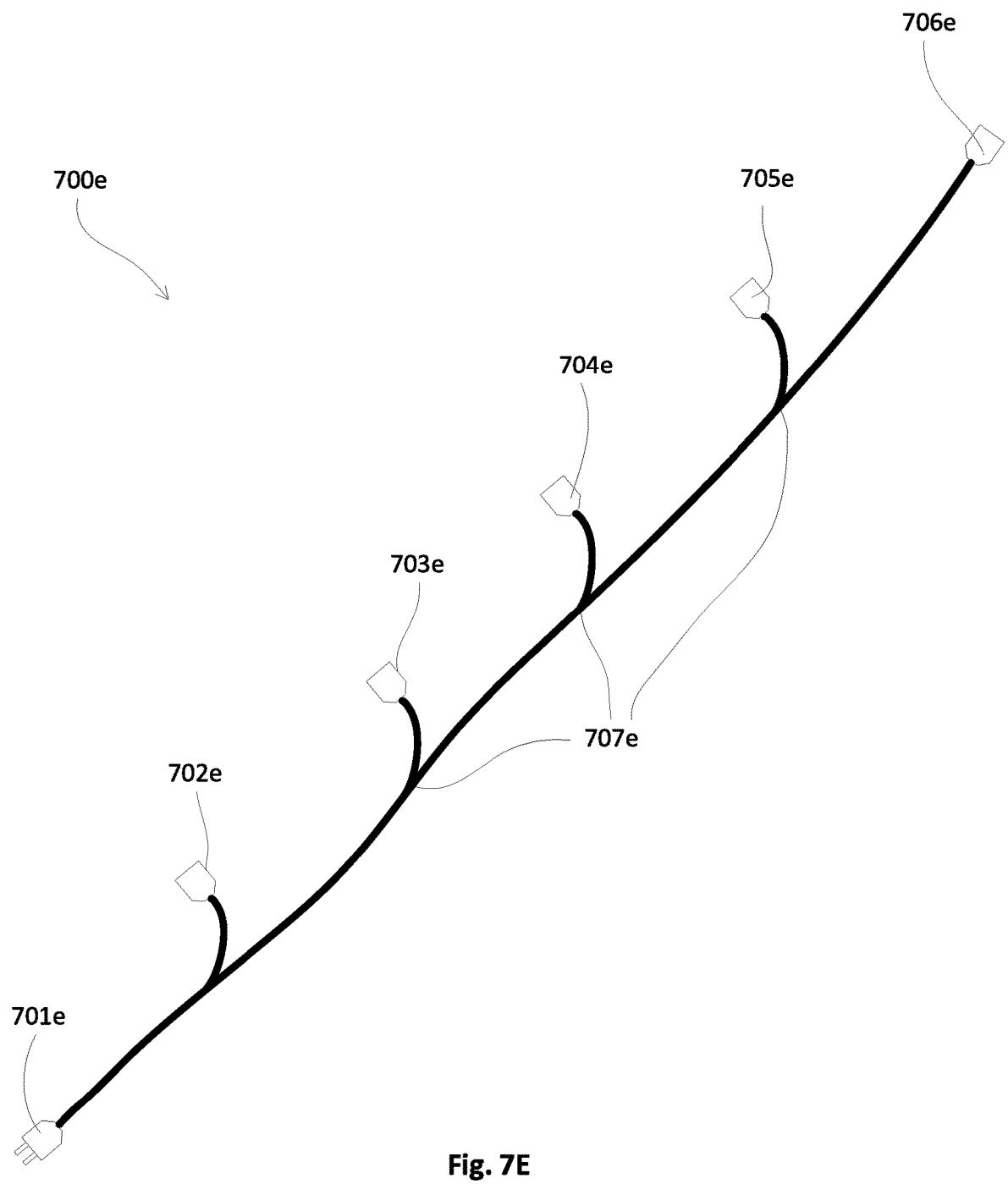

As shown in FIG. 7E, an associated electrical supply cord 700e may be configured to provide daisy chained high voltage power, low voltage power, and/or control between recliner chairs to facilitate ease of installation. For example, a first chair may be plugged into the high voltage power 702e and then extended to proximate chairs 703e-706e. A chair may have multiple powered outlets, such as an extension cord or power strip that other chairs may be plugged into. This may allow a chair to feed power/control to other chairs, for example, in a row of chairs, thereby, eliminating multiple and expensive power/control outlets for each individual chair. An electrical power/control outlet 702e-706e may be incorporated into any given chair, for example, in a top of an arm box, on a front vertical surface of the chair or arm box, on an inside surface of an arm box adjacent to a local chair control switch, etc. An associated electrical power circuit may be routed down a row of chairs (e.g., row of chairs 210a-c of FIGS. 2A-C) and may be T'ed 707e into chair power outlets/control/isle lights/heaters/etc.

A first electrical supply cord 700e may be configured, for example, such that a male plug 701e is connectable to an electric power outlet (e.g., 110 Vac, 120 Vac, 220 Vac, 240 Vac, etc.), a first female socket 702e may be located proximate a first chair in a row of chairs, a second female socket 703e may be located proximate a second chair, and so on with female sockets 704e-706e down the row of chairs. The first chair may, for example, be next the second chair in a row, or there may be a chair, or group of chairs, between the first chair and second chair. A second electrical supply cord 700e may be configured, for example, such that a male plug 701e is connectable to an outlet of a power supply (e.g., 12 Vdc, 24 Vdc, 27 Vdc, 48 Vdc, etc.), and may have a first female socket 702e located proximate a first chair in a row of chairs to provide electricity to a first actuator, or first actuators in the first chair, a second female socket 703e may be located proximate a second chair, and so on with female sockets 704e-706e down the row of chairs to provide electricity from the power supply to an actuator, or actuators, in each chair. A third electrical supply cord 700e may be configured, for example, such that a plug 701e is connectable to a data outlet (e.g., an Ethernet outlet, a USB outlet, a RS-232 outlet, a RS-422 outlet, etc.), and may extend alongside the first and/or second electrical supply cord. The first, second, and/or third electrical supply cords may be combined into a single cable having multiple outlets (e.g., a 110 Vac outlet, a 24 Vdc outlet, and a data outlet) proximate at least some chairs in a row of chairs.

A mechanical mechanism may be provided in addition to, or in lieu of, the automatic mechanisms (e.g., controller/actuator) to reclining any given chair or a group of chairs via an interlocked mechanical mechanism. For example, a "C" clamp may be include that may be positioned over an arm of a chair and may activate a switch (extend or retract based on clamp position). Thus, a system for applying a force to activate the switch may be provided, such that a reactive force may be contained within the arm that contains the switch. Alternatively, a rod may be provided that may extend between chair arms to activate a switch (extend or retract based on rod position). Thus, a system may be provided for applying a force to activate the switch such that a reactive force is contained within the chair. Such a system may make it unnecessary for the operator to wait while each chair extends/retracts.

A less sophisticated mechanical system may be provided where a person walks down a row of chairs and applies a mechanical device to extend/retract each chair. The less sophisticated mechanical system may be a standalone system or may be integrated along with a powered extend/retract system.

Turning to FIG. 7C, a reclining chair 700c may include a leg rest 730c, a first arm rest 735c, and a second arm rest 737c. The second arm rest 737c may be movable (flip up arm) attached to, for example, the back of the chair and/or an associated arm box. Alternatively, a chair may have a movable arm 737c attached to an arm box. Attaching the second armrest 737c to the back may keep the arm rest in line with the back preventing the interference with an adjacent chair occupant. A reclining chair 700c may, for example, be installed at an end of a row, next to an aisle, to facilitate use of the reclining chair 700c by a physically impaired individual (i.e., by incorporating a reclining chair 700c, an associated installation may satisfy, for example, adults with disability (ADA) requirements). As an alternative to connecting a pivotal arm rest to a chair back, any given arm rest may be hingedly attached to an associated arm box and/or chair assembly at a front or rear of the arm box. Any given arm rest may include a quick removal feature such that the arm rest may be replaced in an event where the arm rest, or an arm rest covering, is, for example, damaged. As an alternative, or additionally, a recliner chair 700c may include wheels (e.g., retractable wheels as shown in FIGS. 10A and 10B of U.S. Provisional patent application No. 62/631,457, the entire disclosure of which is incorporated herein by reference thereto) such that, for example, the chair 700c may be rolled into position for access by a physically impaired individual.

Any given reclining chair may include a "pillow top" configured to cover at least a portion of a respective chair (e.g., a foot rest, a leg rest, a chair seat, a chair arm, a chair back, and/or a head rest). A seat and/or back pillow top may be attached to an adjacent seat or back, respectively, thereby, creating a gap filler between the seat and back which may prevent items (e.g., personal items or trash) from falling below the seating surfaces. Alternatively, a gap filler(s) may not be part of a pillow top. A gap filler may be configures as: a gap filler with a temporary or permanent connection between a seat and/or back; a gap filler with a temporary or permanent connection between the chair arm boxes and/or other members; or a gap filler as made from an at least partially permeable member which may be configured to assist in determining which items are allowed to fall thru the chair while other items are limited from falling. An example of items that may be permitted to fall through are popcorn kernels or liquids, while keeping items of such as cell phones, money, etc. from falling below the seating surface. An alternative gap filler example may allow liquids to pass thru, while items such as popcorn kernels, cell phones, etc. are not allowed to fall thru. Any given reclining chair theater system may include passages or openings under the reclining chairs that allow items to move to an area of easier access.

A pillow top (e.g., a foot rest pillow top, a leg rest pillow top, a chair seat pillow top, a chair arm pillow top, a chair back pillow top, and/or a head rest pillow top) may be removable. Alternatively, or additionally, any/all pillow tops may include a fireproof (or fire resistant) and/or bullet proof material (e.g., carbon fiber composite material, Kevlar, Lexan, grapheme, composite material, wire mesh, anti-ballistic material, etc.). Thus, in emergency circumstances a chair occupant may remove a respective pillow top (or pillow tops) and use the pillow top(s) for personal protection. Notably, notification of an emergency situation within a venue may be initiated via a central alarm (e.g., a manually operated fire alarm, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, or any other portable electronic device that is communicatively coupled to a venue emergency notification system).

In addition to including a fireproof and/or anti-ballistic material as described above, a removable pillow top may include arm sleeves, straps, handholds, etc. such that the removable pillow top is easy for an individual to carry and/or use as a shield. In addition to, or as an alternative to, a removable pillow top a chair seat, a chair back, and/or a chair arm may include fireproof and/or anti-ballistic material fixed to the chair. Accordingly, the chair itself may provide protection from fires and/or bullets.

Chairs may include an arm box having a cub holder, a top side panel, a front panel, a bottom side panel, a back panel, an access opening, support structures, and a wire way passage. An arm box with a wire routing channel(s) may include some or all of the following: assist in passage of wires such as switch controls from inside to outside of the arm box; assist in passage of wires from one side of the arm box to the other side; cross brace; constructed of member which do not provide structure; contain members which provide strain relief; members which are inserted from each side of the arm box and thus forming a wire management path; openings on one or more surfaces to allow additional wires or items to enter the wire management path; openings which have movable members; members positions such that the members limit entry of undesirable items such as fluids; provision for a cover over one or more sides to allow an arm box with such wire management path to be covered so the arm box may be used in situations where access from one or both or no sides is required; and/or isolated path ways. A reclining chair may include wire management features to manage wires between arm boxes and with the recliner mechanism. Any given reclining chair system may include a Smart power system mounted either internal to an arm box or external to the arm box.

Power wiring may be provided to a row of powered chairs via, for example, a plug in cord having a three prong plug on a first end, at least one receptacle on a second end, and a series of "Y" (or "T") female receptacles, connected to the cord, between the three prong plug on the first end and the receptacle on the second end. Each female receptacle may include, for example, a fuse and/or a circuit breaker for electrical protection of chair assemblies, and other electrical devices, that are plugged into the respective receptacle.

A host of different circuit board configurations may be employed in any given recliner chair installation. For example, a circuit board may have 2-inputs and 2-outputs. An interconnection may connect in line between a local control switch and a motor (e.g., actuator) and may carry electric current that controls the motor/actuator. Additionally, CAT-5 cables may be included that carry control signals between chairs when a chair is in normal mode. A patron's local control switch actions (extend or retract) may be passed thru our control module thru the CAT-5 cables. When a chair system is put into "clean/maintenance" mode signals may be passed thru the CAT-5 cable to allow a master chair to control other chairs.

Locations of a circuit board and/or transformer may be attached to a rear chair board. Alternatively, a circuit board and/or transformer may be attached to a rear motor/actuator cross tube. A control circuit may be configured as a serial connection between modules, may be wired in parallel, or wires may be eliminated (or reduced) via wireless communications.

A high voltage power connection may include a power strip/extension cord plugged into a high voltage feed with a receptacle end mounted on a rear cross tube, or a rear board adjacent to a transformer. A transformer may be plugged into one outlet and proximate chair(s) may be plugged into other outlet(s). This approach may reduce a number of expensive outlets hardwired in an associated building, and may, employ an associated high voltage feed line pre-wired in a chair. A rear chair panel may be removable to facilitate cleaning and maintenance of a controller, actuator and/or recliner mechanisms.

Alternatively, or additionally, power and/or control wiring may extend into a slot under chair arm box, and may be secured in position using at least one of: brackets holding modular wiring in advantageous positions to avoid being disturbed during associated venue/chair cleaning; via a power supply (e.g., power supply 790b) being secured in position; a chair control being secured in position; routing wires through chair structural members (e.g., box beams and/or structural channels); and/or by preventing plugs from being un-plugged via restraining clamps. An electrical power and control assembly may be configured such that the panel is pre-assembled with an associated junction box/distribution panel, a power supply, a chair controller, and associated interconnecting cables, such that the electrical power and control assembly may be quickly installed within an associated powered recliner chair without the need for skilled labor. Thereby, powered recliner chair installation time may be reduced and labor costs may be reduced when compared to powered recliner chairs that do not include pre-assembled electrical power and control panels. A chair arm box may be, for example, installed against a riser without a chair back hitting the chair arm or the riser when the recliner chair is reclined.

Any given power or data connector may be held in place via a finger, or multiple fingers integrated into, for example, a chair recliner mechanism. Thereby, screws and/or similar fasteners are not required to retain the connectors in place. A bracket may be mounted on, for example, a rear of each powered recliner chair.

A first power supply may be configured to, for example, supply electric power to a first actuator in a first chair and a second actuator in a second chair. A second power supply may be configured to, for example, supply electric power to a third actuator in a third chair and a fourth actuator in a fourth chair. First electric power conductors may extend from the first power supply to the second power supply proximate second electric power conductors that extend from, for example, the first power supply to the second actuator. Any given power supply may provide electric power to, for example, up to ten chair assemblies. Electric power conductors extending between individual power supplies may operate at a higher voltage compared to electric conductors that extend from the power supply to associated actuators.

A method for controlling a plurality of powered recliner chairs may include assigning at least one first powered recliner chair to a first control group. The at least one first powered recliner chair may be assigned to the first control group by, for example, at least one of: a first pin and shorting block, a first push button, or a first entry in a memory. The method may further include assigning at least one second powered recliner chair to a second control group. The at least one second powered recliner chair may be assigned to the second control group by, for example, at least one of: a second pin and shorting block, a second push button, or a second entry in a memory. The method may also include causing the at least one first powered recliner chair to reorient to a first orientation in response to a first remote control input. The method may yet further include causing the at least one second powered recliner chair to reorient to a second orientation in response to a second remote control input. The first orientation may be independent of the second orientation. The first orientation may be a reclined orientation and the first control input is a venue cleaning input. The second orientation may be a reclined orientation and the first control input is a venue cleaning input. The first orientation may be an upright orientation and the first control input is a venue emergency input. The second orientation may be an upright orientation and the first control input is a venue emergency input.

The method may further include generating the first control input and the second control input in response to an automatic venue cleaning sequence. The method may also include energizing at least one first light source in response to the first control input. The method may yet further include energizing at least one second light source in response to the second control signal. The method may also include automatically prohibiting a second powered recliner chair from starting to reorient at the same time that a first chair starts to reorient.

The method may be implemented by a processor (e.g., processor 164 of FIG. 1) executing a set of computer-executable instructions (e.g., the set of computer-readable instructions stored memory 165 of FIG. 1). Alternatively, the method 1900 may be implement by dedicated hardware (e.g., one or more discrete component circuits, one or more application specific integrated circuits (ASICs), etc.).

Cup holders are often incorporated into venue seating (e.g., theater seating, auditorium seating, sports arena seating, concert hall seating, etc.). A cup holder may be incorporated into an associated chair or may be attached to, for example, a back of chair that is located in front of an associated chair. Cup holders may be retrofitted to an associated seating installation subsequent to the corresponding chairs being installed. The cup holders of the present disclosure may provide flexible installation. A cup holder of the present disclosure may be securely attached to an associated chair or may be attached to, for example, a back of chair that is located in front of an associated chair.

An accessory tray assembly (e.g., a snack tray, a writing tray, a snack tray with cup holder, etc.) of the present disclosure may be attached to a chair, in a field installation, without having to modify an associated chair. For example, an accessory tray assembly of the present disclosure may include a tray base that may drop into a space normally occupied by a cup holder and may be clamped to a chair arm box structure with, for example, lock dogs. Alternatively, attachment of the base may include screws instead of, or in addition to, clamp dogs.

Accessory tray load may be carried by bearings. The bearings may be positioned to carry loads and reduce tray movements. For example, a first bearing may be place outboard of a center portion of a tray base to reduce movement and increase load carrying capabilities.

An accessory tray assembly attachment mechanism may be free of exposed fasteners. For example, associated fasteners may be hidden by a cup holder. An associated cup holder may be retained by a unique center plug and screw arrangement. Associated attachment lock dogs and/or screws may be accesses access holes in a tray support that are aligned with fasteners in a tray base.

An accessory tray assembly may, for example, incorporate ¼ turn locking dogs to simplify installation and removal. An accessory tray assembly may, for example, incorporate access windows to aid installation and tightening of lock dogs and/or screws. An accessory tray assembly may, for example, incorporate features to insure proper position and function of associated lock dogs and/or screws. An accessory tray assembly may, for example, include other items post attached to the arm box to aid attachment of the accessory tray assembly to the associated chair.

An accessory tray assembly may be left-handed, right-handed, or may be ambidextrous. An accessory tray assembly may incorporate stops to limit movement. An accessory tray assembly may incorporate at least one biasing spring, or other devise, to automatically return the tray to a stored or open position. An accessory tray assembly may incorporate at least one locking mechanism configured to temporarily stop an associated tray in a closed, an opened, an intermediate position, any sub-combination thereof, or a combination thereof. An accessory tray assembly may incorporate a complex shaped snack tray support arm to minimize costs while providing superior strength compared to known trays. An accessory tray assembly may include an attachment having at least one attachment mechanism for removably securing the accessory tray within a receptacle of a chair. An accessory tray assembly may include drain holes for draining liquids that enter the assembly. An accessory tray assembly may include drain holes which serve as access holes for snack tray attachment features.

An accessory tray assembly may omit a cup holder, and the cup holder may be replaced with other feature(s). Any of the embodiments described to include a cup holder may similarly apply to these embodiments. An accessory tray assembly may include features to aid orientation of the snack tray during assembly. An accessory tray assembly may include features to aid the orientation of the snack tray during assembly to the chair. An accessory tray assembly may include a snack tray containing a support and table top which may be folded to minimize storage space and maximize use space. An accessory tray assembly may include a snack tray containing a support and table top which may be folded to minimize storage space and maximize use space. An accessory tray assembly may include design to include features to reduce, minimize or prevent spillage when in a closed position. An accessory tray assembly may include a snack tray containing a support and table top which may be folded to minimize storage space and maximize use space.

An accessory tray assembly may include design to include features to communicate tray position to a remote computing device. An accessory tray assembly may include a snack tray containing display devices to communicate with customers and staff. An accessory tray assembly may include a snack tray which incorporates a means to automatically recline or partially recline an associated chair based on position of the snack tray. An accessory tray assembly may include a snack tray which may coordinate a snack tray position and a chair position. For example, cooperation between a tray position and a chair position may be accomplished mechanically, electromechanically, electrically or by other means.

A chair may incorporate a tray which communicates with a chair control, operational system, ticketing systems and/or other entertainment and ordering systems, to enhance venue or customer experience. For example, features may include locking the tray in a closed position if a ticket is not purchased and/or signaling based on position. An accessory tray assembly may include display(s) that welcome customers, advertise specials, etc. An accessory tray assembly may incorporate devices to aid ordering of food or services, etc. An accessory tray assembly may include a tray which may open when an event occurs such as an end of show, a fire alarm sounds and/or may automatically close (partially or fully) when an associated seat is unoccupied.

A snack tray support may include features to aid or conceal wire routing, switches, displays or associated equipment to aid in the implementation of functions described. An accessory tray assembly may include a snack tray which may be powered to an opened, closed or intermediate position. An accessory tray assembly may include a snack tray which may be assisted by an energy storage device such as a spring move to an opened, closed or intermediate position. An accessory tray assembly may include a snack tray which may be assisted or resisted by a damper during movement to an opened, closed or intermediate position.

Figure 8A:
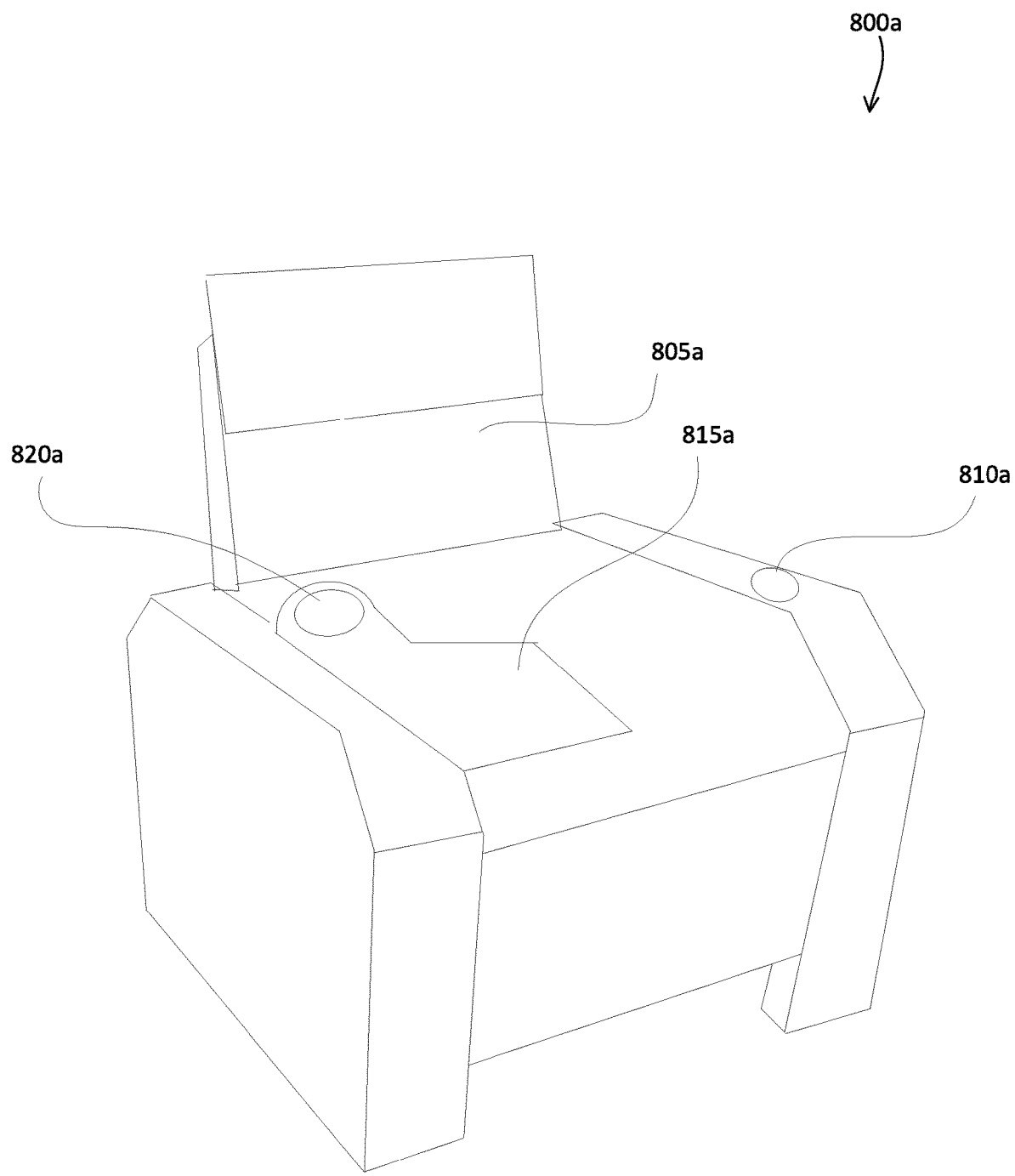
FIG. 8A depicts an example chair with an accessory tray in a non-use position.

Turning to FIG. 8A, a chair assembly 800a may include a chair 805a having a first cup holder 810a and an accessory tray assembly 815a including a second cup holder 820a. The accessory tray assembly 815a is shown in a non-use position. While the chair 805a is shown as a powered recliner chair (e.g., as described in detail within the commonly assigned patent applications that are incorporated by reference above), any given chair 805a may be as described in any other commonly assigned patent applications that is incorporated by reference above, or may be any other suitable chair.

Operation of a powered recliner chair may be enabled when a ticket for the particular chair is purchased. Thereby, in venues that include both standard chairs and powered recliner chairs, a patron is unable to occupy a powered recliner chair without buying a corresponding ticket. A venue cleaning system may include a remote control that reorients only chairs that were occupied (i.e., a ticket was purchased for the chair) subsequent to a previous cleaning and/or during a previous event. Thereby, reorientation of the chairs is reduced when compared to reorienting all chairs during each venue cleaning cycle.

Alternatively, or additionally, both standard chairs (e.g., chairs without a powered recliner feature, chairs having a manual recliner feature, stationary chairs, rocker style chairs, beam mounted chairs, etc.) and powered chairs (e.g., powered recliner chairs, chairs with a powered ottoman, etc.) may include at least one electrical power and/or at least one data outlet (e.g., a USB port, an Ethernet port, an RS-232 port, an RS-485 port, a wireless communication interface, etc.). For example, a chair may include a data outlet that may enable a chair occupant to interact with a gaming facility (e.g., betting, gambling, etc.), a facility concessions, a restaurant, a bar, etc., via an electronic device (e.g., a smart phone, a lap top computer, a personal data assistant, a dedicated facility electronic device, etc.). In any event, an electrical power outlet and/or a data outlet may be enabled for a particular chair when, for example, an individual buys an associated ticket. An electrical power circuit and/or data circuit may be extended from one chair to another as, for example, described elsewhere herein with respect to powered recliner chairs and/or as described within other patent applications/patents that are incorporated herein by reference (e.g., commonly assigned U.S. patent application Ser. No. 15/919,172, filed Mar. 12, 2018; Ser. No. 15/919,176, filed Mar. 12, 2018; Ser. No. 15/800,182, filed Nov. 1, 2017; Ser. No. 15/675,865, filed Aug. 14, 2017; and Ser. No. 15/710,768, filed Sep. 20, 2017, the entire disclosures of which are incorporated herein by reference thereto. The present application is also related to commonly assigned U.S. Provisional Patent Application Ser. No. 62/631,457, filed Feb. 15, 2018, and 62/477,421, filed Mar. 27, 2017, the entire disclosures of which are incorporated herein by reference thereto).

A chair assembly may include a touch screen, or an associated device (e.g., a smart phone, a personal data assistant, a lap top computer, etc.) having a touch screen, may be configured to include a drag bar or swipe feature to extend and/or retract a chair a desired distance. All non-occupied powered recliner chairs within a given venue may be automatically partially reclined such that the chair backs do not affect sight lines of patrons seated behind the non-occupied chairs. Alternatively, or additionally, chairs that have not been purchased may be partially reclined when patrons enter behind the un-purchased chair. This may help sight lines and identified purchased chairs.

A touch screen associated with a given chair may be configured to include swipe gestures to control the chair (e.g., half swipe=half open position); a pinch to close the chair; preset chair position buttons; and/or a chair and/or venue may remember customers favorite positions/screen layouts (e.g., color scheme, button layouts etc.). A customer ID may be determined by tying into a point of sale system such that when a customer buys a reserved seat, the chair may be activated and with the given customer's favorite control panel layout and preset position buttons; allow a customer to enter a code (e.g., their frequent movie goer ID) to recall their favorite control panel layout and preset position buttons; a finger print reader; and/or a read card or dongle provided by theater.

A "Welcome message" may be added to a screen (e.g., "This luxury recliner is reserved for CUSTOMER). Screen graphics may change orientation based on whether a given chair is occupied (e.g., graphics facing standing or seated customer). A screen layout may have buttons to tie into non-movie related services (e.g., have valet parking bring my car up, prepare my pre-ordered meal or snacks at local eatery, etc.). Available buttons on a screen may change with movie progress (e.g., during preshow food ordering buttons, during trailers, buttons to advance ordering of tickets of show on trailer, buttons for services, such as described above, at end of show, etc.).

Figure 8B:
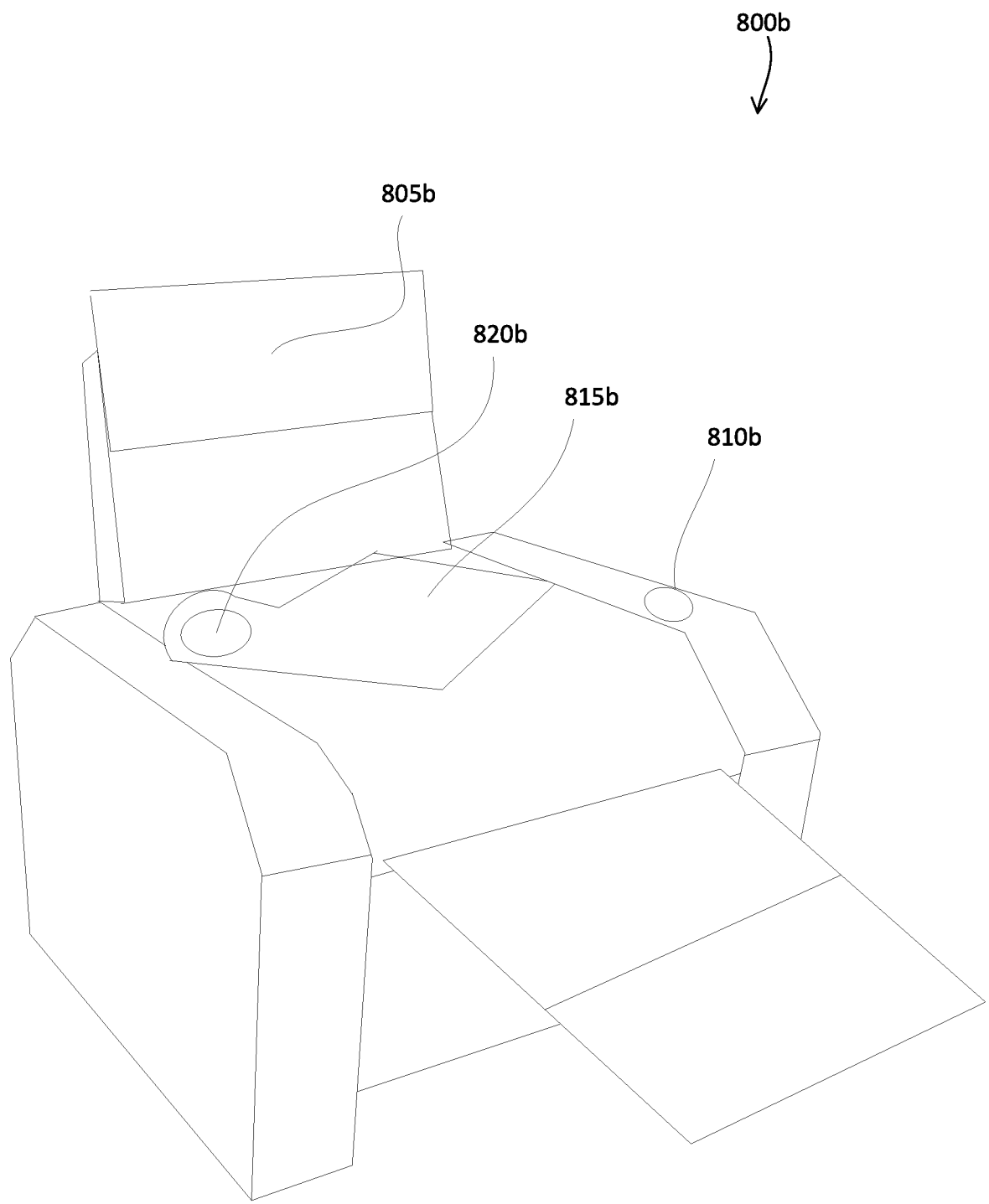
FIG. 8B depicts an example chair with an accessory tray in an in-use position.

With reference to FIG. 8B, a chair assembly 800*b* may include a chair 805*b* having a first cup holder 810*b* and an accessory tray assembly 815*b* including a second cup holder 820*b*. The accessory tray assembly 815*b* is shown in an in-use position. While the chair 805*b* is shown as a powered recliner chair (e.g., as described in detail within the commonly assigned patent applications that are incorporated by reference above), any given chair 805*b* may be as described in any other commonly assigned patent applications that is incorporated by reference above, or may be any other suitable chair.

Any given stack tray may be configured, for example, as shown and described within commonly assigned provisional patent application Ser. No. 62/689,237, the entire disclosure of which is incorporated herein by reference thereto. Similarly, any given cup holder may be configured, for example, as shown and described within commonly assigned provisional patent application Ser. No. 62/689,237, the entire disclosure of which is incorporated herein by reference thereto.

Figure 9:
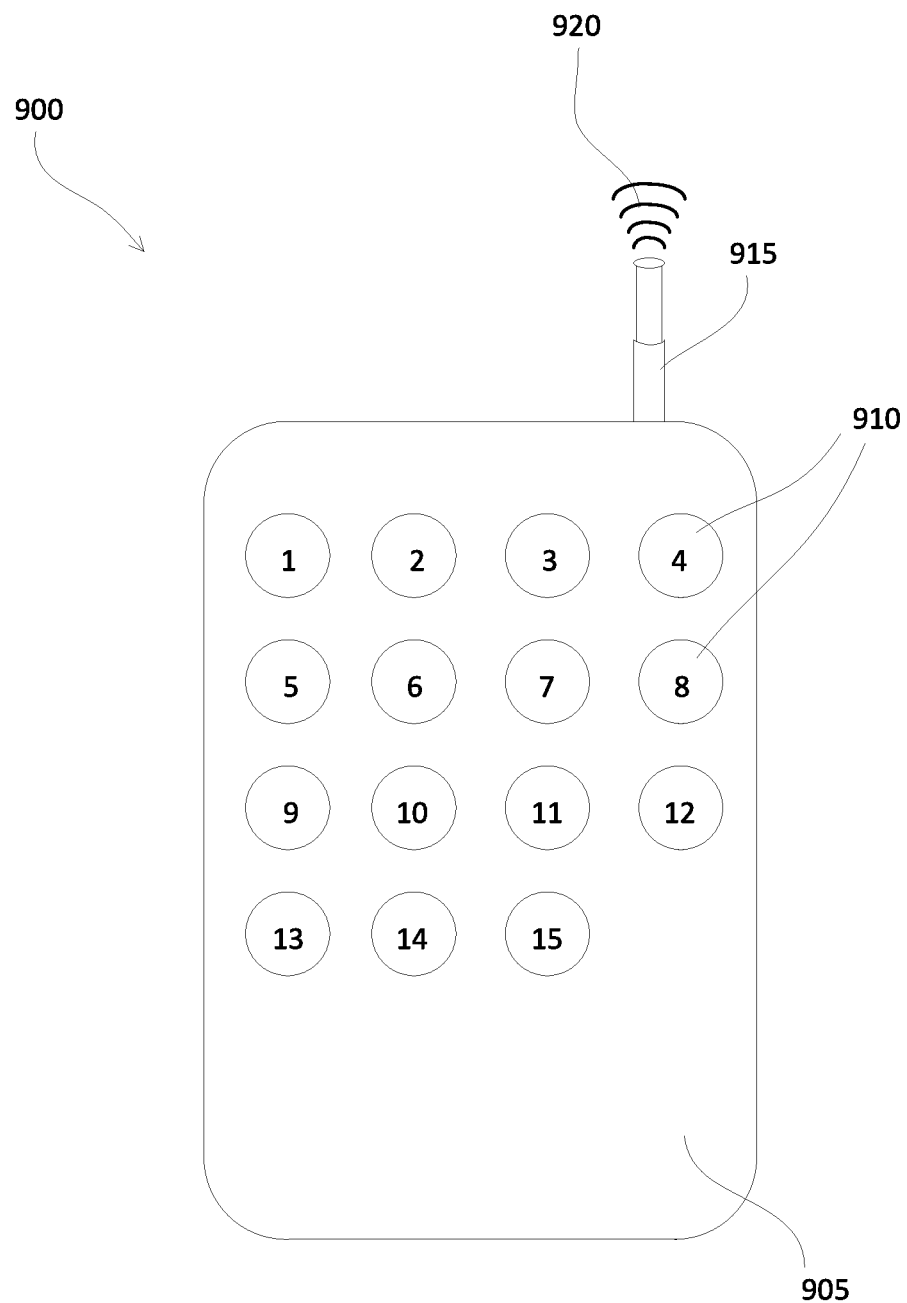
FIG. 9 depicts an example wireless chair controller.

With reference to FIG. 9, a remote chair controller 900 may include a plurality of buttons 910 proximate a housing cover 905. The remote chair controller 900 may further include an antenna 915 to provide a wireless communication link 920. The remote chair controller 900 may be configured to control a powered recliner chair as, for example, any of the powered recliner chairs disclosed in commonly assigned patent applications: Ser. No. 62/143,079, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 4, 2015; Ser. No. 62/149,596, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 19, 2015; Ser. No. 62/159,791, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on May 11, 2015; Ser. No. 62/159,791, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on May 11, 2015; Ser. No. 62/175,210, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Jun. 12, 2015; and No. PCT/US16/25803, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 3, 2016, the disclosures of which are incorporated herein in their entireties by reference.

Figure 12A:
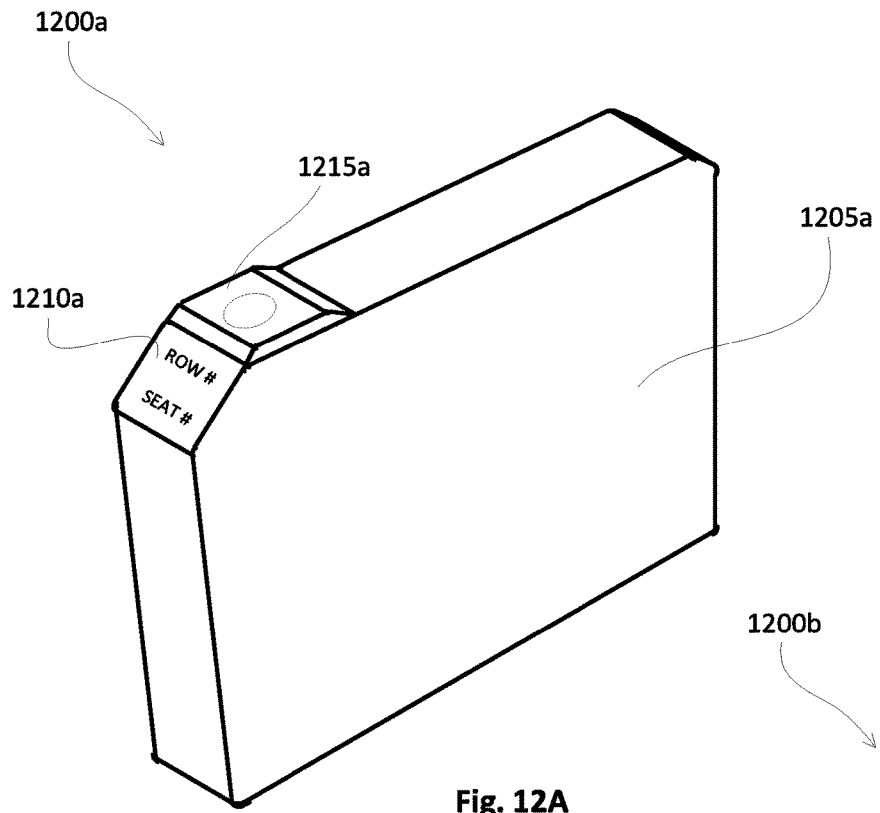
FIGS. 12A and 12B depict example arm boxes for use with powered recliner chairs.
Figure 13A:
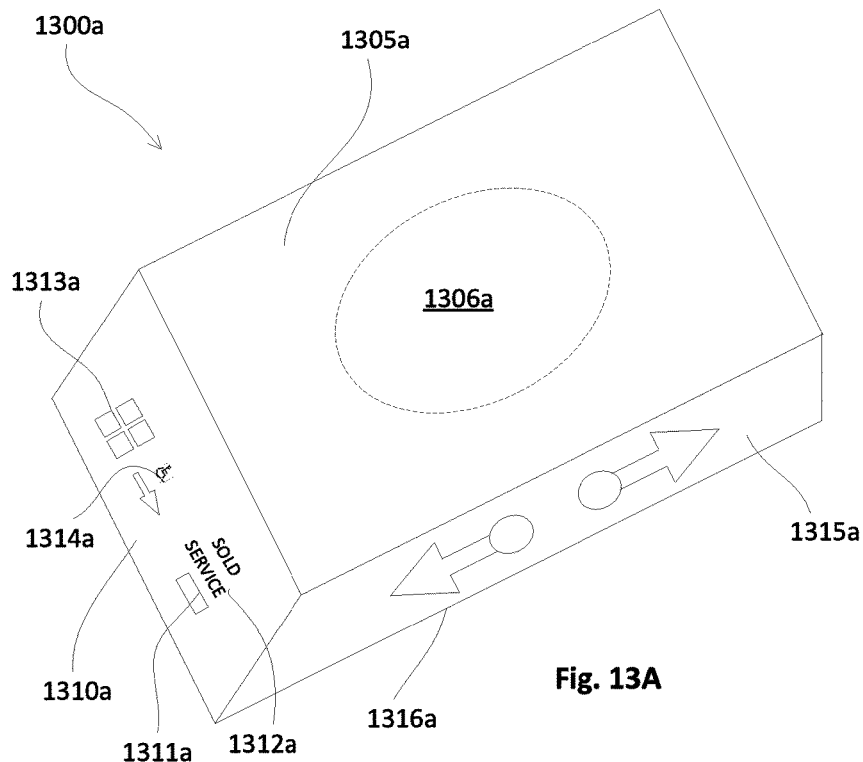
FIGS. 13A and 13B depict example user interfaces for use with powered recliner chairs.
Figure 13B:
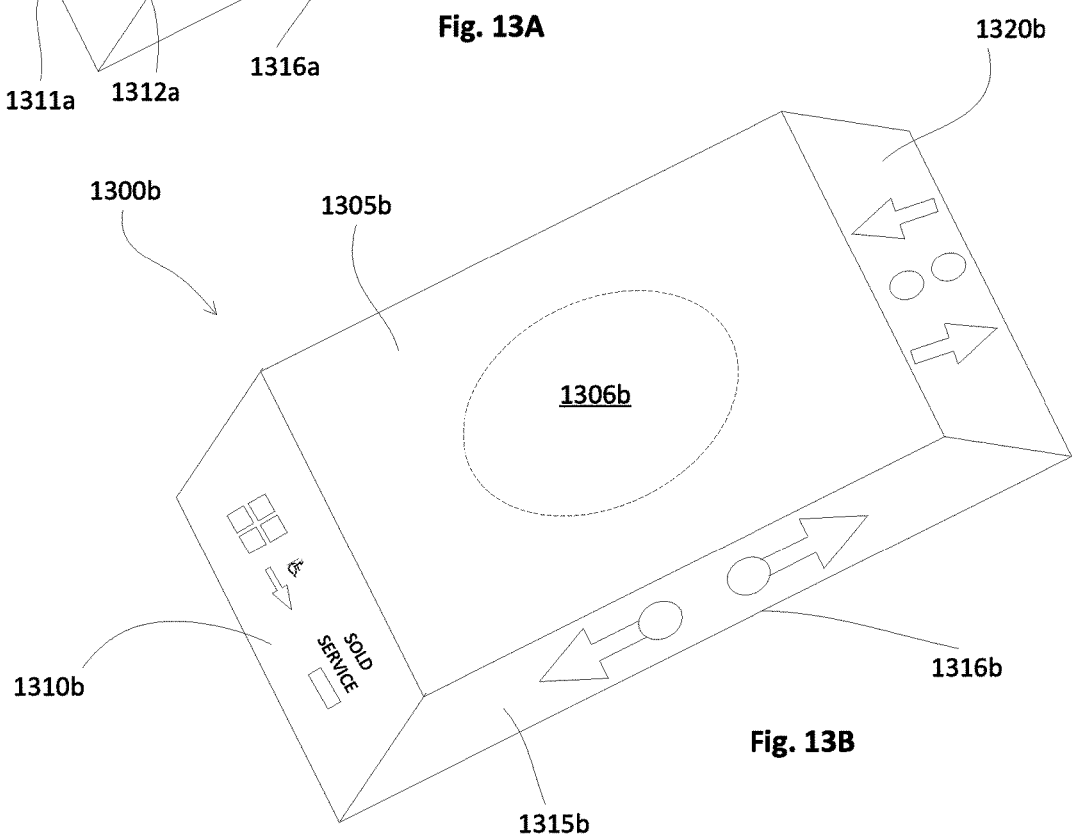

In particular, a remote chair controller 900 may communicate with a chair controller (e.g., controller 800 of FIG. 8 of PCT/US16/25803), a local chair control (e.g., local control 270 of FIG. 2 of PCT/US16/25803), a chair control module (e.g., control module 1490*e* of FIG. 14E of PCT/US16/25803) to provide control of, for example, an individual chair (e.g., a chair 1200*a* of FIG. 12A of PCT/US16/25803) and/or a group of chairs (e.g., group of chairs 1300A of FIG. 13A of PCT/US16/25803).

As a particular example, each of the buttons 910 may be associated with a given theater (e.g., theater 1, theater 2, etc.) within a group of theaters. Pressing button 1 for a predetermined period of time (e.g., three seconds, five seconds, etc.) may cause the remote chair controller 900 to transmit an initiation signal to a chair control 800 to, for example, cause a subset of chairs (e.g., A or B) of a group of chairs 1300*a* within theater 1 to move to either an upright orientation, a partially reclined orientation, or a reclined orientation. This functionality may provide access to a theater maintenance person for cleaning at least a portion of an associated theater. The chair control 800 may include a first timer that causes the chair control 800 to store a chair control sequence status in memory and to exit the remote control mode after a first period of time (e.g., five minutes, ten minutes, fifteen minutes, etc.). The chair control 800 may include a second timer that causes the chair control 800 to exit the remote control mode and clear the chair control sequence status from memory after a second period of time (e.g., one-half hour, one hour, one and a half hours, etc.). Single button 300 initiation may be considered to, for example, represent an "easy" mode.

A chair control may include at least one light (e.g., a light 1499h of FIG. 14H of PCT/US16/25803) that may, for example, provide feedback to an operator of the remote chair controller 900 that the chair control has received a control signal from the remote chair controller. Alternatively, or additionally, a light 1499h may indicate whether a chair or a group of chairs has been left within a control sequence (e.g., a theater cleaning mode).

A remote chair controller 900 may include a display (e.g., a liquid crystal display, a LED display, a vacuum fluorescent display, an OLED display, etc.) and/or may be a smart device (e.g., a tablet computer, a cellular phone, etc.). Thereby, a remote chair controller 900 may be provided to an individual along with, for example, a ticket purchase to provide chair control and/or information. For example, a remote chair controller 900 may be configured as an information display for hearing impaired. A remote chair controller 900 may include a microphone, a voice recognition unit, and may display words and/or words/characters indicative of emotions associated with a current event (e.g., a movie, a concert, a sporting event, a play, etc.).

A chair control may be configured such that a local chair control 270a-c may override any control signal received from a remote chair controller (e.g., activation of a local chair control 270a-c may cause an associated chair to recline even though a remote chair control 900 is sending, or has sent, a chair upright signal). A remote chair controller 900 may be configured such that pressing a sequence of buttons 910, or holding a particular button 910 for a given time period, may initiate a pre-determined event. For example, pressing a sequence of buttons 910 may initiate a semi-automatic chair response, may initiate only chairs denoted as A, may initiate only chairs denoted as B, may initiate control of an individual chair within an associated venue, and/or may allow a user to change an "easy" mode function.

Alternatively, or additionally, a remote chair controller 900, a local chair control 270a-c and/or a master venue controller (e.g., master control 1305a of FIG. 13A of PCT/US16/25803) may be coordinated to provide particular functionality (e.g., turn on/off associated lighting, call for assistance, indicate a chair associated with a concession order, etc.). For example, a remote chair controller 900 and/or a local chair control 270a-c may allow a chair occupant and/or a venue operations person to interact with other venue features (e.g., participate in current raffles, participate in trivia games, order concessions, order tickets to other events, call for a valet service, etc.). A remote chair controller 900 and/or a local chair control 270a-c may be configured to send signals to a master control which may, in turn, transmit signals to a chair control.

Figure 10:
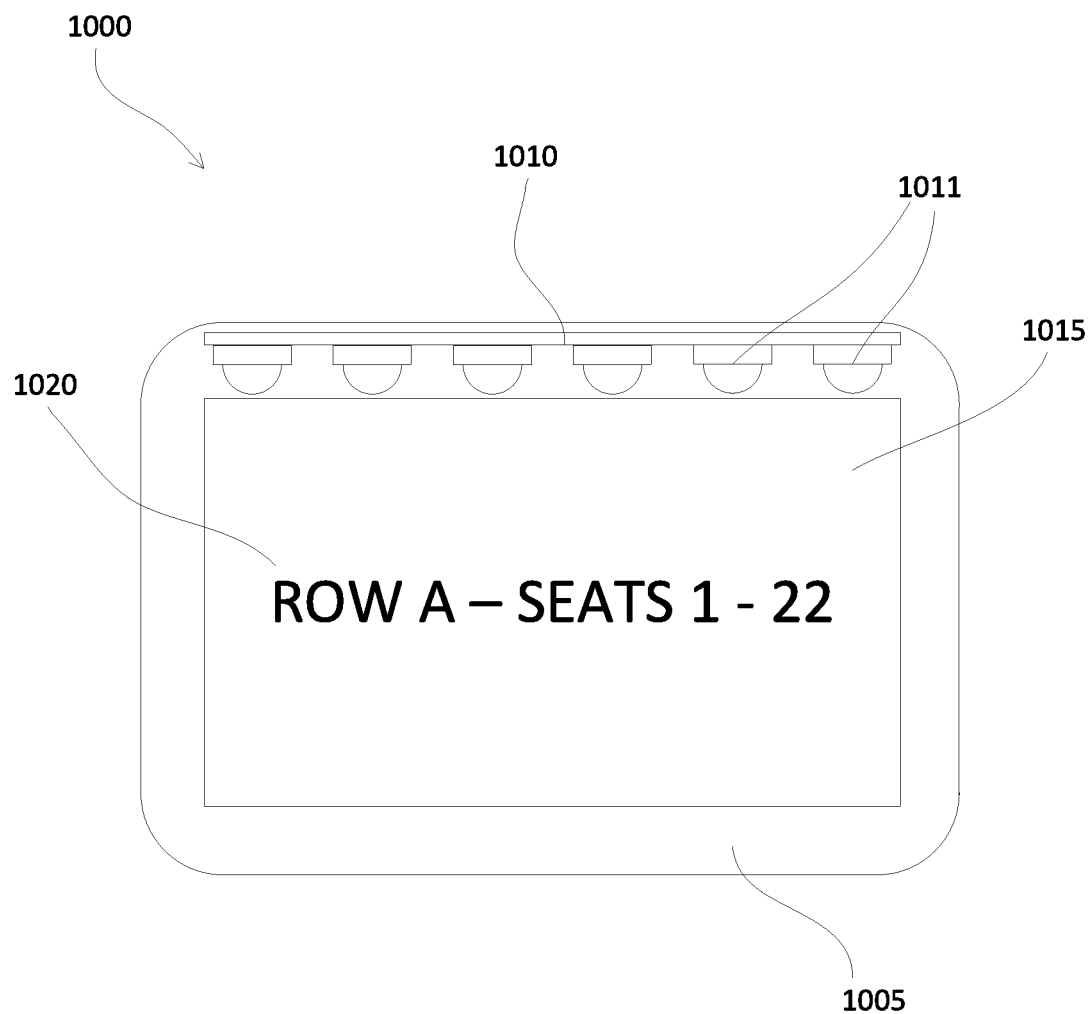
FIG. 10 depicts an example lighting and display assembly.

Turning to FIG. 10, a display 1000 may include an electrical circuit board 1010 having a plurality of light emitting diodes (LEDs) 1011 and a display panel 1015 having a display 1020 incorporated within a display housing 1005. The display panel 1015 may be glass with the display 1020 etched on an associated surface of the glass. The LEDs 1011 may define an edge lighting assembly. At least a portion of the LEDs 1011 may be controlled similar to the light 3299a as described above. Alternatively, or additionally, at least a portion of the LEDs 1011 may remain on at least while ambient lighting within an associated venue is dim. As illustrated in FIG. 10, a display 1000 may define a row/seat identification tag to be installed on, for example, an end panel of a chair at an end of a given row of seats. A display 1000 may be installed on an associated chair without display panel or with a blank display panel 1015. In either event, a display panel 1015 may be incorporated into the display 1000 after the chair is installed within a venue. Thereby, the display may reflect any desired information.

The display 1000 may include a liquid crystal display (LCD), a vacuum fluorescent (VF) display, an organic light emitting diode (OLED) display, LEDs and light pipes display, and may provide a visual indicator to a venue patron. In any event, the display 1000 may communicate seat identity to the patron, theatre staff, etc. Alternately, or additionally, the display 1000 may communicate to the patron and aid the patron/staff in locating their/a seat and, thus, function as an "electronic usher." The patron may be given a device (e.g., device 900 of FIG. 9) that may provide an indication, such as lights or vibrate when the device is adjacent to the patron's seat. The patron may be given a device 900 that may provide an indication, such as a light or in the seat such as light up the display 1000 or partially open when the device 900 is adjacent to the patron's seat. Such a device 900 may enable associated chair functions, as paid for by the patron, when the device 900 is adjacent/paired to the associated chair. Different service tiers (e.g., chair motion, hearing impaired functionality, chair heating/cooling, chair massage, etc.) may be provided based on payment.

A display assembly 1000 may include illumination of multiple light sources that may be controlled independently. For example, any given light source may be automatically controlled (e.g., dimmed, brightened, turned on, turned off, etc.) based on a venue event, a predetermined time, a motion sensor, etc. A display assembly 1000 may include other displays (e.g., chair is "sold", chair is not working, etc.). A display assembly 1000 may include a base that ships separately to an associated chair installation job site. A display assembly 1000 may include a display unit that ships separately to an associated chair installation job site, and may be customized for a particular application. A display assembly 1000 may allow for many display options including having a unit in which a light pipe may be inserted.

Figure 11:
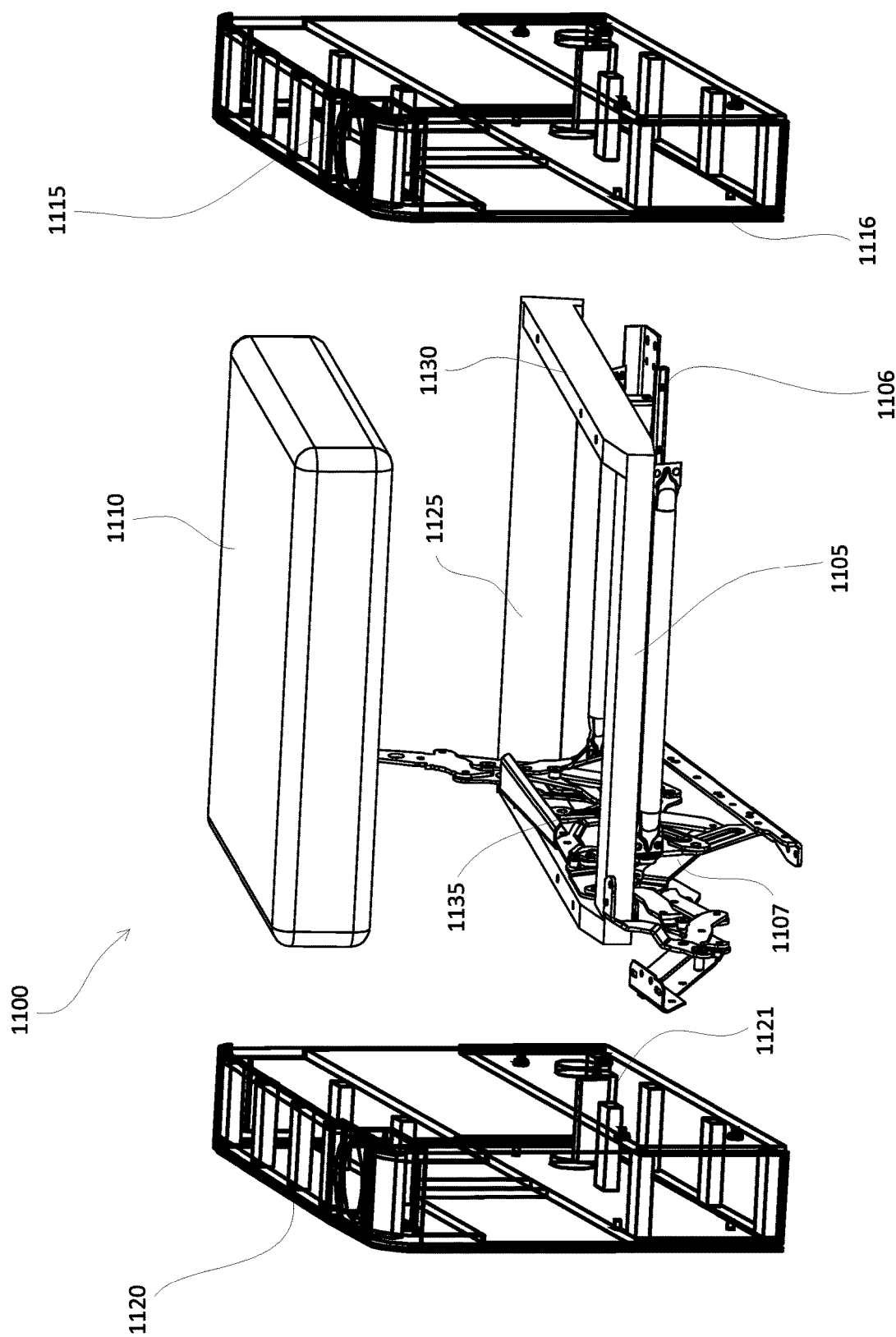
FIG. 11 depicts a front top perspective view of example components for use within powered recliner chairs.

With referenced to FIG. 11, a powered recliner chair assembly 1100 may include a central chair frame 1105, a chair seat box structure 1110, a first arm box 1115, a second arm box 1120, a power junction box 1125, a power inlet connection 1130, a power outlet connection 1135, and at least one actuator connector 1140. The chair seat box structure 1110 may be movable, or removable, to facilitate access underneath the associated assembly 1100. Each arm box 1115, 1120 may include arm box quick attachment features 1121 configured to cooperate with chair recliner mechanism structure quick attachment features 1106, 1107, respectively, to facilitate installation, removal, and/or replacement of an associated arm box 1115, 1120. For example, a pair of central chair frames 1105 may be secured in place within an associated venue spaced apart from one another such that an arm box 1115, 1120 may be slid downward between the pair of central chair frames 1105 and secured in place via the respective arm box quick attachment features 1116, 1120 and the chair recliner mechanism structure quick attachment features 1106, 1107.

A chair recliner mechanism structure 1105 and/or an arm box 1115, 1120 may include power cord rack features that receive a power inlet connection 1130 or a power outlet connection 1135 from a backside or a respective chair and retain the power inlet connection 1130 and/or the power outlet connection 1135 up off an associated floor surface. The power cord rack features may be, for example, hook shape features that allow installation of the power inlet connection 1130 and/or the power outlet connection 1135, and/or the arm boxes 1115, 1120 without unplugging the power inlet connection 1130 and/or the power outlet connection 1135 from an associated power junction box 1125. In fact, a series of power inlet connections 1130 and/or power outlet connections 1135 may be plugged into respective power junction boxes 1125 while laying, for example, on a floor behind a row of associated chairs, and subsequently the series of power inlet connections 1130 and/or power outlet connections 1135, along with respective power junction boxes 1125, may be set in place with the associated chair recliner mechanism structures 1105 and/or arm boxes 1115, 1120 set in place.

A powered recliner chair may include a power supply having a battery and a battery charger. The battery charger may be configured to automatically charge the battery during periods of time in which an associated electric actuator motor is not in operation. Thereby, the power supply and battery may be configured to provide a constant voltage to the electric actuator motor during times when, for example, several actuators, that are connected to the given power supply, are activated. The power supply may also include a constant voltage transformer that outputs a constant voltage regardless of current draw from electric actuator motor(s). The transformer may, for example, adjust automatically to maintain a generally constant DC voltage output to the electric actuator motor. In lieu of, or in addition to, a battery within a power supply, a battery charger and/or a battery may be provided within any given actuator. Any given chair assembly may be configured such that, for example, when an associated venue experiences an electric power outage, the chair assembly may be reoriented to an upright orientation, via electric power from a battery. Once the chair assembly is reoriented to an upright orientation, an associated chair control may disable operation of the chair assembly until the venue electric power is restored.

A chair seat box structure may interlock into an associated recliner chair in a fashion to allow the seat box to be restrained when occupied and to be moved into a position to aid cleaning. For example, bracket(s) may cooperate with member(s) of a recliner mechanism or items connected to the recliner mechanism to restrict undesirable seat movement and noise when the recliner is occupied, but allow for easy movement of the chair seat when the associated chair is unoccupied. Alternatively, a chair seat may be attach to an associated chair via a pillow top or other flexible member (e.g., a hinge mechanism). In addition to, or in lieu of, a powered recliner chair, or group of powered recliner chairs, being reoriented from an upright orientation to a reclined orientation as described herein and within the patents and patent applications that are incorporated by reference herein, a chair seat box structure may include an actuator that is configured to move the chair seat in response to a user activating, for example, a remote and/or local control button. Thereby, venue personnel may access under respective chairs for cleaning and/or servicing. As another alternative, or in addition, a chair may be pivotal with respect to, for example, a recliner mechanism structure (RMS). For example, at least a portion of the RMS may be fixed to an associated floor and the remaining portion of the chair assembly may pivot such that venue personnel may access under respective chairs for cleaning and/or servicing. An actuator may be included to pivot the chair relative the portion of the RMS.

A removable/movable chair seat frame may be, for example, hinged along a front side and an actuator may be provided to pivot the removable/movable chair seat frame upward to assist a chair occupant to stand up and exit the chair. An associated removable/movable chair seat frame control (e.g., a first set of user controls/displays, a second set of user controls/displays and/or a third set of user controls/displays) may be provided in, for example, an arm box.

Figure 12B:
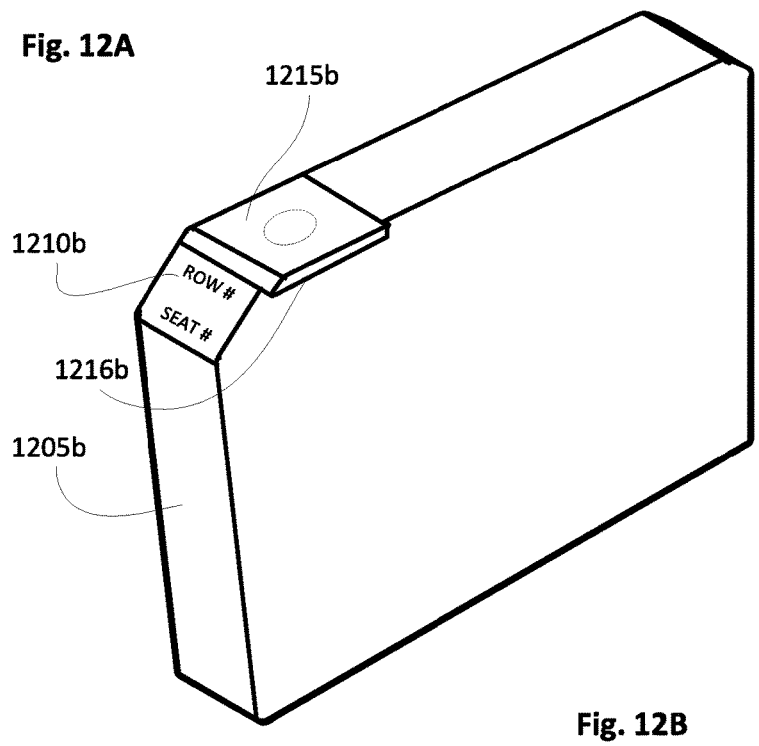

With reference to FIGS. 12A and 12B, an arm box assembly 1200*a*, *b* may include an arm box 1205*a*, *b*, a first user interface/display 1210*a*, *b*, and a second user interface/display 1215*a*, *b*. The first user interface/display 1210*a*, *b* and/or the second user interface/display 1215*a*, *b* may include a plurality of light sources configured to illuminate respective display features. Any given light source may be manually or automatically controlled. For example, any given light source may be automatically controlled (e.g., dimmed, brightened, turned on, turned off, etc.) based on a venue event, a predetermined time, a motion sensor, etc. Any given second user interface/display 1215*a* may include an aperture to, for example, receive or allow access to an associated cup holder. Any given user interface may include manual controls for the light sources, chair recline/upright controls, a chair heater control, a chair massage control, etc.

As illustrated in FIGS. 12A and 12B, the first user interface/display 1210*a*, *b* may be angled toward a front of an associated venue and away from view of occupants of chairs such that, for example, a chair and/or row number may be illuminated and visible to individuals walking, yet without being visible to individuals that are seated. An area light, or lights, 1216*b* may be incorporated within a second user interface/display 1215*b* to, for example, provide row and/or aisle illumination similar to light sources 910 of FIG. 9. In any event, any given light, or lights, 1216*b* may be manually or automatically controlled. For example, any given light source may be automatically controlled (e.g., dimmed, brightened, turned on, turned off, etc.) based on a venue event, a predetermined time, a motion sensor, etc.

Any given light source may be manually or automatically controlled. For example, any given light source may be automatically controlled (e.g., dimmed, brightened, turned on, turned off, etc.) based on a venue event, a predetermined time, a motion sensor, etc. Any given user interface 1200*a,b* may include an aperture to, for example, receive or facilitate addition of a tray or to allow access to an associated cup holder. Any given user interface may include manual controls for the light sources, chair recline/upright controls, a chair heater control, a chair massage control, etc.

An area light, or lights, may be incorporated within a user interface 1100*a,b* to, for example, provide row and/or aisle illumination similar to light sources 910 of FIG. 9. In any event, any given light, or lights, may be manually or automatically controlled. For example, any given light source may be automatically controlled (e.g., dimmed, brightened, turned on, turned off, etc.) based on a venue event, a predetermined time, a motion sensor, etc.

Any given user interface 1100*a*, *b* may include an ambient light sensor to, for example, automatically control light output of an associated light source and/or display. For example, during pre-show or non-movie times, venue lights may be on such that a seat number may automatically increase intensity. Alternatively, light control may be programmed thru an associated venue control network. In any event, a seat number may be bright when needed and dim when it gets dark during, for example, a show. Alternatively, or additionally, bright seat lights may be set during, for example, a bright section of the show. Any given user interface 1100*a*, *b* may incorporate a sensor to detect if an associated chair is occupied. Any given user interface 1100*a*, *b* may incorporate additional controls such as vibration, massage, call for food, emergency/assistance call, etc. Any given user interface 1100a, b may incorporate chair extend retract controls on each side for a pair of adjacent chairs. For end of row chairs, a row side may include aisle lights, a row number/letter, a seat number, an ADA designation, an indicator when associated chairs are in a venue cleaning mode, a call light indicator for a patron/chair needing service in that row, etc. Any given user interface 1100a, b may be mounted flush with sides of an associated arm box/flip up arm as illustrated in FIG. 7C, and may extend wider than the arm box/flip up arm so that features such as down lighting or aisle lights may be incorporated. Any given user interface 1100a, b may include some or all of smart chair control features, such as smart power, venue cleaning, power modules, etc. Any given user interface 1100a, b may facilitate modularization of an associated recliner chair by enhancing standalone nature of the RMSs, arm boxes, chair seats, chair ottomans, chair backs, and/or headrests. Any given user interface 1100a, b may incorporate power supplies or power regulators for independent items such as aisle lights, tasks lights, cup holders, snack trays, call buttons, and/or features to enhance patron experience or venue operation. Any given user interface 1100a, b may incorporate an optical beam paired with beam/receiver module. The beam could originate in one chair and go across the seat width. An occupant in the chair may break the beam indicating an occupant present. The beam/receiver modules are available in many types for example a garage door opener safety close switch.

Any given user interface 1100a, b may include a clock or sleep timer(s) configured to automatically dim or shut off associated light sources/displays during times when an associated venue is not in operation. This can take a number of forms: turn off/dim a light source/display if an associated chair is not used for more than a predetermined time (e.g., an hour, 3-hours, etc.). Any given user interface 1100a, b may incorporate multiple timers and actions. Automatic control may incorporate patterns, for example, turn off every other row or chair. Alternatively, the pattern can alternate, rotate, vary, during normal times, for example, every other chair user interface 1100a,b may dim for 5 minutes. A row number may be automatically turned on and an associated seat number turned off on alternating chairs. Which chair is "on" and "off" may be changed in some pattern such as by day, venue cleaning cycle (System can toggle at venue cleaning activation), etc. Any given user interface 4400a, b may incorporate a global clock timer that sets on/off times.

Any given user interface 1100a, b may incorporate a wake up code in the control system to turn on/off displays until a next button push. Any given user interface 1100a, b may allow any chair in a particular venue to detect a button push on any other chair and react/wake up. Any given user interface 4400a, b may incorporate, for example, a wifi module to sync an internet time, a battery, a processor, a memory, and/or a programming port (e.g., a USB port, an RS-232 port, a RS-422 port, programming port 1706a of FIG. 17A, etc.), an audio port. Thereby, any given user interface 1100a, b may be configured to provide all chair control and/or user functions described herein. When a user interface includes a battery, the user interface may not require any external electrical connections to facilitate chair control and/or user functionality (i.e., user interface power may be provided via the battery and control data may be transmitted/received wireless).

Any given user interface 1100a, b may include a power connection (e.g., a direct current (DC) connection and/or an alternating current connection) and/or a data connection (e.g., wired and/or wireless data connection). The power connection and/or the data connection may include any suitable plug/receptacle to facilitate user interface installation, removal and/or replacement.

Any given user interface 1100a, b may include a chair position sensor that is configured to sense an angle at which an associated chair is reclined. Thereby, the user interface 1100a, b may be programmed to limit an angle at which the given chair may be reclined. Thus, a chair that is installed adjacent a wall or a handicap accessible area, for example, may be programmed to recline less than other chairs in other areas of a respective venue.

Any given user interface 1100a, b may include switches, controls and displays. For example, a recliner control switch may be incorporated with remote venue cleaning control circuitry into a single circuit board. The combined control may be located in an arm box and/or in a remote control positioned at, for example, a rear of an associated chair. Locating the controls in an arm box may provide improved control signal reception, may allow customization to an arm box and may make associated recliner structure less custom. This may reduce overall complexity and may speed installation. Furthermore, locating controls in an arm box may combine chair number, display, chair status such as sold/available, etc., may include a USB port or other input feature (wired or wireless) to, for example, program a chair assembly. For example, programming may include venue cleaning chair programming, smart power programming, setting display parameters such as chair number, row letter, a chair network ID such as IP address etc. Moreover, locating controls in an arm box may combine an AC to DC motor power supply with these items to reduce cost, components, and/or complexity.

Any given user interface 1100a, b may be configured to monitor and/or control recline/retraction functions of an associated chair or associated chairs. For example, a user interface 1100a, b may be programmed to monitor a number of electrical pulses applied to an associated actuator and/or to monitor an amount of time the associated actuator is activated. Thereby, the user interface 1100a, b may be configured to limit chair movement. For example, a given chair may be configured to be installed in a venue with a row spacing particular row spacing, and a chair foot rest (or ottoman) movement may be limited to ensure a row egress that meets an associated fire code (e.g., twelve inches for chair installations in the United States, fourteen inches for chair installations in Canada, etc.). Alternatively, or additionally, a position sensor (e.g., a haul effect sensor, a limit sensor, a linear rheostat, a rotary rheostat, etc.) may be connected to a user interface input to provide a chair position feedback signal. In any event, a user interface 1100a, b (and/or chair control) may be configured to monitor/control a chair orientation. Similarly, chairs installed in a back row of a venue may include a chair back/head rest that does not recline as far back as a chair back/head rest of a chair installed in a front row of the venue. An associated ottoman, on the other hand, may extend the same for the chair in the back row and the chair in the front row. Thereby, a head of a chair occupant in the back row will remain more upright when the associated chair back/head rest is reclined when compared to a head of a chair occupant in a chair located in the front row.

A number of electrical pulses applied to an actuator may be proportional to an associated actuator drive current. Alternatively, or additionally, a width of pulses applied to an actuator may be proportional to an associated actuator drive current. A user interface 1100a, b (or other control) may control an actuator based on a number of electrical pulses and/or a width of electrical pulses applied to an actuator drive motor. A user interface 1100a, b (or other control) may control an actuator based on a frequency of electrical pulses applied to an actuator drive motor. An actuator may be either a linear actuator or a rotary actuator. While an actuator/control as disclosed herein may be incorporated within a powered recliner chair, a similar actuator/control may be incorporated in any application (e.g., two-dimensional laser cutters, two-dimensional plasma cutters, two-dimensional water jet cutters, multi-axis machining systems, multi-axis robots, etc.).

A user interface 1100a, b may include a touch screen display having a plurality of control button icons, with each control button icon being configured to result in a respective chair being oriented to a predetermined orientation when the respective control button icon is selected by a user. For example, a user may momentarily touch a particular control button icon and the respective chair will orient to a fully reclined orientation. Activation of a second control button icon may result in the associated chair being oriented to a fully upright orientation. Activation of a third control button icon may result in the associated chair being oriented to an orientation in between fully reclined and fully upright. Activation of a forth control button icon, and/or activation of a venue cleaning function, may cause a plurality of chairs in a given venue to reorient to an orientation that causes, for example, associated foot rests (or ottomans) and/or chair backs to extend into a row space otherwise required when the associated venue is occupied (i.e., when the venue is vacant, the chairs may be reclined further than when the venue is occupied). Thereby, the chairs may simultaneously meet respective fire codes and facilitate venue cleaning.

By providing chair orientation monitoring and/or feedback, an associated user interface (and/or chair control) may be programmed to orient a chair relative to differing venue floor angles. Alternatively, or additionally, chair orientation data may be acquired and stored to, for example, enable venue designers to analyze preferred chair orientations. Chair orientation data may be used for design of venue chair layouts. In circumstances where a user interface is programmed to monitor chair orientation via application of electric power to an actuator, the user interface may detect variations in electric power (e.g., a spike when an ottoman begins to move, a spike when a chair is fully reclined, a spike when a chair is fully upright, etc.) to, for example, set (or validate) a "known" (or current) orientation. Subsequently, the user interface (or chair control) may approximate chair orientation based on actuator activation time and/or power pulses.

Additionally, or alternatively, by providing chair orientation monitoring and/or feedback, an associated user interface (and/or chair control) may be programmed to orient a group of chairs within a venue during emergency situations. For example, a user interface (and/or chair control) may automatically reorient chairs close to aisles before chairs in a center of a row when a fire alarm is activated. As another example, chairs may be automatically reoriented to a predetermined orientation between a fully upright orientation and a fully reclined orientation in response to an emergency notification.

In addition to a chair reorientation control, a user interface 1100a,b may include a chair heater control, a chair massage unit control, a chair lighting control, a venue lighting control, and/or a chair electric power management control. A user interface 1100a,b may be, for example, communicatively coupled to a powered reclining chair site and/or a venue operations center (e.g., a powered reclining chair site 160, a venue operations center 105, etc. of FIG. 1) and may automatically control electric power usage. For example, a user interface 4400a-d and/or a powered reclining chair site 160 may be configured to automatically turn off and/or limit electric power to at least one chair accessory (e.g., a chair heater, a chair cooling unit, a chair massage unit, a lighting unit, a chair electric power outlet, a chair USB port, etc.) when an associated chair, that is electrically connected to a common electric power supply, is being reoriented (i.e., when electric power is being applied to a chair actuator).

A processor of a user interface 1100a,b may receive movie play data (e.g., movie queue data) from a processor (e.g., processor 167 of FIG. 1) of a powered reclining chair site 160, and the processor of the user interface 1100a,b may automatically control electric power usage of a chair accessory based upon the movie play data. For example, the processor of the user interface 1100a,b may automatically turn off a chair accessory (e.g., a chair heater, a chair cooling unit, a chair massage unit, a chair electric power outlet, a chair USB port, etc.) based upon the movie play data (e.g., when no movie is playing). Alternatively, or additionally, the processor of the user interface 1100a,b may automatically turn on a chair accessory (e.g., a chair lighting unit, a chair information display, etc.) based upon the movie play data (e.g., when no movie is playing).

The processor 167 may automatically control a chair accessory (e.g., a chair heater, a chair cooling unit, a chair massage unit, a lighting unit, a chair electric power outlet, a chair USB port, etc.) and/or a chair actuator based on movie play data. For example, the processor 167 may automatically turn off, or limit electric power, to a chair accessory when a venue cleaning system is activated (i.e., when a group of powered recliner chairs are being reoriented via a remote control). Additionally, or alternatively, the processor 167 may automatically supply electric power to a chair accessory from an alternative electric power source (e.g., a solar panel, a battery, a capacitor, etc.) when a powered recliner chair or group of powered recliner chairs is/are being reoriented. Thereby, the processor 167 (or a processor of a user interface 4400a-d) may automatically control an electrical power demand and/or an electric power supply.

The processor 167 may control electric power usage on a macro level based upon, for example, movie play data, and any given user interface 4400a-d may control electric power usage on a micro level. For example, a processor 167 may enable operation of a chair accessory based upon the movie play data and a processor of a given user interface 4400a-d may automatically control electric power usage of the chair accessories based upon, for example, whether an occupant of the respective chair is activating an associated chair actuator. As a specific example, a chair actuator may draw approximately 0.8 Amperes at 110V$_{ac}$ (approximately 88 Watts) when the chair actuator is energized and a chair heater may draw approximately 200-400 Watts when the chair heater is activated. By disabling the chair heater while the actuator is energized, the processor of the user interface 4400a-d may limit overall electric power consumption to the maximum usage of any given chair accessory or chair actuator. Alternatively, or additionally, the processor of the user interface 4400a-d may vary electric power to any given chair accessory based upon which other chair accessories and/or chair actuator(s) are being activated.

In any event, the processor of the user interface 1100a,b may automatically draw electric power from an alternative electric energy source (e.g., a solar panel, a generator, a battery, a capacitor, an uninterruptable power supply, etc.) based upon which chair accessories and/or chair actuator(s)

are being operated. For example, the processor of the user interface 1100*a,b* may automatically turn on/off a chair heater and/or chair cooling unit cyclically, such that a chair occupant does not feel any change in temperature, when a chair actuator is energized.

Figure 14:
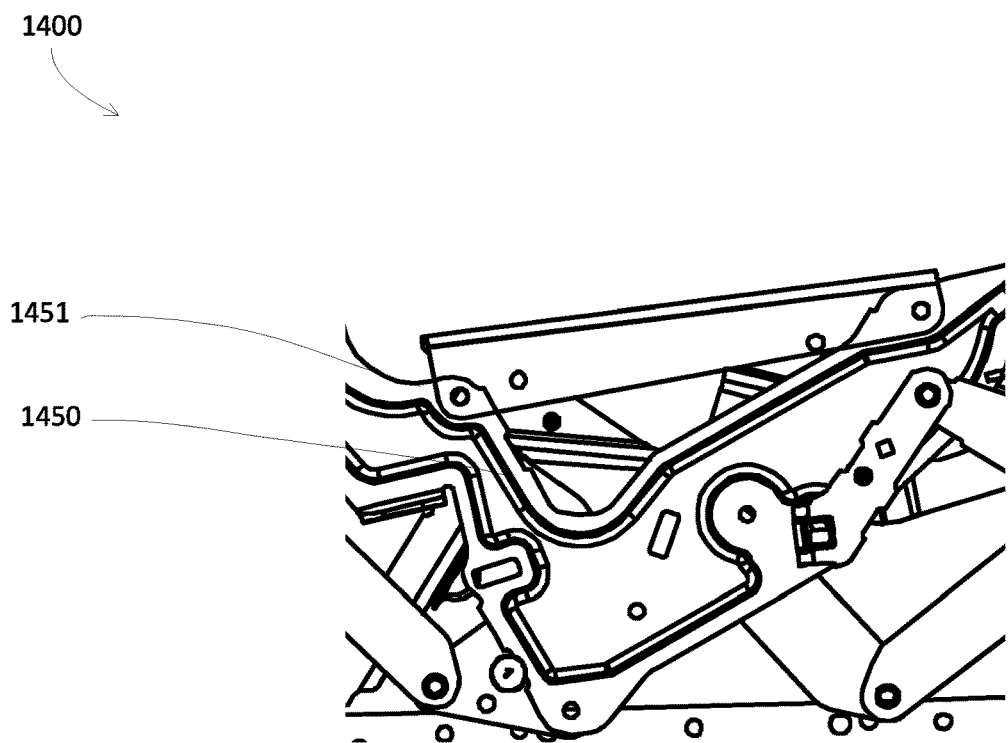
FIG. 14 depicts a side profile view of an example recliner mechanism structure with occupancy sensing components.

Turning to FIG. 14, a recliner mechanism structure assembly 1400 may include a chair seat frame 1400 movably supported by a recliner mechanism structure 1405, an electrical wire support, and an occupant sensor 1450. An electrical wire support may include a longitudinally extending slot for receiving at least one power and/or data conductor. A plurality of electrical wire supports may be configured such that associated power and/or data conductors may be, for example, laid out on a floor of a venue, behind a row of powered recliner chairs, and subsequently inserted within the electrical wire supports.

An occupant sensor 1450 may include a spring 1451 and/or a spring material 1451 configured to, for example, move a portion of an associated chair (e.g., a chair seat support 1100) such that an associated occupant sensor 1450 will indicate that an occupant has exited an associated chair. An occupant sensor 1450 may include a timer and a plug connection. The timer may be configured within an associated chair electrical system to, for example, prevent momentary activation of an associated occupant sensor 1450 (i.e., the occupant sensor 1450 may be activated for a predetermined time prior to indicating that a chair is occupied).

An occupant sensor may be incorporated into a smart control module (SCM) in lieu of pressure sensors. For example, an optical beam paired with beam/receiver module may be included. The beam could originate in one chair SCM and go across a seat width. Thereby, an occupant, in an associated chair, would break the beam indicating that the occupant is present.

An occupant sensor may be incorporated within an associated display to detect if the chair is occupied. A sensor may be included within a display to indicate when an associated power recliner chair is reclined and/or extended. For example, symbols may be included within a display to indicate whether an associated chair is oriented in a reclined and/or non-reclined orientation. A display may include, for example, recline preset positions 1, 2, 3 and 4. A display may include an auto close button, an order call button, an emergency call button A chair may include features such as a massage feature, a vibration feature, a volume control for internal speakers, a USB or power port, a communications port, etc. A side display may be included and may be oriented toward a wall, an aisle, or another chair with its own controls. A display may include aisle lights, a row number/letter, an adults with disabilities (ADA) designation, an indicator when associated chairs are in a venue cleaning mode, a call light indicator for a patron/chair needing service in that row, etc.

A remote control may, for example, include fifteen individual buttons: 1 extend, 2 retract, 3 retract all the way home, 4 go to ¼ open, 5 go to ½ open, 6 go to full extend, 7 under seat lights on/off, 8 isle light on/off, 9 all lights on/off, 13 calibrate, and 14 set full extend position. After calibration a full extend soft stop may be set such that movement of an associated chairs does not ram into a hard stop. ¼ and ½ open may be set from an associated hard stop. A chair may be manually move to a desired position and a button may be pushed to set the desired position. Subsequently, the associated seat will not extend further than the set position using the extend on the seat switch (activation of a remote may still go all the way.

An uninterruptible power supply (UPS) may be incorporated into, for example, a chair arm box such that the assembly may be delivered to a venue pre-assembled. Feedback from a chair, or group of chairs, may be provided to a central venue system to indicate chair occupancy, chair overcurrent conditions, UPS status/health, chair orientation status, etc. A chair actuator current may be determined based on pulse width of an applied electrical signal. A power supply may supply power to a group of four, or more chairs. A position sensor (e.g., a global positioning sensor) may be included in a chair such that, for example, a venue system may automatically determine a physical location of the given chair within the venue and/or one chair may determine a relative location of another chair. At least one energy storage device may be connected to, for example, an output of an electric power supply, or may be incorporated within an uninterruptible power supply connected to an input of the electric power supply. The at least one energy storage device may include at least one of: a battery or a capacitor. The electric power supply and the at least one energy storage device may provide electric power to, for example, electric motors of respective actuators.

Figure 15:
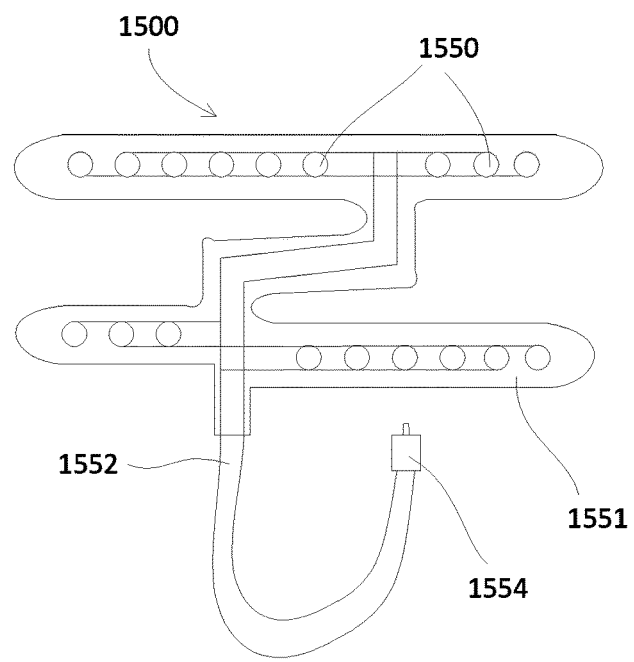
FIG. 15 depicts a top plan view of an example heating apparatus for use within powered chairs.

Turning to FIG. 15, any given chair may include a heater assembly 1500 including heating elements 1550, a temperature control 1551, a timer 1552, and a plug 1554. A heater control (as described elsewhere herein) may control operation of the heater based on a temperature control input, a user input, a timer input, an occupancy sensor input, etc.

With reference to FIGS. 16A-C, an example mounting foot 1605*a-c* for use in a powered recliner chair assembly 1600*a-c* may include a long portion 1606*a-c* and a short portion 1608*a-c*. The long portion 1606*a-c* may be connected to the short portion 1608*a-c* at, for example, a ninety degree angle. The long portion 1606*a-c* may include first slotted holes 1607*a-c*. The short portion 1608*a-c* may include second slotted holes 1609*a-c*.

When a mounting foot engagement pin 1611*a* of an associated powered recliner chair assembly 1600*a-c* is received within a first slotted hole 1607*a-c*, a respective portion 1610*a* of the powered recliner chair assembly 1600*a-c* is farther from an associated chair support surface than when the engagement pin 1611*a* of the associated powered recliner chair assembly 1600*a-c* is received within a second slotted hole 1609*a-c*. Thereby, a height of the associated powered recliner chair assembly 1600*a-c* may be changed by reorienting associated mounting feet 1605*a-c*. For example, a powered recliner chair assembly 1600*a-c* may be levely installed on a sloped chair support surface by orienting two front mounting feet 1605*a-c* with associated chair front engagement pins 1611*a* received within a respective first slotted hole 1606*a-c* and associated chair rear engagement pins 1611*a* received within a respective second slotted hole 1609*a-c*.

An arm box may include a pair of mounting brackets and an associated RMS may include a mating pair of mounting brackets configured to secure the arm box proximate the RMS. The arm box may, for example, be slid downward between two adjacent RMSs subsequent to the RMSs being secured to an associated venue floor (i.e., each RMS may include a pair of mating mounting brackets and both sides of the arm box may include a pair of mounting brackets). Alternatively, or additionally, any given arm box may include at least one bracket (e.g., a hook shaped bracket and/or a tab) configured to engage, for example, a respective front arm box rest or a respective rear arm box rest. An arm box may be configured to slide into place from a front side or rear side between, for example, two proximate RMSs.

Any given mounting bracket/mating mounting bracket, arm box rest/hook shaped bracket may be wedge shaped, snap fit, secured via a fastener (e.g., a pin, a screw, an interlock, etc.), and may be configured to increase a structural rigidity of a cooperating structure.

Any given mounting foot may be secured to an associated RMS via, for example, two fasteners. When packaging an RMS for shipment from a RMS assembly site to an associated venue, one of each pair of fasteners may be removed or loosened, and the respective mounting feet may be swiveled upward such that the mounting feet are above a lower most portion of the RMS, thereby, reducing associated package size and/or reducing mounting foot exposure to bending/damage. The mounting feet may be pivotally attached to a respective RMS via, for example, a hinge, and the mounting feet may simply be pivoted from a shipping orientation to an installation orientation. Any given mounting bracket/mating mounting bracket, arm box rest/hook shaped bracket may be configured to reduce shipping package size, reduce installation time/complexity, facilitate arm box installation/removal/replacement, increase structural strength/rigidity etc.

Any given RMS/arm box rests may be configured to accommodate various chair widths. For example, the arm box rests may be of sufficient dimension to allow a respective chair seat to extend beyond sides of an RMS and still an arm box will rest on the arm box rests. Alternatively, a width of any given RMS may be specifically matched to a respective chair width.

Any given RMS may include a mechanism (e.g., a cable between an ottoman and an actuator, an actuator extend hard stop, an actuator rotation hard stop, a gas-charged piston and actuator) to control movement of a chair back relative to movement of a chair foot rest (or ottoman). For example, when a chair is occupied the mechanism may cause the chair back to move further relative to the foot rest compare to when the chair is being operated to, for example, clean an associated venue. Thereby, the chair may comply with fire codes while facilitating venue cleaning. Any given RMS that includes mechanism to control movement of a chair back relative to movement of a chair foot rest (or ottoman) may also include a feature (e.g., a solenoid, a spring, etc.) to override the mechanism. Thereby, a respective chair may comply with fire codes while facilitating venue cleaning.

Alternatively, or additionally, a RMS may include a mechanism (e.g., a cable between an ottoman and an actuator, an actuator extend hard stop, an actuator rotation hard stop, a gas-charged piston and actuator, etc.) to control movement of a chair ottoman. For example, the chair ottoman may be limited in travel while chair back movement remains unrestricted. The chair ottoman movement limiting mechanism may include springs, dampers or other devices that may reduce a peak loading of controlling movement of an associated powered recliner chair and/or movement of components of the chair compared to powered recliner chairs that do not include an ottoman movement limiting mechanism.

A mounting foot may include an RMS attachment, an arm box rest, a chair elevation, and a floor attachment. Any given mounting feet may be configured to facilitate adjustment of an angle of a respective chair relative to a floor angle. For example, a chair may be leveled via adjustment of a pair of front mounting feet and a pair of rear mounting feet.

Turning to FIGS. 17A-H, J-N and P-R, a chair controller 1700*a-h,j-n,p-r* may include a processor 1705*a* with a programming port 1706*a*, an H-bridge 1720*a* connected to an actuator motor output 1740*b*, a chair control switch input 1735*c*, a low-power single operational amplifier 1750*a*, a battery 1760*b*, a light output 1755*c*, an auxiliary communication connector 1760*c*, a communication input connector 1765*c*, a communication output connector 1770*c*, a wireless interface module connector 1775*c*, an emergency stop (e.g., safety switch) connector 1780*c*, an auxiliary board connector 1785*d*, a linear voltage regulator 1790*f*, a buck regulator 1795*g*, and an auxiliary board power connector 1786*l*. The chair controller 1700*a-h,j-n,p-r*, or any portion(s) thereof, may be, for example, incorporated into a user control 270*a-c*, a controller 490*a,b*, 590*a,b*, 790*a,b*, a power supply 796*a,b*, a wireless data receiver 485*b*, a user interface 400*c*, 500*c*, 600*a-c*, 900, 1215*a,b*, 1300*a,b*, a display 1000, 1210*a,b*, or an actuator 460*b*, 560*b*, 565*b*, 760*d*. Thereby, the chair controller 1700*a-h,j-n,p-r* may, or appropriate portion(s) thereof, may perform any associated function as described herein.

Figure 17A:
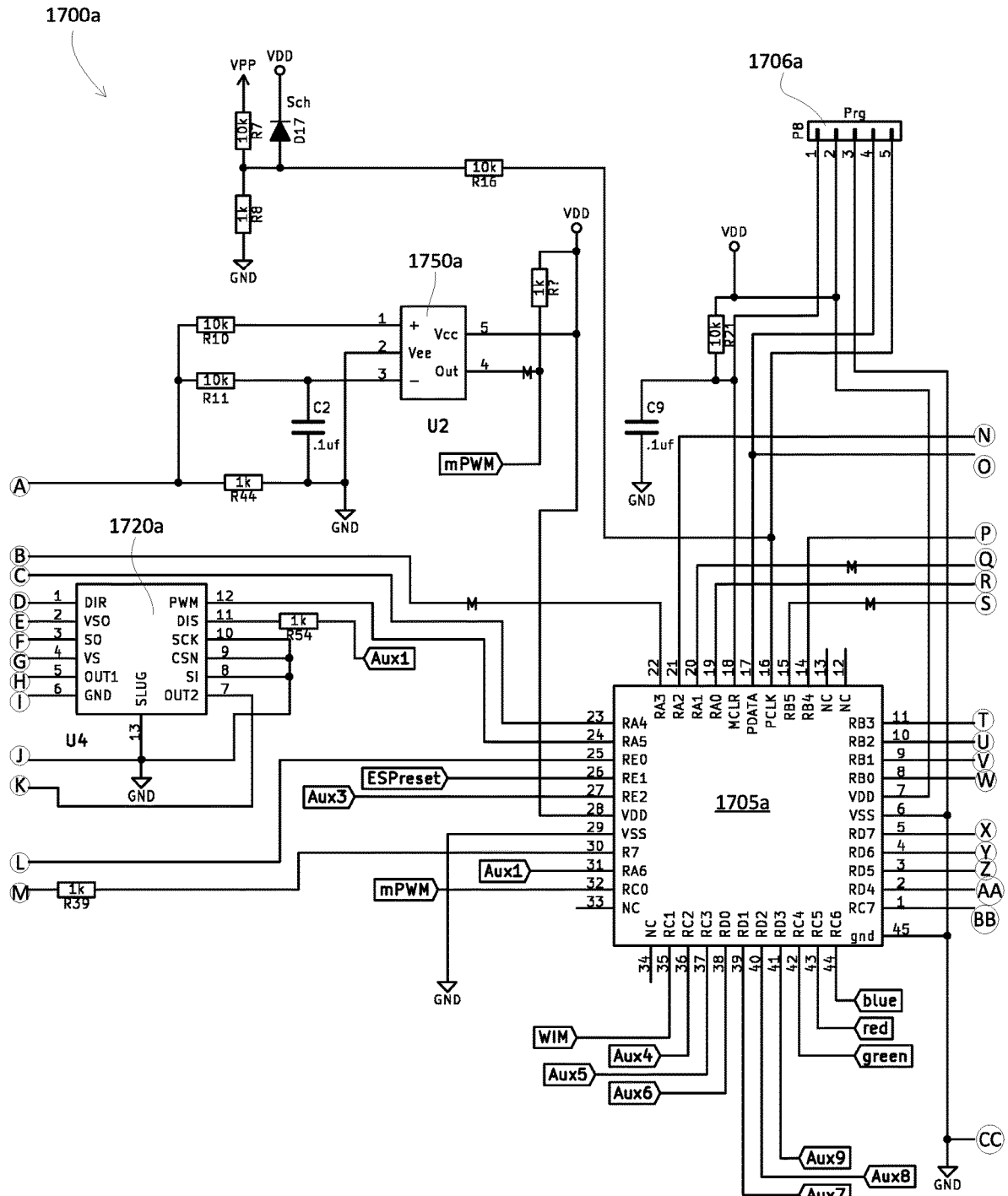
FIGS. 17A-H, 17J-N and 17P-R depict example electrical control circuits for use within powered chairs.
Figure 17B:
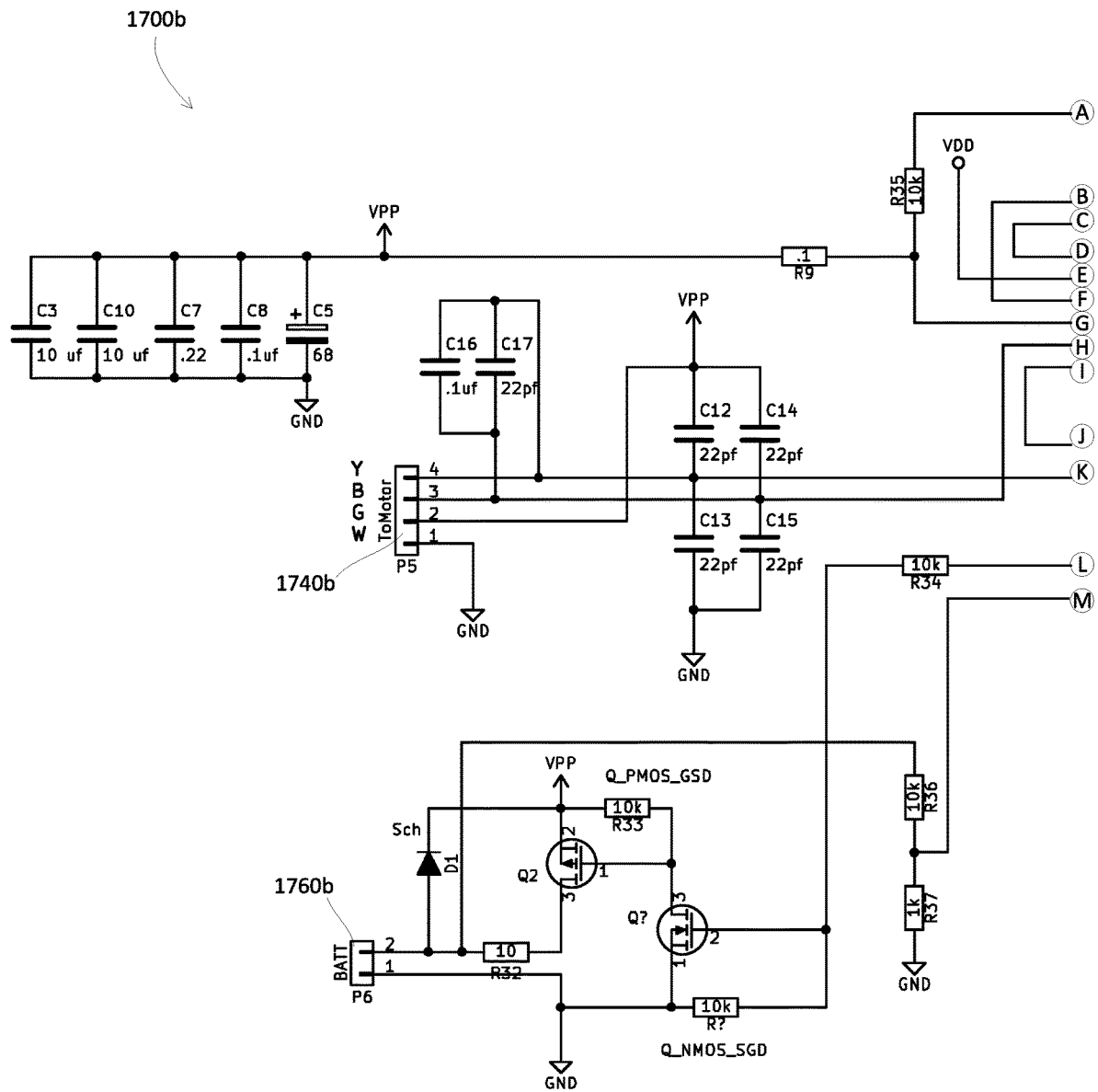
Figure 17C:
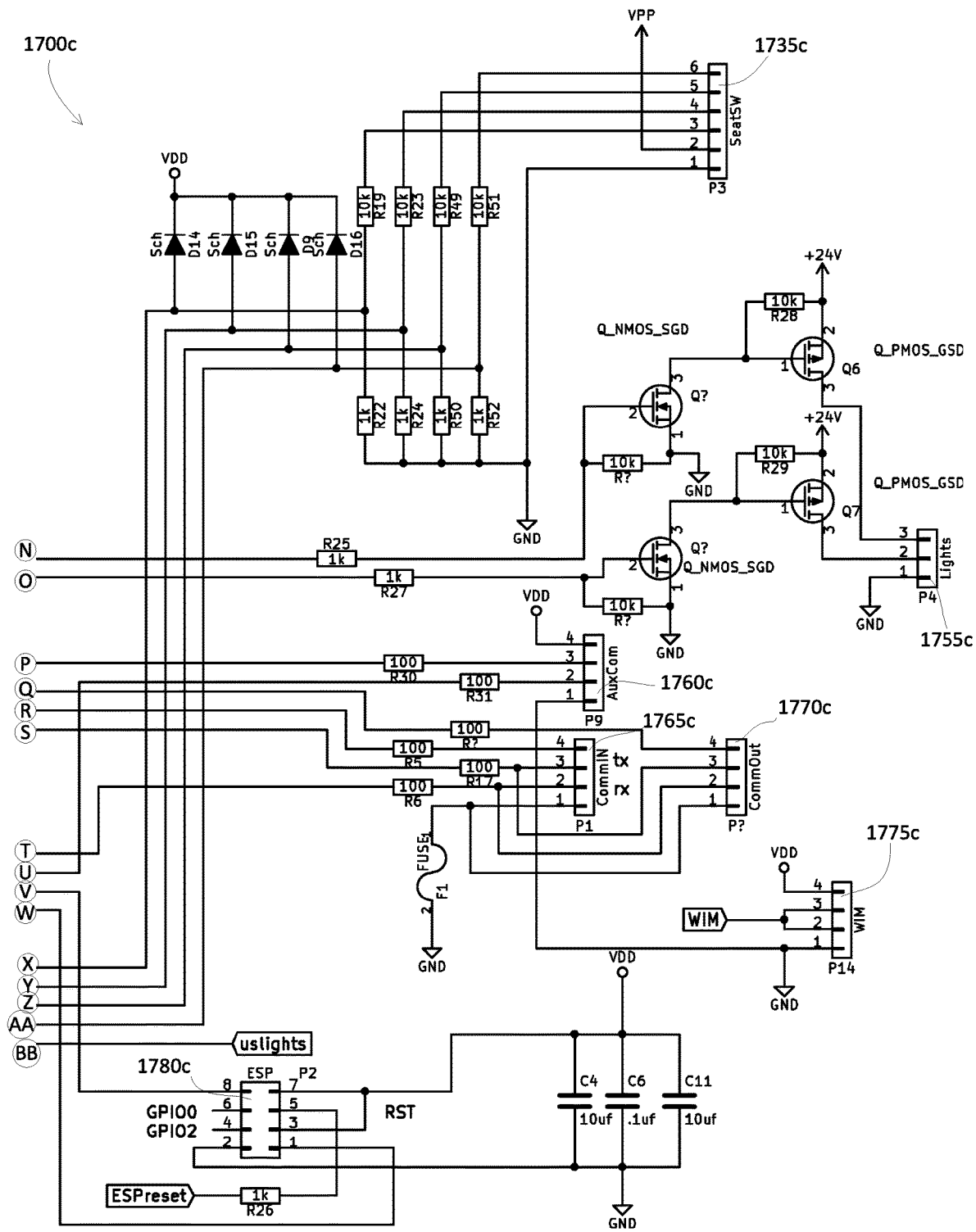
Figure 17D:
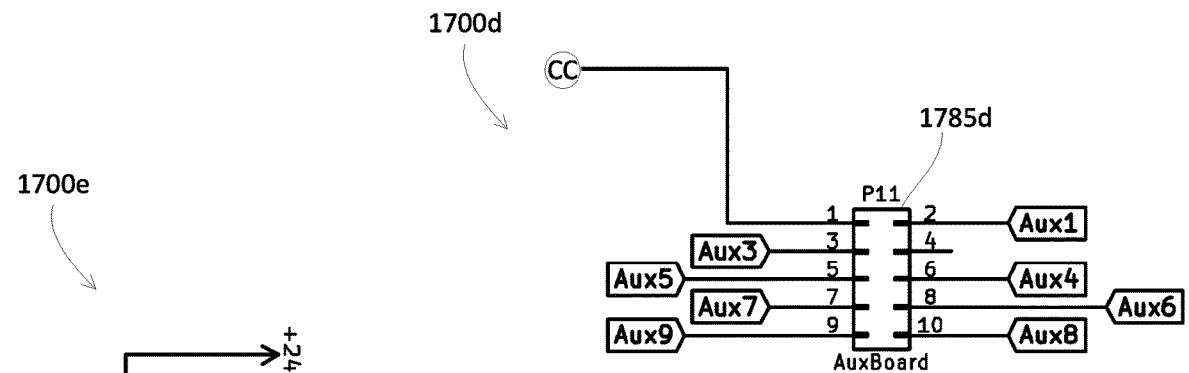
Figure 17E:
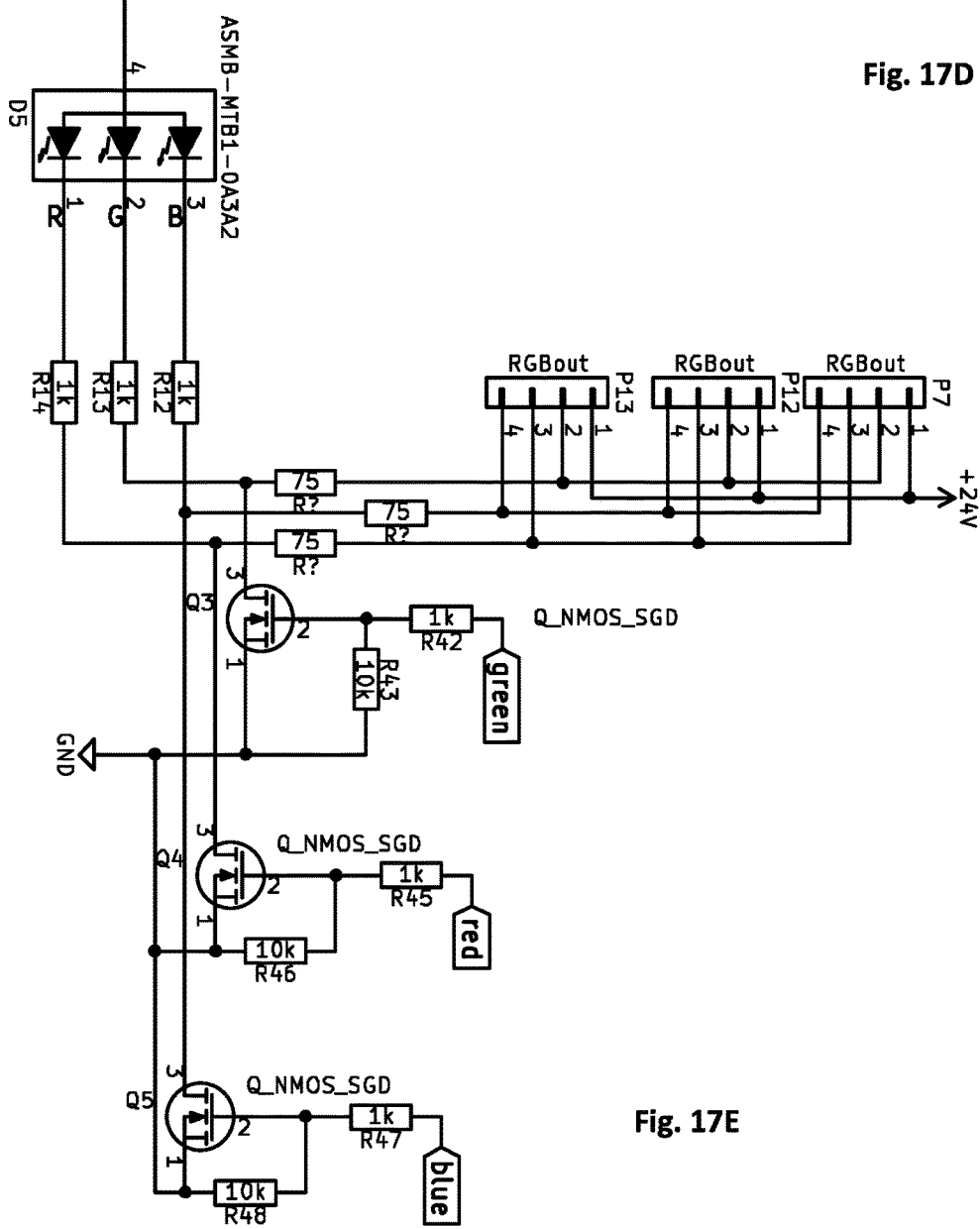
Figure 17F:
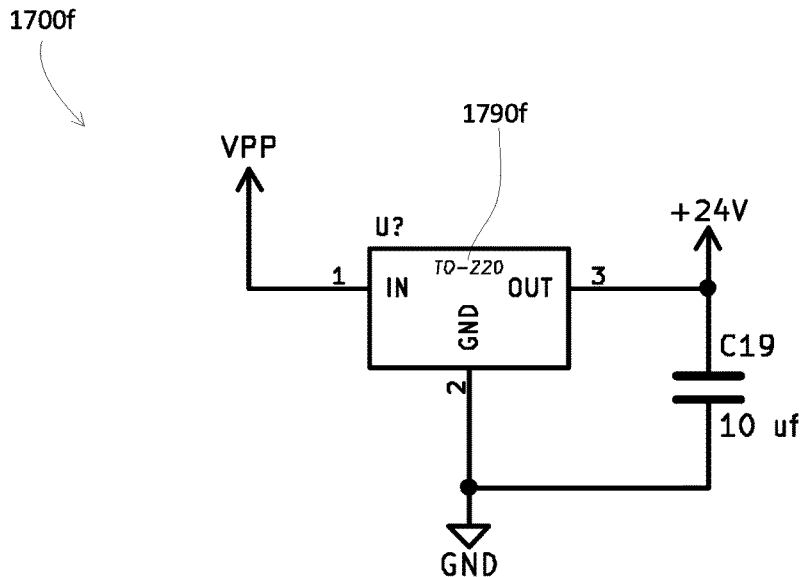
Figure 17G:
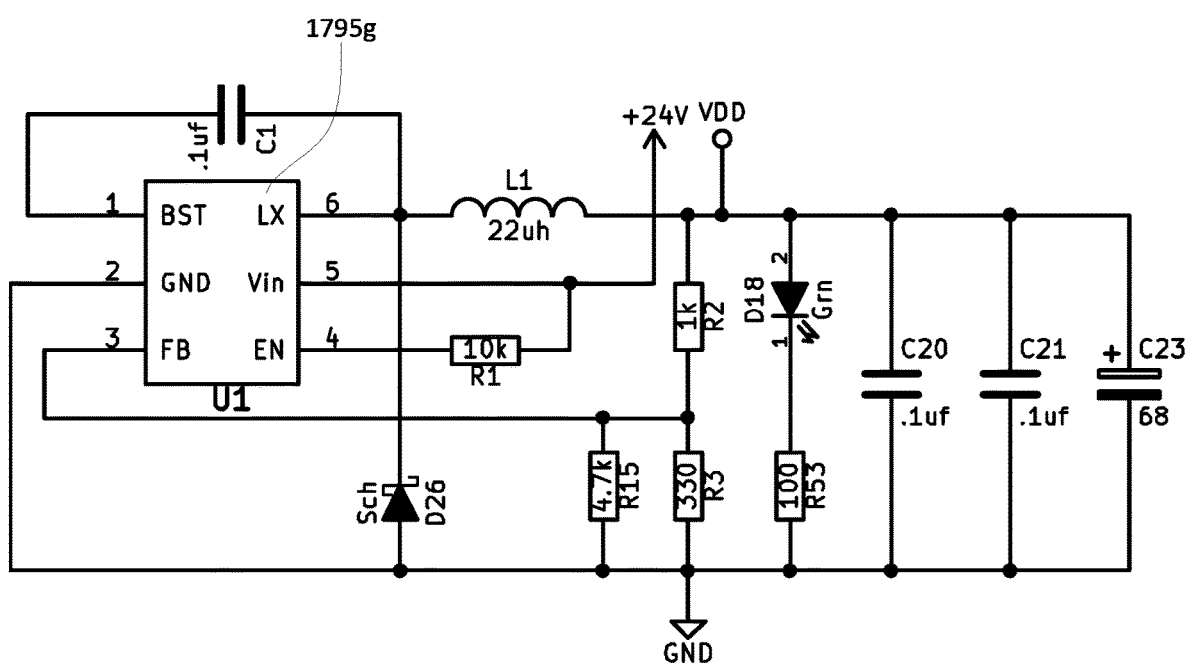
Figures 17H, 17J:
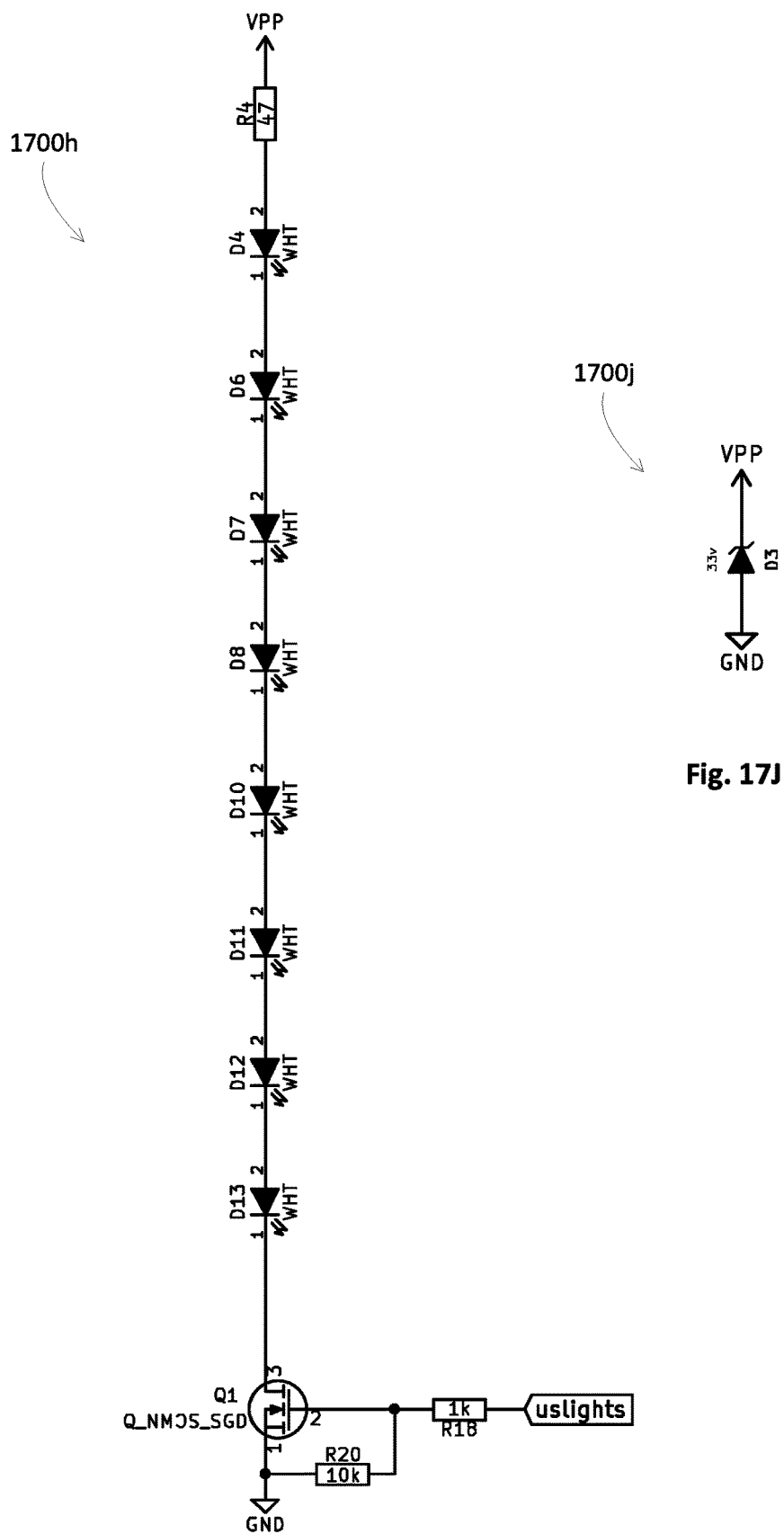
Figure 17K:
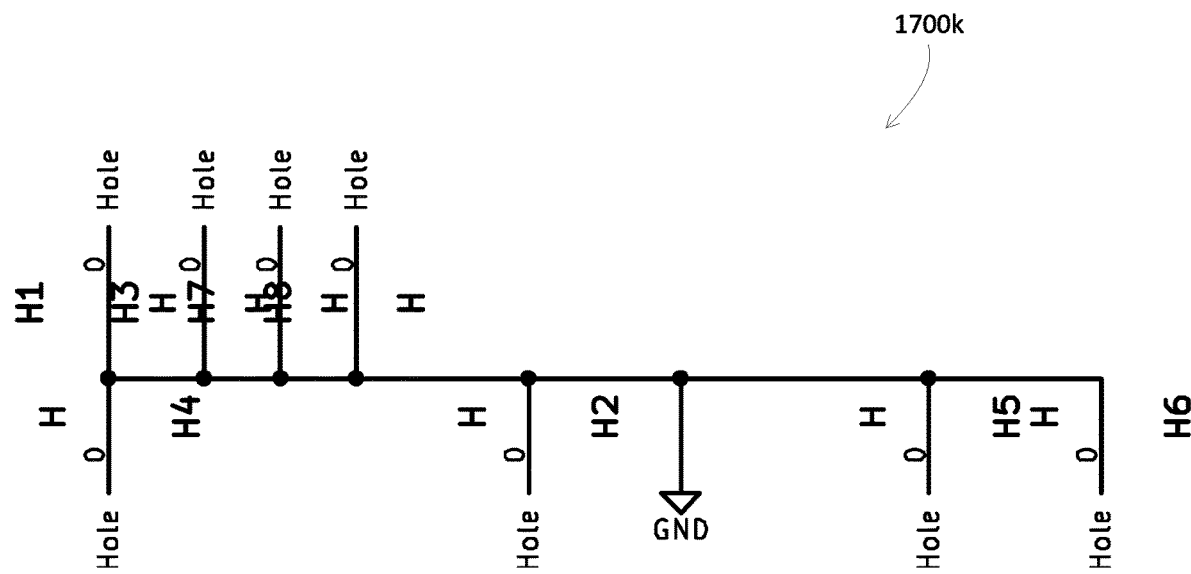
Figure 17L:
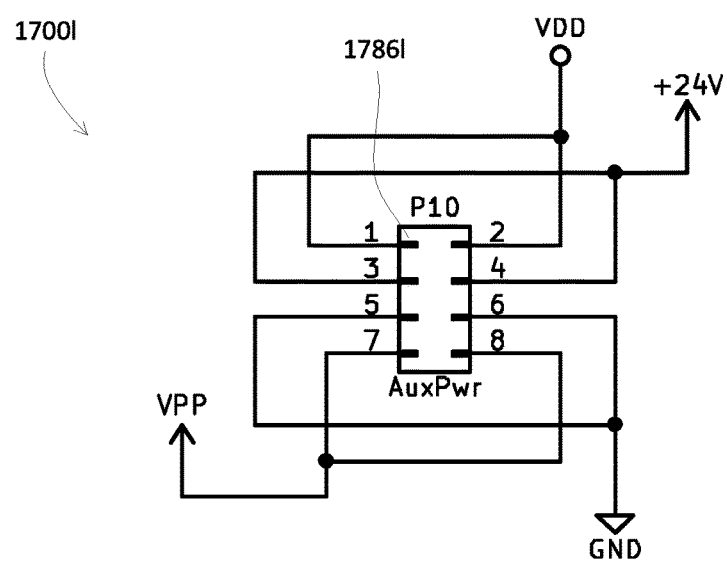
Figure 17M:
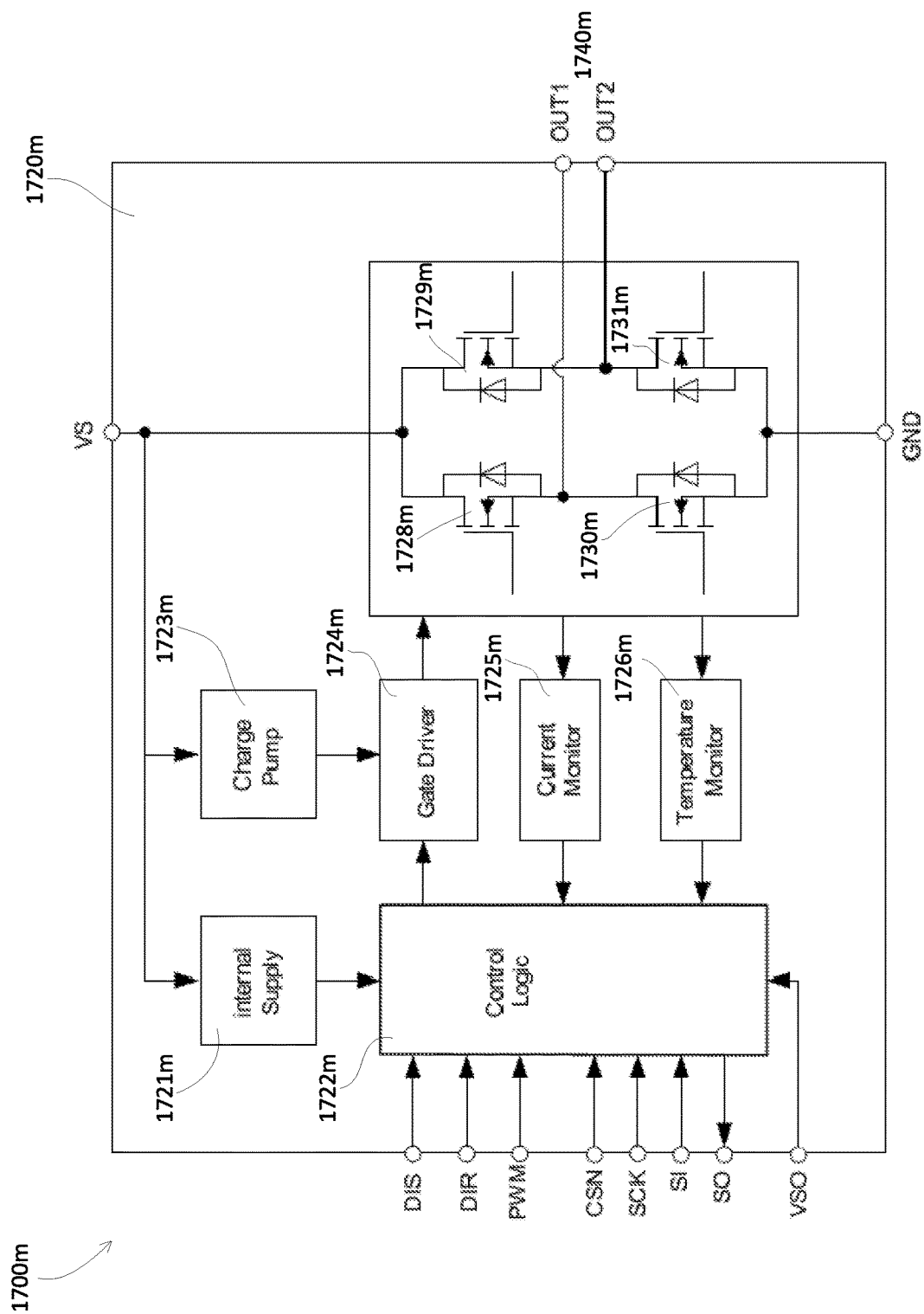

The letters A-M within circles shown on FIG. 17A denote connections to similarly labeled connections on FIG. 17B. The letters N-BB within circles shown on FIG. 17A denote connections to similarly labeled connections on FIG. 17C. The letters CC within a circle shown on FIG. 17A denotes a connection to a similarly labeled connection on FIG. 17D.

An auxiliary board (not shown in FIGS. 17A-H, J-N and P-R) may be added to facilitate additional actuator motor connections 1740*b*, additional lighting connections 1755*c*, additional user interface selectors 1735*c*, etc. In any event, a chair controller 1700*a-h,j-n,p-r* may be configured to control a single chair, a portion of a single chair, a group of chairs, or a portion of a group of chairs.

The processor 1705*a* may be, for example, a part number PIC18F46K40 as available from Microchip Technology Incorporated, Chandler, Ariz., the entire content of the associated technical specifications is incorporated in its entirety herein by reference. While only one processor 1705*a* is shown, any number and type of processor(s) may be incorporated. As shown with reference to FIGS. 17A and 17B, the processor 1705*a* may monitor and/or control a battery via battery connection 1760*b*. The processor 1705*a* may turn on a thyristor (or transistor) Q2 to charge a battery. The processor 1705*a* may turn on a thyristor (or transistor) Q? to power a chair from a battery when, for example, the processor 1705*a* detects that electric power to an associated venue has been interrupted.

The H-bridge 1720*a* may be, for example, a part number IFX9201 as available from Infineon Technologies A.G., Munich, Germany, the entire content of the associated technical specifications is incorporated in its entirety herein by reference. While only H-bridge 1720*a* is shown, any number and type of H-bridge(s) may be incorporated depending on, for example, how may actuators are being controlled. Any given chair controller 1700*m* may include an H-bridge 1720*m* having an internal power supply 1721*m*, control logic 1722*m*, an electrical charge pump 1723*m*, a thyristor (or transistor) gate driver 1724*m*, a current monitor 1725*m*, a temperature monitor 1726*m*, a thyristor bridge 1727*m* having four thyristors 1728*m*-1731*m*, and a motor output 1740*m* (e.g., a chair actuator motor output).

Figure 17N:
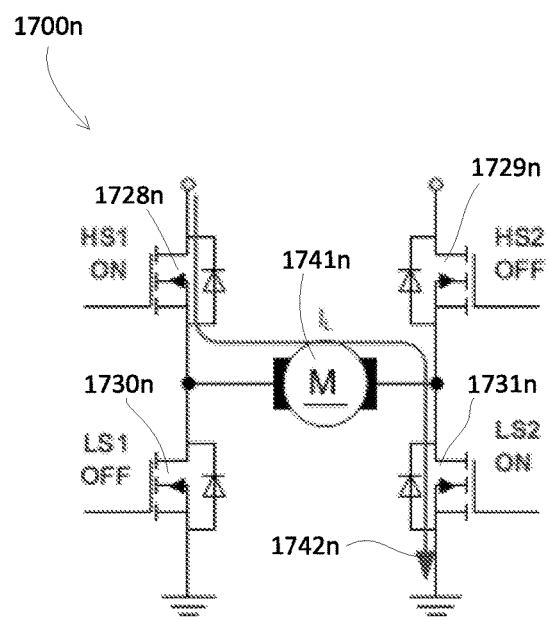
Figure 17P:
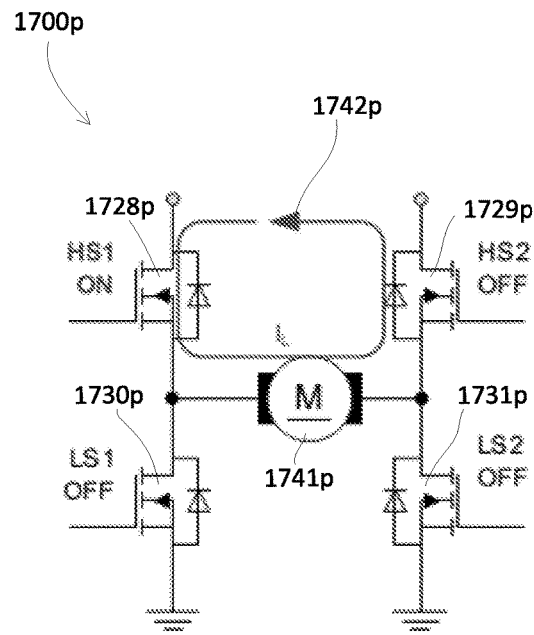
Figure 17Q:
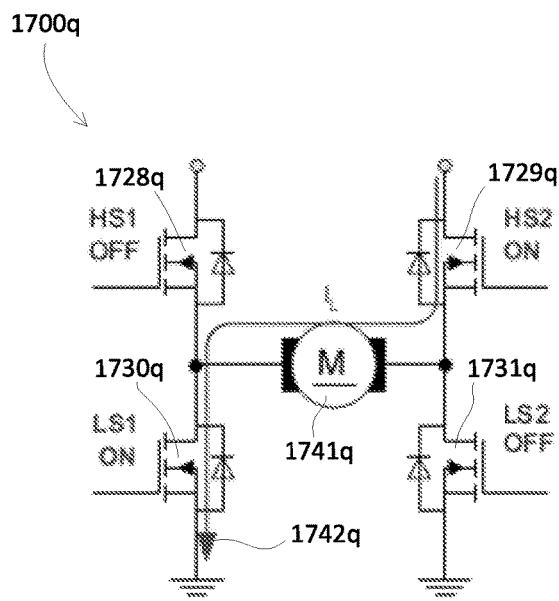
Figure 17R:
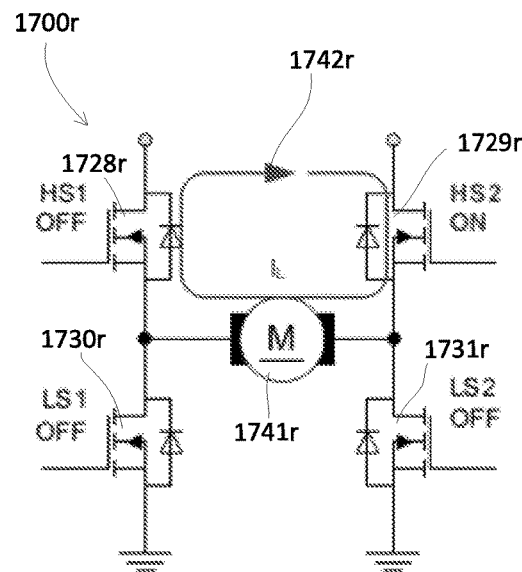

With reference to FIGS. 17N-R, a chair controller 1700*n-r* may include a H-bridge having a first thyristor 1728*n-r*, a second thyristor 1729*n-r*, a third thyristor 1730*n-r*, a fourth thyristor 1731*n-r*, interconnected with a motor 1741*n-r*. As illustrated in FIG. 17N, when the first thyristor 1728*n* is gated on, the second thyristor 1729*n* is off, the third thyristor 1730*n* is off, and the fourth thyristor 1731*n* is gated on, electrical current 1742*n* flows through the first thyristor 1728*n*, through the motor 1741*n*, and through the fourth thyrister 1731*n,* causing the motor 1741*n* to rotate in a first direction. As illustrated in FIG. 17P, when the first thyrister 1728*p* is gated on, the second thyrister 1729*p* is off, the third thyrister 1730*p* is off, and the fourth thyrister 1731*p* is off, electrical current 1742*p* circulates through the first thyrister 1728*n,* through the motor 1741*n,* and through a diode in parallel with the second thyrister 1729*p,* to dissipate electrical energy. As illustrated in FIG. 17Q, when the first thyrister 1728*q* is off, the second thyrister 1729*q* is gated on, the third thyrister 1730*q* is gated on, and the fourth thyrister 1731*n* is off, electrical current 1742*q* flows through the second thyrister 1729*q,* through the motor 1741*q,* and through the third thyrister 1730*q,* causing the motor 1741*q* to rotate in a second direction opposite the first direction. As illustrated in FIG. 17R, when the first thyrister 1728*r* is off, the second thyrister 1729*r* is gated on, the third thyrister 1730*r* is off, and the fourth thyrister 1731*r* is off, electrical current 1742*r* circulates through the second thyrister 1729*r,* through the motor 1741*r,* and through a diode in parallel with the first thyrister 1728*r,* to dissipate electrical energy.

The low-power single operational amplifier 1750*a* may be, for example, a part number AS321 as available from Diodes Incorporated, Plano, Tex., the entire content of the associated technical specifications is incorporated in its entirety herein by reference. While only one low-power single operational amplifier 1750*a* is shown, any number and type of low-power single operational amplifier(s) may be incorporated.

The linear voltage regulator 1790*g* may be, for example, a part number LM7824CT as available from Fairchild Semiconductor Corporation, Sunnyvale, Calif., the entire content of the associated technical specifications is incorporated in its entirety herein by reference. While only one linear voltage regulator 1790*g* is shown, any number and type of linear voltage regulator(s) may be incorporated.

The buck regulator 1795*g* may be, for example, a part number AOZ1282D1 as available from Alpha & Omega Semiconductor, Sunnyvale, Calif., the entire content of the associated technical specifications is incorporated in its entirety herein by reference. While only one buck regulator 1795*g* is shown, any number and type of buck regulator(s) may be incorporated.

As illustrate in FIGS. 17A, 17C, 17E and 17H, a chair controller 1700*a,c,e,h* may include various light controls (e.g., isle lights, user lights, under-chair lights, user interface lights, etc.). As specifically shown in FIG. 17E, a chair controller 1700*e* may include, for example, a red light (e.g., a red LED) output, a green light (e.g., a green LED) output, and a blue light (e.g., a blue LED) output. The chair controller 1700*e* may be configured to independently control, for example, an intensity of each of the red, green and blue to produce any color of light (i.e., a mixture of RGB).

An electric powered chair assembly control system may include a controller having at least one chair actuator output and at least one chair light output. The system may also include a user interface connected to the controller. The user interface may include at least one chair actuator user control and at least one chair light user control. The system may further include an electric power supply having an electric power supply input and an electric power supply output. The electric power supply may be mounted within a first electric powered chair assembly. A first set of electric wiring may extend from the electric power supply output to a first electric actuator mounted within the first electric powered chair assembly. A second set of electric wiring may extend from the electric power supply output to a first electric chair light mounted within the first electric powered chair assembly. The controller may be configured to control the first electric actuator, via the at least one chair actuator output, based on the at least one chair actuator user control. The controller may be configured to control the electric chair light, via the at least one chair light output, based on the at least one chair light user control and further based on at least one of: a venue event, a predetermined time, or a motion sensor. The controller may be configure to de-energize the chair light when the first electric actuator is energized.

An electric powered chair assembly control system may include an electric power supply having an input and an output. The electric power supply may be mounted within a first electric powered chair assembly. An input voltage rating of the input may be different than an output voltage rating of the output. A first set of electric wiring may be plugged into the output of the electric power supply and may extend from the output of the electric power supply to a first receptacle having a first electric actuator mounted within the first electric powered chair assembly plugged into the first receptacle. A second set of electric wiring may extend from the output of the electric power supply to a second receptacle having a second electric actuator mounted within a second electric powered chair assembly plugged into the second receptacle. A third set of electric wiring may extend from the second electric powered chair assembly to the first electric powered chair assembly. The electric power supply may further include at least one of: an electric energy storage device output or a chair light output.

An electric powered chair assembly control system a controller having at least one chair actuator output and at least one chair heater output. The system may also include a user interface connected to the controller. The user interface may include at least one chair actuator user control and at least one chair heater user control. The controller may be configured to control the first electric actuator, via the at least one chair actuator output, based on the at least one chair actuator user control. The controller may be configured to control the electric chair heater, via the at least one chair heater output, based on the at least one chair heater user control. The controller may be configure to de-energize the first electric chair heater when the first electric actuator is energized.

An electric powered chair assembly control system may include a controller having at least one chair actuator output and at least one chair electrical energy storage device output. The system may also include a user interface connected to the controller. The user interface may include at least one chair actuator user control and at least one chair light user control. The controller may be configured to control the first electric actuator, via the at least one chair actuator output, based on the at least one chair actuator user control. The controller may be configured to control the at least one electrical energy storage device output based on a status of the at least one chair actuator output.

Although exemplary embodiments of the invention have been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An electric powered chair assembly control system, the system comprising:
   a controller having at least one chair actuator output and at least one chair light output;

a user interface connected to the controller, wherein the user interface includes at least one chair actuator user control and at least one chair light user control; and an electric power supply having an electric power supply input and an electric power supply output, wherein the electric power supply is mounted within a first electric powered chair assembly, wherein a first set of electric wiring extends from the electric power supply output to a first electric actuator mounted within the first electric powered chair assembly, wherein a second set of electric wiring extends from the electric power supply output to a first electric chair light mounted within the first electric powered chair assembly, wherein the controller is configured to control the first electric actuator, via the at least one chair actuator output, based on the at least one chair actuator user control, wherein the controller is configured to control the electric chair light, via the at least one chair light output, based on the at least one chair light user control and further based on at least one of: a venue event, a predetermined time, or a motion sensor, and wherein the controller is configure to de-energize the chair light when the first electric actuator is energized.

2. The system of claim 1, wherein the controller includes an electrical energy storage device output, and further comprising:
an electrical energy storage device connected to the electrical energy storage device output.

3. The system of claim 2, further comprising:
an electric energy storage device charger connected to the electric energy storage device and configured to charge the electric energy storage device.

4. The system of claim 1, wherein the electric energy storage device charger is connected to an output of the electric power supply.

5. The system of claim 1, wherein the user interface further includes a first illuminated chair actuator status indicator.

6. The system of claim 1, wherein the controller further comprises a chair heater output, and wherein the user interface further includes a chair heater status indicator.

7. The system of claim 1, wherein at least one of: the at least one chair actuator user control or the at least one chair light user control is illuminated.

8. The system of claim 1, wherein the controller further includes at least one of: a safety sensor input, an occupancy sensor input, an isle illumination output, or a row illumination output.

9. The system of claim 1, wherein the controller further includes a remote control input, wherein the controller is configured to reorient a plurality of powered recliner chairs in response to a user activating the remote control.

10. An electric powered chair assembly control system, the system comprising:
an electric power supply having an input and an output, wherein the electric power supply is mounted within a first electric powered chair assembly, wherein an input voltage rating of the input is different than an output voltage rating of the output, wherein a first set of electric wiring is plugged into the output of the electric power supply and extends from the output of the electric power supply to a first receptacle having a first electric actuator mounted within the first electric powered chair assembly plugged into the first receptacle, wherein a second set of electric wiring extends from the output of the electric power supply to a second receptacle having a second electric actuator mounted within a second electric powered chair assembly plugged into the second receptacle, wherein a third set of electric wiring extends from the second electric powered chair assembly to the first electric powered chair assembly, and wherein the electric power supply further includes at least one of: an electric energy storage device output or a chair light output.

11. The system of claim 10, further comprising:
an electric energy storage device charger connected to the electric energy storage device output.

12. The system of claim 10, wherein the electric energy storage device is connected to an output of the electric energy storage device charger.

13. The system of claim 10, wherein the input voltage rating of the input is associated with an alternating current rating and the output voltage rating of the output is associated with a direct current rating.

14. The system of claim 10, further comprising:
a fourth set of electric wiring extending from the output of the electric power supply to a pushbutton mounted within the first electric powered chair assembly, wherein the pushbutton is configured to reorient the first electric powered chair assembly when a user activates the pushbutton.

15. The system of claim 14, wherein the pushbutton is illuminated.

16. The system of claim 10, wherein the electric power supply further includes at least one of: a safety sensor input, an occupancy sensor input, an isle illumination output, or a row illumination output.

17. An electric powered chair assembly control system, the system comprising:
a controller having at least one chair actuator output and at least one chair heater output; and
a user interface connected to the controller, wherein the user interface includes at least one chair actuator user control and at least one chair heater user control, wherein the controller is configured to control the first electric actuator, via the at least one chair actuator output, based on the at least one chair actuator user control, wherein the controller is configured to control the electric chair heater, via the at least one chair heater output, based on the at least one chair heater user control, and wherein the controller is configure to de-energize the first electric chair heater when the first electric actuator is energized.

18. The system of claim 17, wherein the controller further comprising an electrical energy storage device output, and further comprising:
an electrical energy storage device connected to the electrical energy storage device output.

19. The system of claim 18, further comprising:
an electric energy storage device charger connected to the electric energy storage device and configured to charge the electric energy storage device.

20. The system of claim 17, wherein the user interface further includes a first chair actuator status indicator.

21. The system of claim 17, wherein the user interface further includes a first chair heater status indicator.

22. The system of claim 17, wherein at least one of: the at least one chair actuator user control or the at least one chair heater user control, is illuminated.

23. The system of claim 17, wherein the controller further includes at least one of: a safety sensor input, an occupancy sensor input, an isle illumination output, or a row illumination output.

24. The system of claim 17, wherein the controller further includes a remote control input, wherein the controller is configured to reorient a plurality of powered recliner chairs in response to a user activating the remote control.

25. An electric powered chair assembly control system, the system comprising:
- a controller having at least one chair actuator output and at least one chair electrical energy storage device output;
- a user interface connected to the controller, wherein the user interface includes at least one chair actuator user control and at least one chair light user control, wherein the controller is configured to control the first electric actuator, via the at least one chair actuator output, based on the at least one chair actuator user control, wherein the controller is configured to control the at least one electrical energy storage device output based on a status of the at least one chair actuator output.

26. The system of claim 25, further comprising:
- an electric energy storage device charger connected to the electric energy storage device and configured to charge the electric energy storage device.

27. The system of claim 25, wherein the user interface further includes a first chair actuator status indicator.

28. The system of claim 25, wherein the user interface further includes an electrical energy storage device status indicator.

29. The system of claim 25, wherein at least one of: the at least one chair actuator user control or the at least one chair heater user control, is illuminated.

30. The system of claim 25, wherein the controller further includes at least one of: a safety sensor input, an occupancy sensor input, an isle illumination output, or a row illumination output.

* * * * *